US011525898B2

(12) United States Patent
Nishiwaki

(10) Patent No.: US 11,525,898 B2
(45) Date of Patent: Dec. 13, 2022

(54) OPTICAL DEVICE COMPRISING AN OPTICAL WAVEGUIDE ELEMENT HAVING A FIRST AND A SECOND GRATING ARRANGED IN A RADIAL DIRECTION OF A VIRTUAL CIRCLE

(71) Applicant: Panasonic Intellectual Property Management Co., Ltd., Osaka (JP)

(72) Inventor: Seiji Nishiwaki, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 407 days.

(21) Appl. No.: 16/900,866

(22) Filed: Jun. 12, 2020

(65) Prior Publication Data

US 2020/0309919 A1 Oct. 1, 2020

Related U.S. Application Data

(63) Continuation of application No. PCT/JP2018/044815, filed on Dec. 6, 2018.

(30) Foreign Application Priority Data

Dec. 27, 2017 (JP) .............................. JP2017-251788
Oct. 31, 2018 (JP) .............................. JP2018-205800

(51) Int. Cl.
*G01S 7/48* (2006.01)
*G01S 7/481* (2006.01)
(Continued)

(52) U.S. Cl.
CPC .......... *G01S 7/4817* (2013.01); *G01S 7/4863* (2013.01); *G01S 7/4865* (2013.01); *G01S 17/08* (2013.01);
(Continued)

(58) Field of Classification Search
CPC .......... G01S 17/02; G01S 17/04; G01S 17/06; G01S 17/08; G01S 7/48; G02B 27/28;
(Continued)

(56) References Cited

U.S. PATENT DOCUMENTS 4,737,946 A * 4/1988 Yamashita ........ G11B 11/10532

FOREIGN PATENT DOCUMENTS

JP 3-008134 1/1991
JP 4-168427 6/1992
(Continued)

OTHER PUBLICATIONS

International Search Report of PCT application No. PCT/JP2018/044815 dated Feb. 26, 2019.

*Primary Examiner* — Que Tan Le
(74) *Attorney, Agent, or Firm* — McDermott Will & Emery LLP

(57) ABSTRACT

An optical device includes: a light source that emits laser light; an optical waveguide element positioned on the optical path of the laser light; a first member positioned on the optical path, and has a bottom surface that faces the optical waveguide element, and a side surface that is rotationally symmetric about the optical path; and a control circuit. The optical waveguide element includes: a first grating that includes a plurality of portions arranged in the radial direction and having mutually different refractive indices, and that causes a portion of the laser light that is incident to be propagated in the radial direction within the optical waveguide element; and a second grating that includes a plurality of portions arranged outside the first grating, in the radial direction, and having mutually different refractive indices, and that causes light to be emitted from the optical waveguide element.

28 Claims, 66 Drawing Sheets

(51) Int. Cl.
  *G02F 1/295* (2006.01)
  *G02B 27/28* (2006.01)
  *G01S 7/4863* (2020.01)
  *G01S 7/4865* (2020.01)
  *G01S 17/08* (2006.01)

(52) U.S. Cl.
  CPC ......... *G02B 27/283* (2013.01); *G02B 27/286* (2013.01); *G02F 1/2955* (2013.01); *G02F 2201/305* (2013.01)

(58) Field of Classification Search
  CPC ........ G02B 27/09; G02B 27/10; G02B 27/18; G02B 5/30; G02F 1/29
  USPC ................................ 250/216, 221, 239, 225
  See application file for complete search history.

(56) References Cited

FOREIGN PATENT DOCUMENTS

| | | |
|---|---|---|
| JP | 7-064033 | 3/1995 |
| JP | 7-131120 | 5/1995 |
| JP | 2010-044232 | 2/2010 |
| JP | 2017-187649 | 10/2017 |

\* cited by examiner

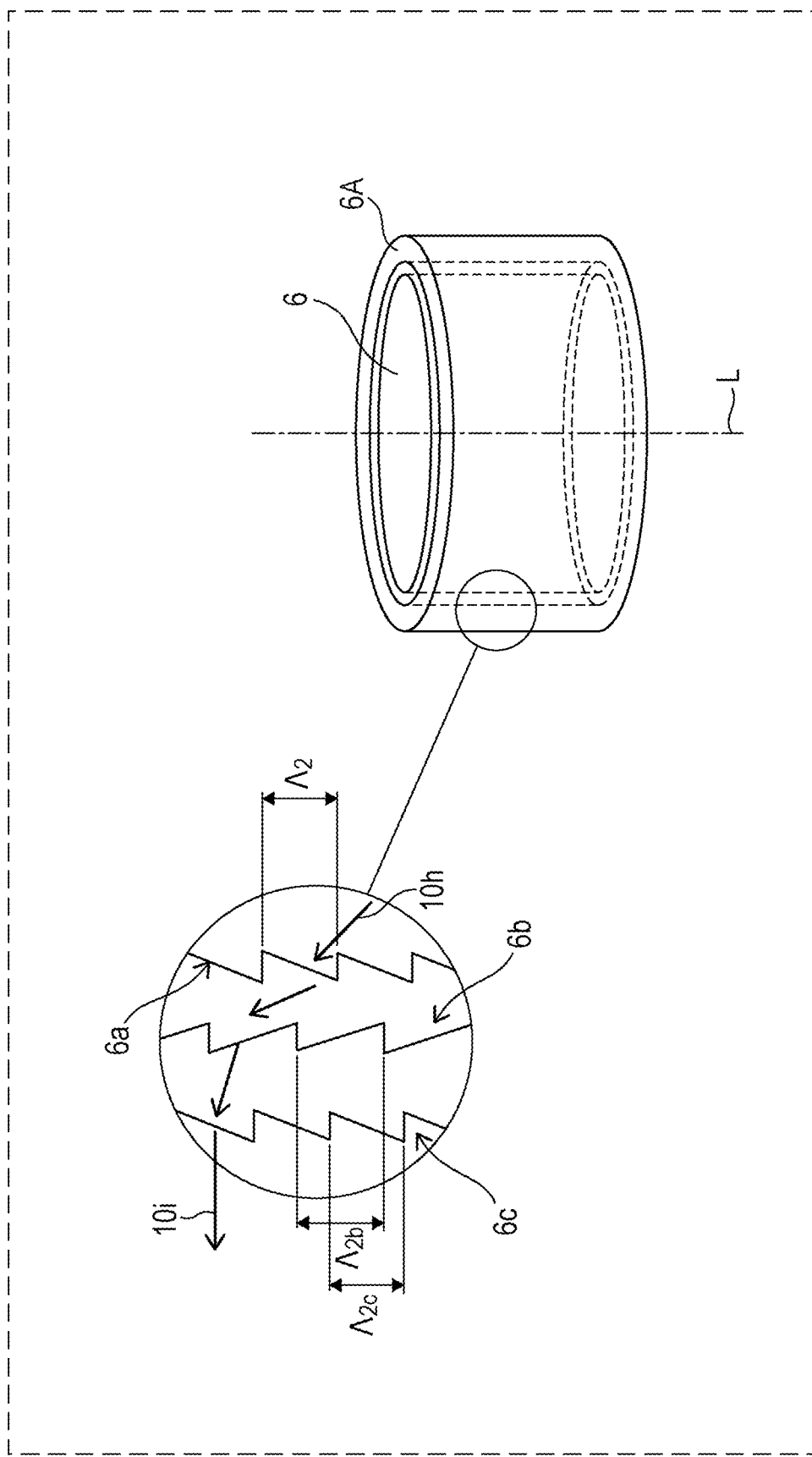

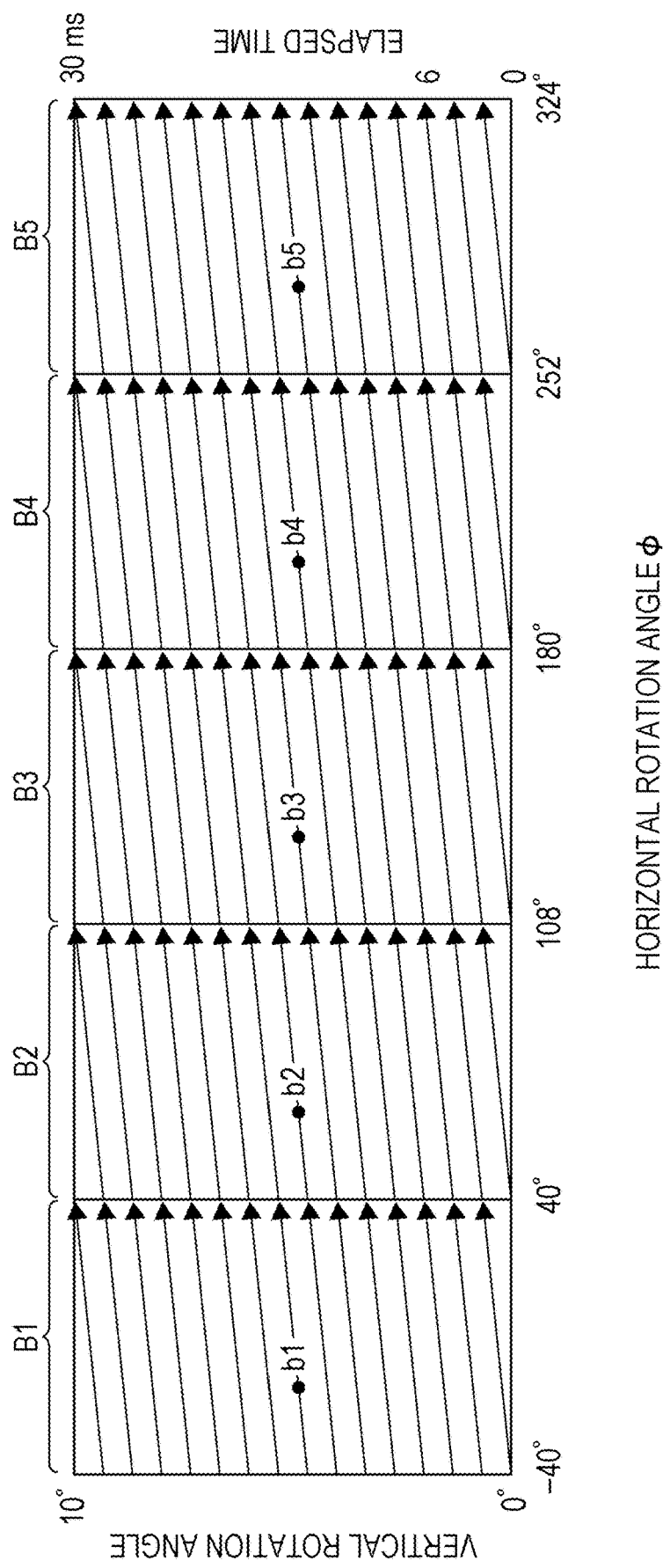

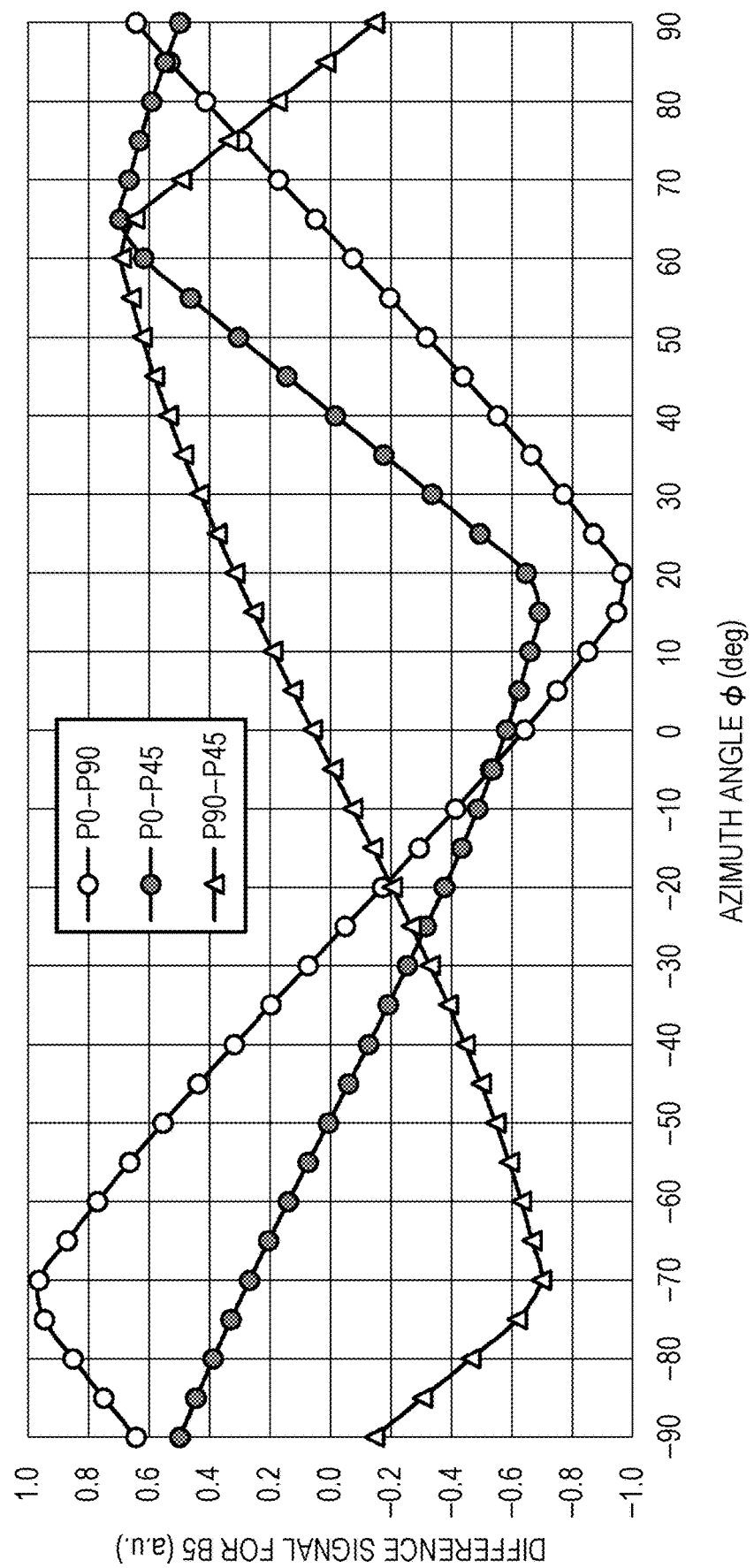

LIQUID CRYSTAL PATTERN ROTATION ANGLE φ (deg)

OPTICAL DEVICE COMPRISING AN OPTICAL WAVEGUIDE ELEMENT HAVING A FIRST AND A SECOND GRATING ARRANGED IN A RADIAL DIRECTION OF A VIRTUAL CIRCLE

BACKGROUND

1. Technical Field

The present disclosure relates to an optical device.

2. Description of the Related Art

Conventionally, to comprehend the positions of objects scattered within a field of view, the distances to the surfaces of the objects are measured by irradiating the objects with light pulses from a light source and measuring the time delay of reflected light from the objects in each direction. For example, Japanese Unexamined Patent Application Publication No. 2017-187649 discloses an optical phased array that uses such a technique.

SUMMARY

In one general aspect, the techniques disclosed here feature an optical device provided with: a light source that emits laser light; an optical waveguide element that is positioned on the optical path of the laser light; a first transparent member that is positioned on the optical path, and has a bottom surface that faces the optical waveguide element, and a side surface that is rotationally symmetric with a virtual axis along the optical path serving as a central axis; and a control circuit. The optical waveguide element includes: a first grating that includes a plurality of portions arranged in a radial direction of a virtual circle centered on a point where the laser light is incident and having mutually different refractive indices, and that causes a portion of the laser light that is incident to be propagated in the radial direction within the optical waveguide element as propagation light; and a second grating that includes a plurality of portions arranged outside the first grating, arranged in the radial direction, and having mutually different refractive indices, and that causes a portion of the propagation light to be emitted from the optical waveguide element as emission light. The emission light is incident on the first transparent member from the bottom surface or the side surface, and is emitted from the side surface.

The aforementioned general aspect may be realized by using a system, a method, an integrated circuit, a computer program, or a recording medium, or may be realized by using an arbitrary combination of a system, a device, a method, an integrated circuit, a computer program, and a recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1D is a perspective view schematically depicting another form for a columnar body in the optical device;

FIG. 19C is a drawing illustrating the relationship between the state of horizontal and vertical scanning using laser light corresponding to the divided regions of the electrode, and positions among the scanning light beams, in the third embodiment;

FIG. 20C is a drawing illustrating the relationship between a detection difference signal for a divided region of the electrode and the horizontal scanning azimuth angle in the third embodiment;

DETAILED DESCRIPTION (Underlying Knowledge Forming Basis of the Present Disclosure)

Prior to describing embodiments of the present disclosure, underlying knowledge forming the basis of the present disclosure will be described. In the present specification, the term "light" is used for not only visible light but also infrared light.

There are two representative methods for radiating light in order to comprehend the positions of objects scattered within a field of view. One is a method in which the entire region within a field of view is uniformly irradiated with light pulses. Another is a method in which the entire region within a field of view is comprehensively scanned by laser beams having a certain directivity. Compared to the former method, the latter method can reduce the amount of emitted light, and is safe also for humans positioned at the object side.

Generally, in a scan performed using a laser beam, a light source, a photodetector, and a galvanometer mirror are arranged on a rotating stage. Light emitted from the light source is reflected by the galvanometer mirror. At such time, optical scanning can be performed in the vertical direction by rotating the galvanometer mirror up and down, and optical scanning can be performed in the horizontal direction by rotating the rotating stage. However, due to being a mechanical structure, the scanning speed is slow and the device is also large and expensive.

The phased array described in Japanese Unexamined Patent Application Publication No. 2017-187649 may be given as an example of an attempt to move away from a mechanical structure.

Hereinafter, the principles of optical scanning using a phased array will be described.

Figure 26A:
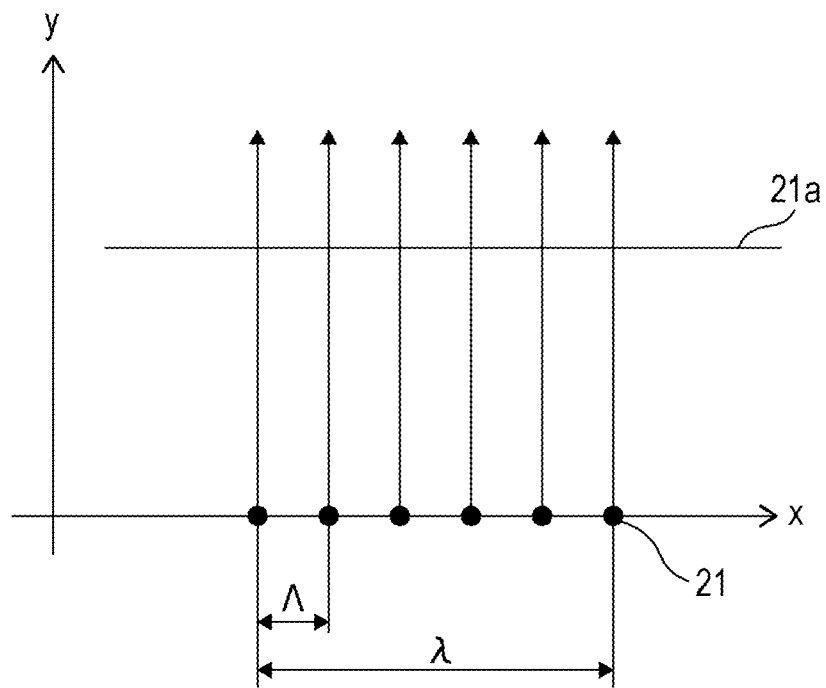
FIG. 26A is a drawing schematically depicting laser beams emitted in a vertical direction from a phased array in a conventional example.
Figure 26B:
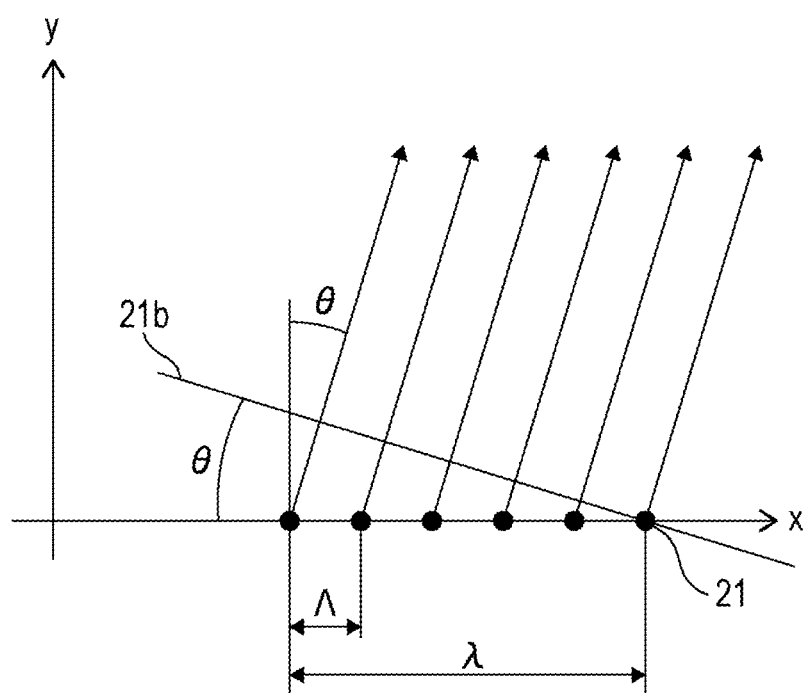
FIG. 26B is a drawing schematically depicting laser beams emitted in an oblique direction from a phased array in a conventional example.

FIGS. 26A and 26B are drawings schematically depicting laser beams emitted in a vertical direction and an oblique direction, respectively, from a phased array in a conventional example. In the examples depicted in FIGS. 26A and 26B, a plurality of wave sources 21 are arranged uniformly at intervals having a pitch $\Lambda$ on an x-axis. When light of a wavelength $\lambda$ having aligned phases is oscillated from the plurality of wave sources 21, excitation light propagates forming a wavefront 21a that is parallel with the x-axis, as depicted in FIG. 26A. When light is oscillated such that the phase difference between adjacent left and right wave sources is $\Lambda \sin \theta$, excitation light propagates forming a wavefront 21b that forms an angle $\theta$ with the x-axis, as depicted in FIG. 26B. If the wave sources 21 are arranged uniformly along the x-axis and the y-axis and the excitation phases thereof are adjusted, the propagation direction of excitation light can be set in two axial directions.

However, in the aforementioned conventional method, it is necessary for the pitch $\Lambda$ of the wave sources 21 to be a fraction of the wavelength $\lambda$ or less in order to form a wavefront. In the case of radio waves, the wavelength is 10 cm or more, for example. Therefore, the plurality of wave sources 21 which function as antennas can be arranged at an interval that is a fraction of the wavelength or less. However, in the case of light, the wavelength is approximately 1 μm, for example. Therefore, it is not easy for the plurality of wave sources 21 to be arranged at submicron intervals. Furthermore, in the case of a laser, light is oscillated through an amplification process within a resonator. Thus, different from radio waves, it is not easy for the phase of a laser to be controlled.

Thus, the present inventor conceived of a novel optical device.

The present disclosure includes an optical device according to the following items.

[Item 1]

An optical device according to a first item is provided with: a light source that emits laser light; an optical waveguide element that is positioned on the optical path of the laser light; a first transparent member that is positioned on the optical path, and has a bottom surface that faces the optical waveguide element, and a side surface that is rotationally symmetric with a virtual axis along the optical path serving as a central axis; and a control circuit. The optical waveguide element includes: a first grating that includes a plurality of portions arranged in the radial direction of a virtual circle centered on a point where the laser light is incident and having mutually different refractive indices, and that causes a portion of the laser light that is incident to be propagated in the radial direction within the optical waveguide element as propagation light; and a second grating that includes a plurality of portions arranged outside the first grating, arranged in the radial direction, and having mutually different refractive indices, and that causes a portion of the propagation light to be emitted from the optical waveguide element as emission light. The emission light is incident on the first transparent member from the bottom surface or the side surface, and is emitted from the side surface.

[Item 2]

In the optical device according to the first item, the first grating may have a concentric circular structure centered on the point.

[Item 3]

In the optical device according to the first item, the second grating may have a concentric circular structure centered on the point.

[Item 4]

In the optical device according to the first item, the first transparent member may have a columnar shape or a truncated conical shape.

[Item 5]

In the optical device according to the fourth item, the side surface of the first transparent member may include a third grating in which a grating vector is parallel with the central axis.

[Item 6]

The optical device according to the fifth item may be further provided with a second transparent member having a cylindrical shape that surrounds the first transparent member and is coaxial with the central axis, and an inside surface and an outside surface of the second transparent member may include a fourth grating in which a grating vector is parallel with the central axis.

[Item 7]

In the optical device according to any of the fourth to sixth items, the optical waveguide element may further include a transparent layer that is in contact with the first transparent member, on the first grating and the second grating, and the transparent layer may have a refractive index of 1.8 or more.

[Item 8]

In the optical device according to any of the first to seventh items, the control circuit may cause the direction of the laser light emitted from the optical waveguide element to change, by causing the light source to change a wavelength of the laser light.

[Item 9]

In the optical device according to any of the first to eighth items, the optical waveguide element may include a first dielectric layer, a second dielectric layer on the first dielectric layer, and a third dielectric layer on the second dielectric layer, the refractive index of the second dielectric layer may be higher than the refractive index of the first dielectric layer and the refractive index of the third dielectric layer, the first grating and the second grating may be arranged in at least one selected from the group consisting of a first position between the second dielectric layer and the first dielectric layer and a second position between the second dielectric layer and the third dielectric layer, and a portion of the laser light that is incident on the second dielectric layer may propagate in the radial direction within the second dielectric layer as the propagation light, and be emitted from the second grating as the emission light.

[Item 10]

In the optical device according to the ninth item, the optical waveguide element may further include a reflection layer, and the first dielectric layer may be arranged between the second dielectric layer and the reflection layer.

[Item 11]

In the optical device according to the ninth or tenth item, the optical waveguide element may further include a first electrode layer and a second electrode layer that is transparent, the first dielectric layer, the second dielectric layer, and the third dielectric layer may be arranged between the first electrode layer and the second electrode layer, the second electrode layer may be closer to the third dielectric layer than the first electrode layer is, and the third dielectric layer may be a liquid crystal layer that includes liquid crystal.

[Item 12]

In the optical device according to the eleventh item, in a state where a voltage is not being applied to the liquid crystal layer, the orientation direction of the liquid crystal may be perpendicular to a grating vector of the first grating or a grating vector of the second grating.

[Item 13]

In the optical device according to the eleventh item, the optical waveguide element may further include, between the first grating and the second grating, a fifth grating that includes a plurality of portions arranged in the radial direction and having mutually different refractive indices, and, in a state where a voltage is not applied to the liquid crystal layer, the orientation direction of the liquid crystal may be perpendicular to a grating vector of the fifth grating.

[Item 14]

In the optical device according to the eleventh item, at least one electrode layer selected from the group consisting of the first electrode layer and the second electrode layer may include a first electrode opposing the first grating, a second electrode opposing the second grating, and a third electrode between the first electrode and the second electrode, the third electrode may include divided regions that are electrically conductive, arranged in the circumferential direction of the virtual circle, and the divided regions may be insulated from each other.

[Item 15]

In the optical device according to the fourteenth item, the control circuit may control the direction of the emission light, by controlling a voltage applied to the liquid crystal layer via the second electrode.

[Item 16]

In the optical device according to the fourteenth or fifteenth item, the control circuit may control the efficiency at which the laser light couples with the propagation light from the first grating, by controlling a voltage applied to the liquid crystal layer via the first electrode.

[Item 17]

In the optical device according to any of the fourteenth to sixteenth items, the control circuit may sequentially apply a voltage to a divided region opposing a portion within the second dielectric layer in which the propagation light propagates, from among the divided regions.

[Item 18]

The optical device according to any of the fourteenth to seventeenth items may be further provided with a polarization light splitter, a photodetector, and a polarization rotator, the polarization light splitter and the polarization rotator may be positioned on the optical path between the light source and the first transparent member, the control circuit may cause the polarization direction of the laser light that passes through the polarization rotator to change, by controlling a voltage applied to the polarization rotator, a portion of light that is emitted from the optical waveguide element, is reflected by an object, and is incident on the optical waveguide element may pass through the optical waveguide element, the polarization rotator, and the polarization light splitter, and thereafter be incident on the photodetector as detected light, and the photodetector may generate an electrical signal that corresponds to the amount of detected light.

[Item 19]

In the optical device according to the eighteenth item, the control circuit may control the rotation angle of the polarization direction of the laser light that has passed through the polarization rotator, by acquiring the time interval between a maximum value and a minimum value of the amount of detected light that is detected by the photodetector while the light source is emitting the laser light, and adjusting the voltage applied to the polarization rotator based on the time interval.

[Item 20]

The optical device according to any of the fourteenth to seventeenth items may be further provided with a first polarization light splitter, a polarization converter, a beam splitter, and a photodetector, the photodetector may include a first photodetector and a second photodetector, the first polarization light splitter, the polarization converter, and the beam splitter may be positioned on the optical path between the light source and the first transparent member, a portion of light that is emitted from the optical waveguide element, is reflected by an object, passes through the optical waveguide element, and is thereafter incident on the beam splitter may pass through the beam splitter and the polarization converter, and thereafter be incident on the first photodetector as first detected light, another portion of the light that is incident on the beam splitter may pass through the beam splitter, and thereafter be incident on the second photodetector as second detected light, the first photodetector may generate a first electrical signal that corresponds to the amount of the first detected light, and the second photodetector may generate a second electrical signal that corresponds to the amount of the second detected light.

[Item 21]

In the optical device according to the twentieth item, the polarization converter may be a quarter-wave plate.

[Item 22]

In the optical device according to the twentieth item, the polarization converter may convert light that is linearly polarized into light that is polarized in a circular-tangential direction.

[Item 23]

The optical device according to any of the twentieth to twenty-second items may be further provided with a second polarization light splitter, the photodetector may further include a third photodetector, a portion of light that is emitted from the optical waveguide element, is reflected by an object, passes through the optical waveguide element and the beam splitter, and is thereafter incident on the second polarization light splitter may pass through the second polarization light splitter, and thereafter be incident on the second photodetector as third detected light, another portion of the light that is incident on the second polarization light splitter may pass through the second polarization light splitter, and thereafter be incident on the third photodetector as fourth detected light, and the third photodetector may generate an electrical signal that corresponds to the amount of the fourth detected light.

[Item 24]

In the optical device according to the twentieth or twenty-first item, the control circuit may receive the first electrical signal and the second electrical signal, and generate electrical signals that correspond to a sum of the first electrical signal and the second electrical signal and a ratio of the first electrical signal to the second electrical signal.

[Item 25]

In the optical device according to any of the eighteenth to twenty-fourth items, the control circuit may control a voltage applied to the first electrode, such that the local maximum value of the amount of light detected by the photodetector while the light source is emitting the laser light is minimized.

[Item 26]

In the optical device according to any of the eighteenth to twenty-fifth items, the photodetector may include a filter circuit, and the control circuit may cause the light source to sequentially emit a first optical pulse and a second optical pulse in which intensity modulation signals of different frequencies are superposed, and the control circuit may cause the photodetector to detect a portion of the first optical pulse that is emitted from the optical waveguide element, is reflected by the object, and is incident on the optical waveguide element, and a portion of the second optical pulse that is emitted from the optical waveguide element, is reflected by the object, and is incident on the optical waveguide element, and to separately output a signal that corresponds to the amount of the portion of the first optical pulse and a signal that corresponds to the portion of the second optical pulse.

[Item 27]

In the optical device according to the fourteenth item, in the at least one electrode layer, a boundary between two adjacent divided regions from among the divided regions may have a zigzag shape in the radial direction.

[Item 28]

In the optical device according to the fourteenth item, in each of the first electrode layer and the second electrode layer, a boundary between two adjacent divided regions from among the divided regions may have a zigzag shape in the radial direction, and when viewed from a direction perpendicular to any of the first dielectric layer, the second dielectric layer, and the third dielectric layer, the boundary in the first electrode layer and the boundary in the second electrode layer may form a shape in which rhomboids are linked.

[Item 29]

An optical device according to a twenty-ninth item is provided with a light source that emits laser light, a photodetector that generates an electrical signal corresponding to an amount of light that is incident and includes a filter circuit, and a control circuit that controls the light source and the photodetector, the control circuit causes the light source to sequentially emit a first optical pulse and a second optical pulse in which intensity modulation signals of different frequencies are superposed, and causes the photodetector to detect a portion of the first optical pulse and a portion of the second optical pulse that are reflected by an object, and to separately output a signal corresponding to the amount of the portion of the first optical pulse and a signal corresponding to the portion of the second optical pulse, by means of processing performed by the filter circuit.

[Item 30]

An optical waveguide element according to a thirtieth element is provided with a first dielectric layer, a second dielectric layer on the first dielectric layer, a third dielectric layer on the second dielectric layer, and a pair of electrode layers sandwiching the first to third dielectric layers, the refractive index of the second dielectric layer is higher than the refractive index of the first dielectric layer and the refractive index of the third dielectric layer, the third dielectric layer is a liquid crystal layer, from among the pair of electrode layers, the electrode layer nearer the first dielectric layer is a reflection layer, and the electrode layer nearer the third dielectric layer is a transparent electrode layer, at least one of the pair of electrode layers includes a plurality of divided regions that are electrically conductive and are arranged in a certain direction, the plurality of divided regions are insulated from each other, and the boundary between any two adjacent divided regions from among the plurality of divided regions has a zigzag shape.

[Item 31]

In the optical waveguide element according to the thirtieth item, each of the pair of electrode layers includes the plurality of divided regions, and when viewed from a direction perpendicular to any of the first to third dielectric layers, the boundary in one of the pair of electrode layers and the boundary in the other may form a shape in which rhomboids are linked.

In the present disclosure, all or some of the circuits, s, devices, members, or parts, or all or some of the functional blocks in the block diagrams, may be implemented as one or more electronic circuits including a semiconductor device, a semiconductor integrated circuit (IC) or a large-scale integration (LSI). An LSI or an IC may be integrated in a single chip or may be configured by combining a plurality of chips. For example, function blocks other than storage elements may be integrated in a single chip. The name used here is LSI or IC, but this may also be called a system LSI, a very large-scale integration (VLSI), or an ultra large-scale integration (ULSI) depending on the degree of integration. A field programmable gate array (FPGA) that is programmed after manufacturing an LSI, or a reconfigurable logic device that allows reconfiguration of the connection relationship within an LSI or the setting up of circuit cells within an LSI can also be used for the same purpose.

In addition, it is possible for the functions or operations of all or some of the circuits, units, devices, members, or parts to be executed by software processing. In this case, software is recorded on one or more non-transitory recording mediums such as a ROM, an optical disc, or a hard disk drive, and when the software is executed by a processor, the functions specified by that software are executed by the processor and peripheral devices. A system or device may be provided with one or more non-transitory recording mediums on which software is recorded, a processor, and necessary hardware devices such as an interface.

Hereinafter, more specific embodiments of the present disclosure will be described. However, detailed descriptions may be omitted from the above as necessary. For example, detailed descriptions of matters that are already well known and overlapping descriptions of substantially identical configurations may be omitted. This is to avoid the following description becoming unnecessarily verbose and to facilitate the understanding of persons skilled in the art. It should be noted that the present inventor has provided the appended drawings and the following description in order for persons skilled in the art to sufficiently understand the present disclosure, not with the intention of thereby restricting the subject described in the claims. In the following description, constituent elements that are the same or similar are denoted by the same reference numerals.

First Embodiment

Figure 1A:
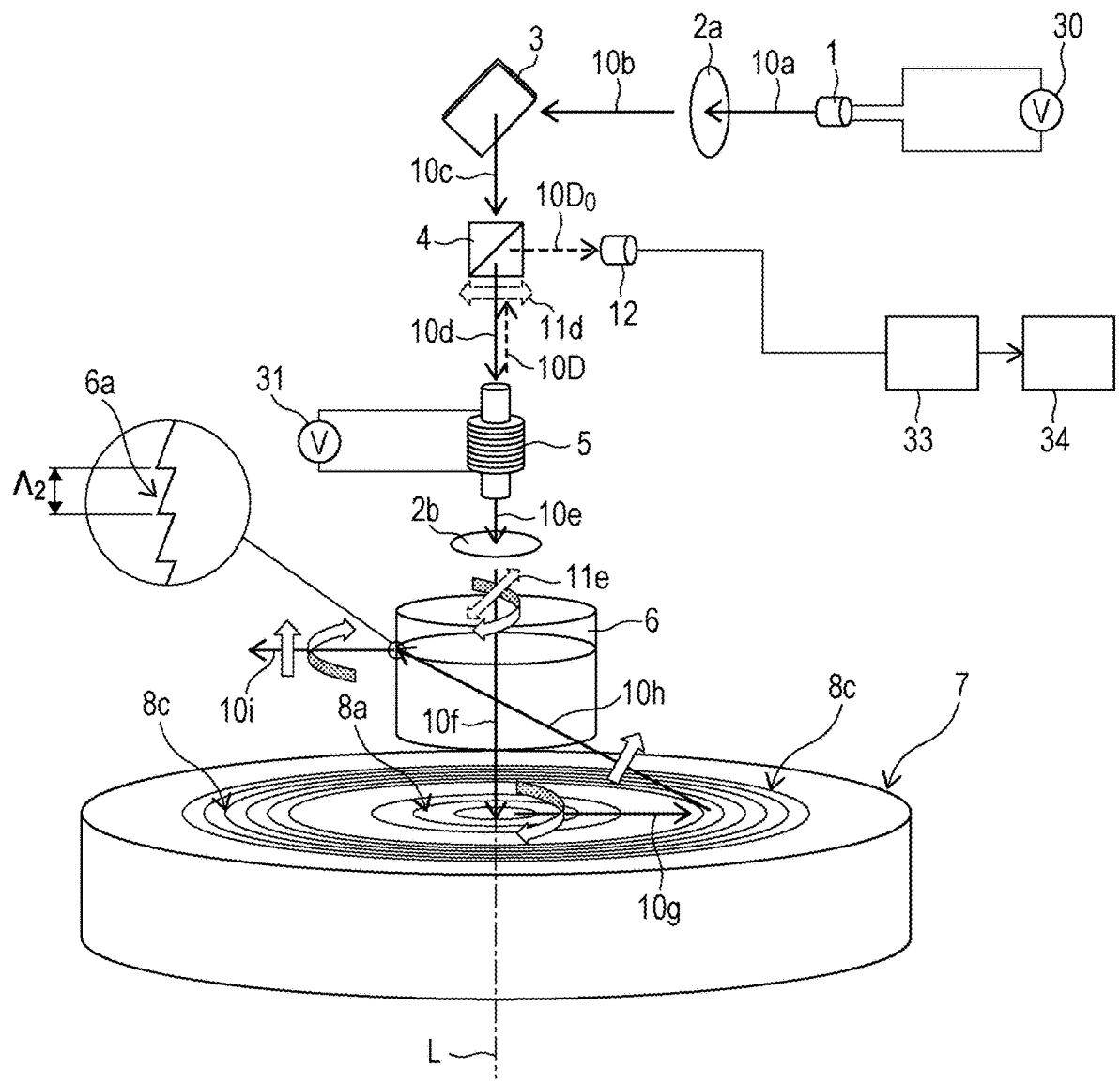
FIG. 1A is a perspective view schematically depicting the configuration of an optical device and the paths of light beams.
Figure 1B:
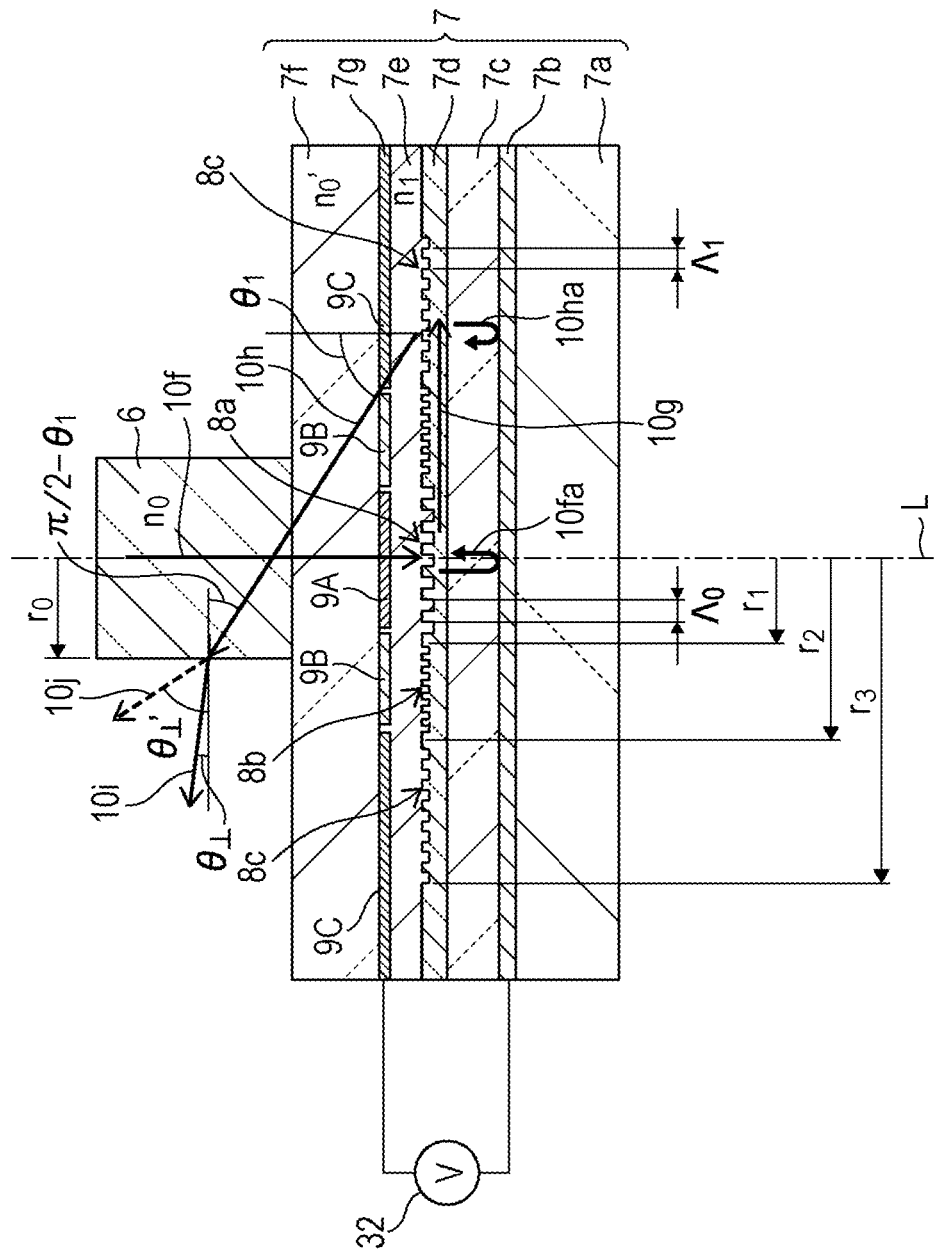
FIG. 1B is a cross-sectional view schematically depicting the configuration of the optical device and the paths of light beams.
Figure 1C:
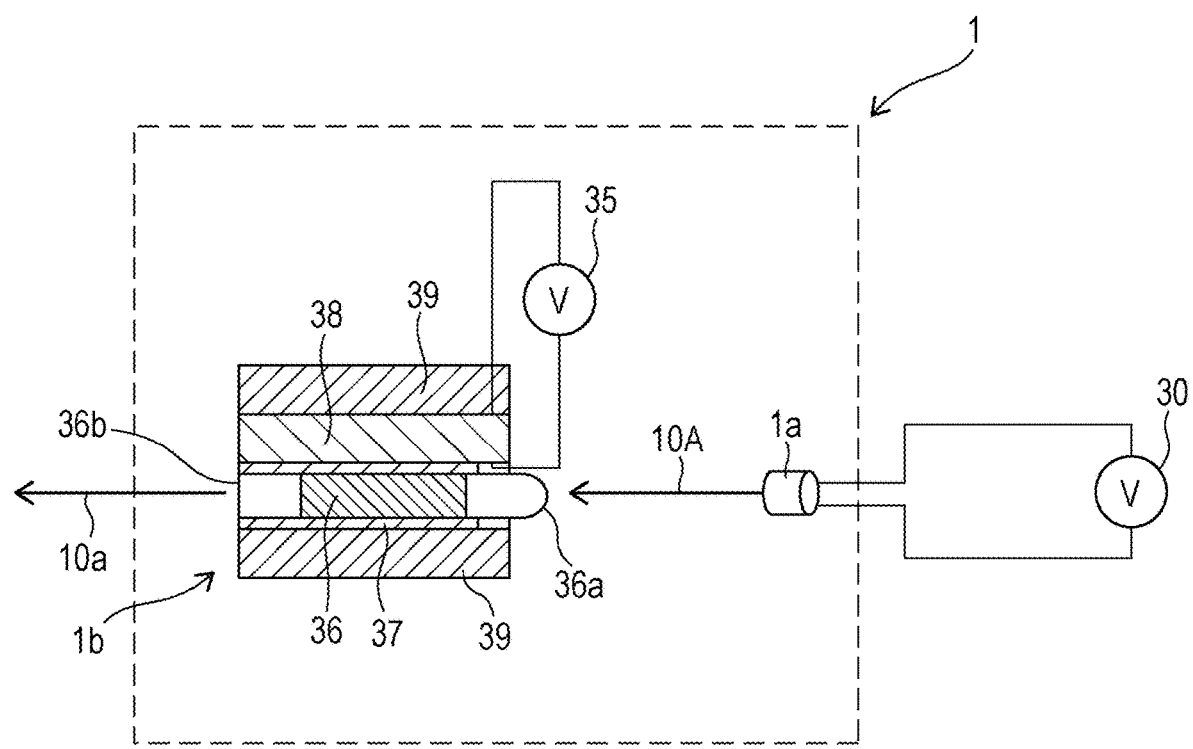
FIG. 1C is a perspective view schematically depicting the configuration of a light source in the optical device.
Figure 2A:
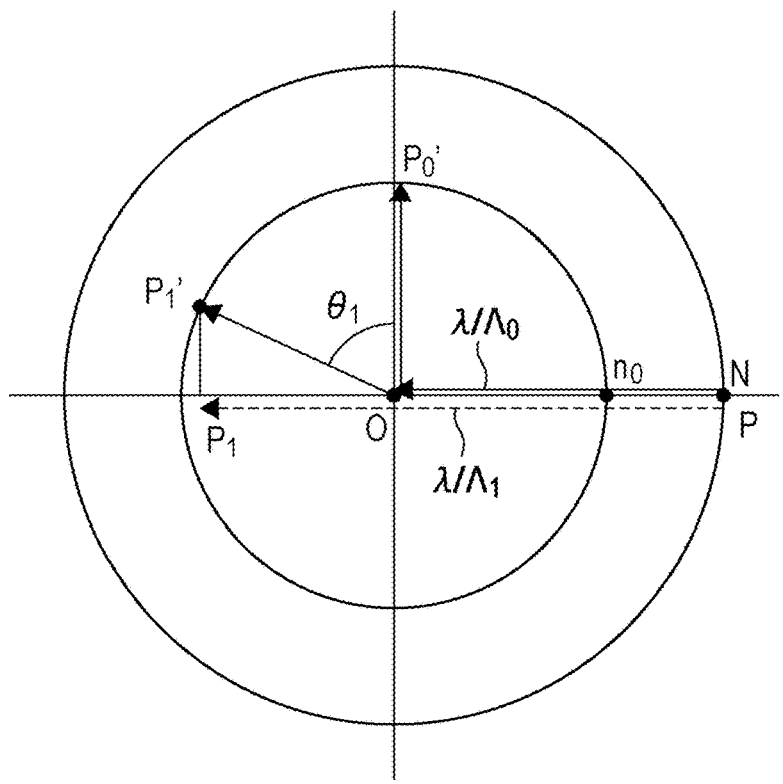
FIG. 2A is a drawing depicting a vector diagram.
Figure 2B:
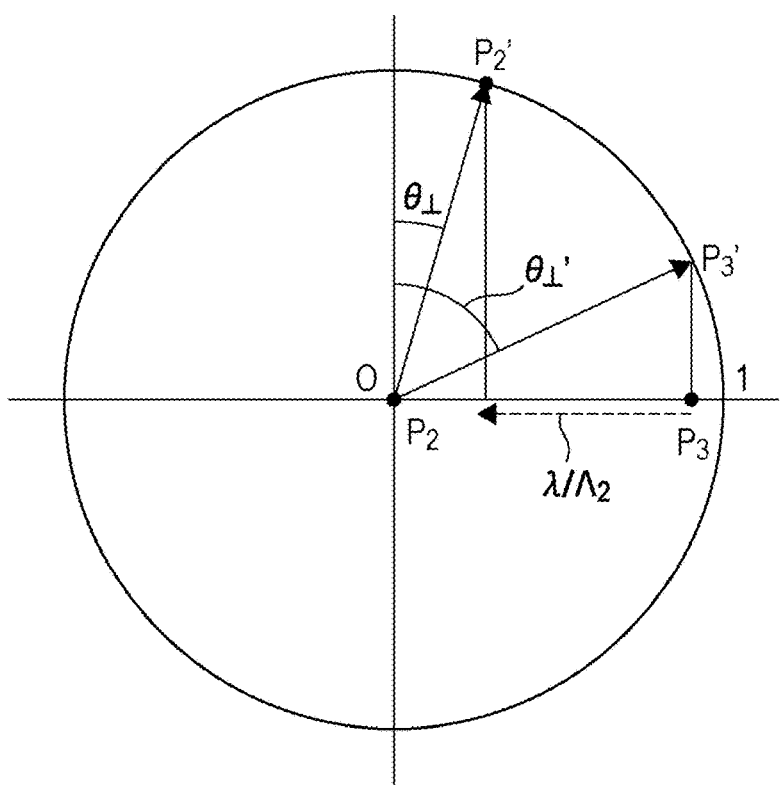
FIG. 2B is a drawing depicting a vector diagram.

FIGS. 1A and 1B are respectively a perspective view and a cross-sectional view schematically depicting the configuration of an optical device and the paths of light beams in a first embodiment. FIG. 1C is a perspective view schematically depicting the configuration of a light source in the optical device. FIG. 1D is a perspective view schematically depicting another form for a columnar body in the optical device. FIG. 2A is a drawing depicting a vector diagram of the relationship between incident light and guided light in an input grating coupler, and the relationship between guided light and radiated light in an output grating coupler. FIG. 2B is a drawing depicting a vector diagram of the relationship for diffraction at a columnar surface.

The paths of light beams in the first embodiment will be described.

In the examples depicted in FIGS. 1A and 1B, an optical device is provided with a light source 1, a collimating lens 2a, a reflection mirror 3, a polarization light splitter 4, a polarization rotator 5, a condenser lens 2b, a columnar body 6, an optical waveguide element 7, and control circuits 30, 31, and 32. The control circuits 30, 31, and 32 may be consolidated as one control circuit. In the following description, for convenience, an axis L will be taken as the vertical direction and the direction orthogonal thereto will be taken as the horizontal direction. The polarization rotator 5, the condenser lens 2b, the columnar body 6, and the optical waveguide element 7 are arranged with the axis L as a central axis.

The light source 1 emits laser light 10a that is linearly polarized light having a wavelength λ, in accordance with an oscillation signal from the control circuit 30 controlling laser oscillation. The light source 1 may be a Fabry-Perot laser light source, and may be the configuration depicted in FIG. 1C, for example. The light source 1 depicted in FIG. 1C is a configuration in which a fiber Bragg grating 1b is combined with a Fabry-Perot laser light source 1a. The fiber Bragg grating 1b is configured of a fiber-shaped core 36 and cladding 37 surrounding the circumference of the core. The refractive index of the core 36 is higher than the refractive index of the cladding 37. The core 36 has formed therein a grating that produces a periodic refractive index distribution along the central axis of the fiber. Light 10A emitted from the laser light source 1a is incident on an incident end 36a of the core 36 which is AR-coated, and becomes guided light that propagates within the core. Bragg reflected diffraction light produced by the grating returns to the laser light source 1a side. Due to this returning light, the laser light source 1a oscillates at a wavelength corresponding to the pitch of the grating. As a result, light 10a having a stable wavelength is emitted from an emission end 36b of the fiber Bragg grating 1b. In the configuration depicted in FIG. 1C, the fiber Bragg grating 1b is held by fixing plates 39 with a piezoelectric element 38 therebetween. A control circuit 35 causes the piezoelectric element 38 to deform by applying a voltage, which thereby applies pressure to the fiber Bragg grating 1b. The conditions for reflection and diffraction by the grating change according to this application of pressure. The wavelength of the emission light 10a can thereby be controlled. The displacement responsiveness of the piezoelectric element 38 is from several KHz to several tens of KHz. Consequently, it is possible to change the wavelength corresponding to that responsiveness.

The light 10a becomes parallel light 10b due to the collimating lens 2a, is reflected by the reflection mirror 3 and becomes light 10c that is incident on the polarization light splitter 4, and becomes light 10d that passes through the polarization light splitter 4. The polarization light splitter 4 is positioned on the optical path from the light source 1 to the polarization rotator 5. The polarization light splitter 4 is a polarization beam splitter, for example. The distribution of the laser light 10a diverges in an ellipse, and a beam-shaping prism that converts this distribution into a circular shape may be inserted between the collimating lens 2a and the reflection mirror 3. The light 10d that passes through the polarization light splitter 4 is incident on the polarization rotator 5 along the central axis L while being linearly polarized light in the polarization direction 11d. The polarization rotator 5 is positioned on the optical path of the light 10a emitted from the light source 1. A voltage is applied to the polarization rotator 5 in accordance with a control signal from the control circuit 31 controlling polarization. Thus, the polarization direction 11e of the light 10e that is emitted from the polarization rotator 5 rotates compared to the polarization direction 11d. The light 10e passes through the condenser lens 2b along the central axis L and is incident on the columnar body 6, which is an example of a first transparent member having a refractive index $n_0$ and a radius $r_0$. The central axis L is positioned on the optical path of the light 10e that has passed through the polarization rotator 5, and can be said to be an axis along the optical path.

The optical waveguide element 7 is positioned on the optical path of the light 10e that has passed through the polarization rotator 5. The optical waveguide element 7 includes a transparent flat substrate 7f and a flat substrate 7a. The transparent flat substrate 7f is a transparent substrate having a refractive index $n_0'$. The optical waveguide element 7 includes a buffer layer 7c that has a low refractive index, a waveguide layer 7d that has a higher refractive index than the buffer layer 7c, and liquid crystal layer 7e on the waveguide layer 7d. The refractive index of the waveguide layer 7d is higher than the refractive index of the buffer layer 7c and the refractive index of the liquid crystal layer 7e. The optical waveguide element 7 includes a reflection layer 7b at the opposite side of the buffer layer 7c to the side in contact with the waveguide layer 7d. For example, a reflection layer 7b of Al or the like, a transparent buffer layer 7c of $SiO_2$ or the like, and a transparent waveguide layer 7d of $Ta_2O_5$ or the like are deposited in this order on an upper surface of the flat substrate 7a.

The optical waveguide element 7 includes a grating 8a that is an example of a first grating, a grating 8b that is an example of a fifth grating, and a grating 8c that is an example of a second grating. In the examples depicted in FIGS. 1A and 1B, the gratings 8a, 8b, and 8c are irregular gratings having concentric circular structures similarly centered on the axis L, and are formed on the surface of the waveguide layer 7d. The gratings 8a and 8c act as grating couplers. The grating 8b is a grating for liquid crystal orientation. According to use, the gratings 8a, 8b, and 8c and the optical waveguide element 7 may have circular-sector shapes or the like, obtained by cutting portions from concentric circular shapes.

The grating 8a is formed within a circular region having a radius $r_1$ centered on the axis L. The pitch of the grating 8a is $\Lambda_0$ and the depth is $d_0$. The grating 8c is formed within an annular region of a range from a radius $r_2$ to a radius $r_3$. The pitch of the grating 8c is $\Lambda_1$ and the depth is $d_1$. The grating 8b is formed within an annular region of a range from the radii $r_1$ to $r_2$. The pitch of the grating 8b is $0.8\Lambda_1$ and the depth is $d_1$, for example. Typical sizes of the radii $r_1$, $r_2$, and $r_3$ are of the order of millimeters. By setting the pitch of the grating 8b to be less than or equal to $0.8\Lambda_1$, the surface irregularities of the grating 8b are effective for orienting liquid crystal and do not function as a coupler. Consequently, the surface irregularities of the grating 8b do not cause guided light to be radiated.

The gratings 8a, 8b, and 8c may be formed on the surface side of the buffer layer 7c provided that an irregular shape is present on the liquid crystal-side surface of the waveguide layer 7d. By forming an irregular shape on the surface of the waveguide layer 7d, the gratings act to orient liquid crystal. In other words, liquid crystal is oriented in the direction of the gratings. A transparent electrode layer 7g of ITO or the like is formed at the lower surface side, namely the waveguide layer side, of the transparent flat substrate 7f. The transparent electrode layer 7g faces the waveguide layer 7d with the liquid crystal layer 7e therebetween. The transparent electrode layer 7g is divided into three electrodes 9A, 9B, and 9C similarly centered on the axis L. The electrodes 9A, 9B, and 9C face the gratings 8a, 8b, and 8c, respectively. In a state where a voltage is not applied to the liquid crystal layer 7e, the liquid crystal molecules of the liquid crystal layer 7e are oriented in the direction of the surface irregularities in the surface of the waveguide layer 7d. In other words, the orientation direction of the liquid crystal in the liquid crystal layer 7e is parallel with the surface of the waveguide layer 7d and perpendicular to grating vectors of the gratings 8a, 8b, and 8c. The reflection layer 7b and the transparent electrode layer 7g act as electrodes for controlling the orientation of the liquid crystal. The electrodes 9A, 9B, and 9C are electrodes that are independent from each other. The reflection layer 7b may be divided into three electrodes instead of the transparent electrode layer 7g, or the transparent electrode layer 7g and the reflection layer 7b may each be divided into three electrodes.

It should be noted that the grating 8b may be formed on the lower surface side of the transparent flat substrate 7f. Furthermore, a grating having a concentric circular shape centered on the axis L may also be formed at a position facing the gratings 8a and 8c at the lower surface side of the transparent flat substrate 7f. If surface irregularities are formed on the lower surface, the irregular shape is also transferred to the surface of the transparent electrode layer 7g. The liquid crystal molecules of the liquid crystal layer 7e can thereby be oriented in the direction of these surface irregularities. Naturally, the liquid crystal molecules of the liquid crystal layer 7e can also be oriented by depositing an orientation film of a polyimide or the like on the surfaces of the waveguide layer 7d and the transparent electrode layer 7g and carrying out rubbing processing thereon in a rotation direction.

Light 10f that has passed through the lower surface of the columnar body 6 converges on the grating 8a, which is a grating coupler, along the central axis L. The light 10f that converges on the grating 8a excites guided light 10g that travels from the center O of a concentric circle, which is an intersection between the waveguide layer 7d and the axis L, toward the outer circumferential side within the waveguide layer 7d.

The condition for coupling with the guided light 10g is that a grating vector PO represented by an arrow having the magnitude $\lambda/\Lambda_0$ is equal to an effective refractive index N, as depicted in FIG. 2A. The coupling condition is described by expression 1.

Light 10fa that passes through the grating 8a is also reflected by the reflection layer 7b, is once again incident on the grating 8a, and intensifies the excitation of the guided light 10g. The guided light 10g propagates in a concentric radial direction, radiates at an angle $\theta_1$ from the grating 8c, which is a grating coupler, and becomes radiated light 10h that travels toward the columnar body 6.

The condition for coupling with the radiated light is that the perpendicular foot of a vector $OP_{1'}$ coincides with the end point $P_1$ of a grating vector $PP_1$ represented by a dashed arrow having the magnitude $\lambda/\Lambda_1$, as depicted in FIG. 2A. The coupling condition is described by expression 2.

$$-n_0 \sin \theta_1 = N - \lambda/\Lambda_1 \qquad (2)$$

Light 10*ha* radiated toward the reflection layer 7*b* side is also reflected by the reflection layer 7*b* and superposes the radiated light 10*h*. A voltage is applied to the liquid crystal layer 7*e* via the pair of electrode layers of the reflection layer 7*b* and the transparent electrode layer 7*g*, in accordance with a control signal from the control circuit 32 controlling the orientation of liquid crystal. Together with a change in the orientation of liquid crystal implemented thereby, the refractive index $n_1$ of the liquid crystal changes and the effective refractive index N of the guided light 10*g* changes. If the effective refractive index of the guided light 10*g* changes in the region of the grating 8*c*, the direction of light emitted outside the optical waveguide element 7 from the grating 8*c* changes. The control circuit 32 is able to send signals independently to the electrodes 9A, 9B, and 9C. It should be noted that a voltage signal applied to the liquid crystal layer is an alternating-current wave. The orientation direction of the liquid crystal inclines toward the direction normal to the surface of the waveguide layer 7*d*, and the angle of inclination of the orientation direction is decided, in accordance with the magnitude of the amplitude of the alternating-current wave. In the following description, the voltage applied to the liquid crystal layer refers the magnitude of the amplitude of the alternating-current wave applied to the liquid crystal layer.

The radiated light 10*h* passes through the lower surface of the columnar body 6 and becomes refracted light 10*j* that refracts through a columnar surface 6*a* that is the side surface of the columnar body 6 at an angle of $\theta_\perp'$ from the horizontal plane. The relational expression of the refraction is described by expression 3.

$$n_0 \cos \theta_1 = \sin \theta_\perp' \quad (3)$$

A blazed grating having a pitch of $\Lambda_2$, which is an example of a third grating, may be formed on the surface of the columnar surface 6*a*. In the blazed grating, serrated grooves are formed in a direction orthogonal to the central axis L. Due to the blazed grating, the refracted light 10*j* is refracted within the vertical plane, and becomes emission light 10*i* that is emitted outside at an angle of $\theta_\perp$ from the horizontal plane. The diffraction relationship is represented by the distance between the perpendicular foot $P_2$ of a vector $OP_2'$ and the perpendicular foot $P_3$ of a vector $OP_3'$ being equal to a grating vector $P_3P_2$ (a dashed arrow having the magnitude $\lambda/\Lambda_2$), as depicted in FIG. 2B. The relational expression of the diffraction is described by expression 4.

$$\sin \theta_\perp = \sin \theta_\perp' - \lambda/\Lambda_2 \quad (4)$$

It should be noted that the circumference of the columnar body 6 may be surrounded by a cylindrical body 6A, which is an example of a second transparent member, as depicted in FIG. 1D. The central axis of the cylindrical body 6A is the same as the central axis of the columnar body 6. Blazed gratings respectively having pitches $\Lambda_{2b}$ and $\Lambda_{2c}$, which are examples of a fourth grating, are formed on the inside surface 6*b* and the outside surface 6*c* of the cylindrical body 6A. In the example depicted in FIG. 1D, the radiated light 10*h* is diffracted three times by blazed gratings having pitches $\Lambda_2$, $\Lambda_{2b}$, and $\Lambda_{2c}$ and becomes the emission light 10*i*. Due to the diffraction being distributed over three times, the pitches of the blazed gratings can be set to be large and processing becomes easy.

The columnar body 6 is positioned on the transparent flat substrate 7*f*. Generally, a transparent member that is a rotationally symmetric body having the axis L as a central axis may be used instead of the columnar body 6. In a case where the pitch of the grating 8*c* changes, the generatrix of the rotationally symmetric body has a curved-line shape. In a case where the pitch is constant, the generatrix of the rotationally symmetric body has a straight-line shape, and the rotationally symmetric body becomes a columnar body or a conical body.

Scanning in the vertical direction by an emission beam 10*i* is realized by changing the wavelength of the light source 1 or changing the refractive index of the liquid crystal layer 7*e* in the electrode 9C. From expression 2, the derivative of the effective refractive index N with respect to a radiation angle $\theta_1$ is described by expression 5, and the derivative of the radiation angle $\theta_1$ with respect to the wavelength $\lambda$ is described by expression 6. From expressions 3 to 6, the derivative of the emission angle $\theta_\perp$ in the vertical direction with respect to the wavelength $\lambda$ is described by expression 7.

$$\frac{dN}{d\theta_1} = -\sqrt{n_0^2 - \left(\frac{\lambda}{\Lambda_1} - N\right)^2} \quad (5)$$

$$\frac{d\theta_1}{d\lambda} = \frac{1}{n_0 \cos\theta_1}\left(\frac{1}{\Lambda_1} - \frac{dN}{d\lambda}\right) \quad (6)$$

$$\frac{d\theta_\perp}{d\lambda} = -\left\{\tan\theta_1\left(\frac{1}{\Lambda_1} - \frac{dN}{d\lambda}\right) + \frac{1}{\Lambda_2}\right\} \bigg/ \sqrt{1 - \left(n_0\cos\theta_1 - \frac{\lambda}{\Lambda_2}\right)^2} \quad (7)$$

Light emitted from the optical waveguide element 7 and reflected by an external object returns to the optical waveguide element 7. A portion of the light that is incident on the optical waveguide element 7 is propagated toward the central axis L within the optical waveguide element 7 by the grating 8*c*, is emitted from the optical waveguide element 7 by the grating 8*a*, passes through the polarization rotator 5 and the polarization light splitter 4, and is incident on a photodetector 12. The photodetector 12 generates an electrical signal corresponding to the amount of incident light. This process will be described in more detail.

Light reflected by the surface of the external object travels back along the optical path of the emission beam 10*i* and is incident on the columnar surface 6*a*, and thereafter travels back along the optical path of the radiated light 10*h*, the guided light 10*g*, and also the light 10*f*, 10*e*, and 10*d* at the input side. At the input in the grating 8*c*, only light having the same wavelength and the same phase front as at the time of output on the outward path is selectively coupled. Consequently, stray light in which at least one of the wavelength and the phase is different is effectively removed. Due to control implemented by the polarization rotator 5, the polarization direction of backward-traveling light 10D is rotated 90 degrees compared to the polarization direction of the light 10*d* when on the outward path. Therefore, the backward-traveling light 10D is reflected by the polarization light splitter 4 and becomes light $10D_0$, and is detected by the photodetector 12. The photodetector 12 includes a detection circuit 33. A detection signal is subjected to signal processing by the detection circuit 33. In the examples depicted in FIGS. 1A and 1B, the optical device may be further provided with a control circuit 34. The control circuit 34 generates a control signal that controls the light source or the orientation of liquid crystal, for example, from the detection signal of the detection circuit 33. The control circuits 30, 31, 32, 34, and 35 may be consolidated as one control circuit.

It should be noted that a half mirror may be used instead of a polarization beam splitter for the polarization light splitter 4. At such time, the backward-traveling light 10D of the light 10d is reflected by the half mirror and detected by the photodetector 12 regardless of the control implemented by the polarization rotator 5. In a case where a half mirror is used, the amount of light is halved on the outward path and is further halved on the return path. In other words, the amount of light becomes a quarter on the outward-return path. Despite polarization control being simplified, the amount of light detected decreases.

Figure 3A:
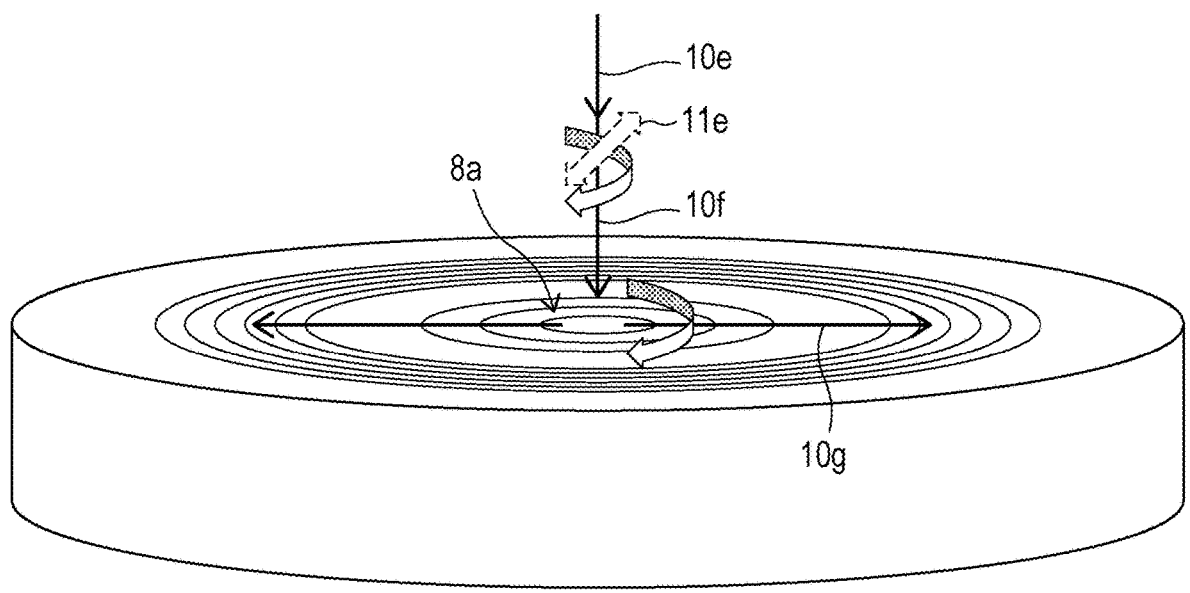
FIG. 3A is a perspective view schematically depicting the polarization direction of incident light and the state of input in a first embodiment.
Figure 3B:
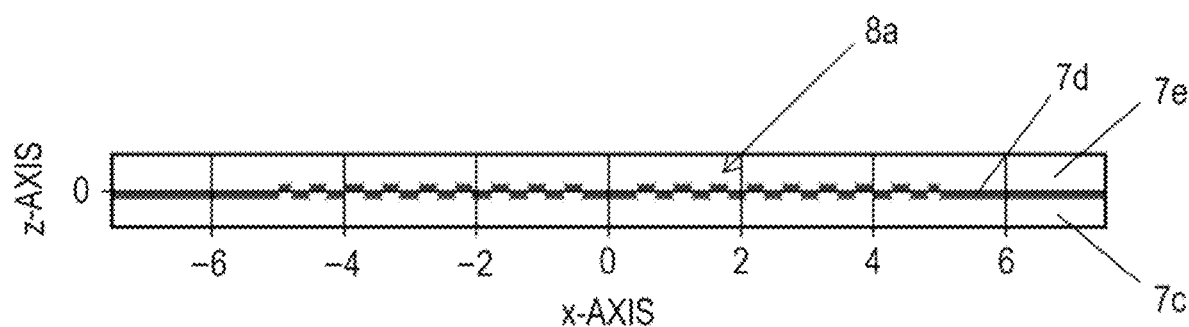
FIG. 3B is a cross-sectional view schematically depicting an input grating coupler.
Figure 3C:
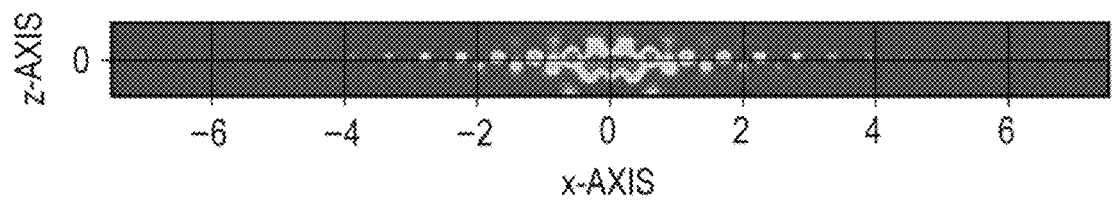
FIG. 3C is a cross-sectional view in which the state of light that is input-coupled and guided is depicted according to light intensity.
Figure 3D:
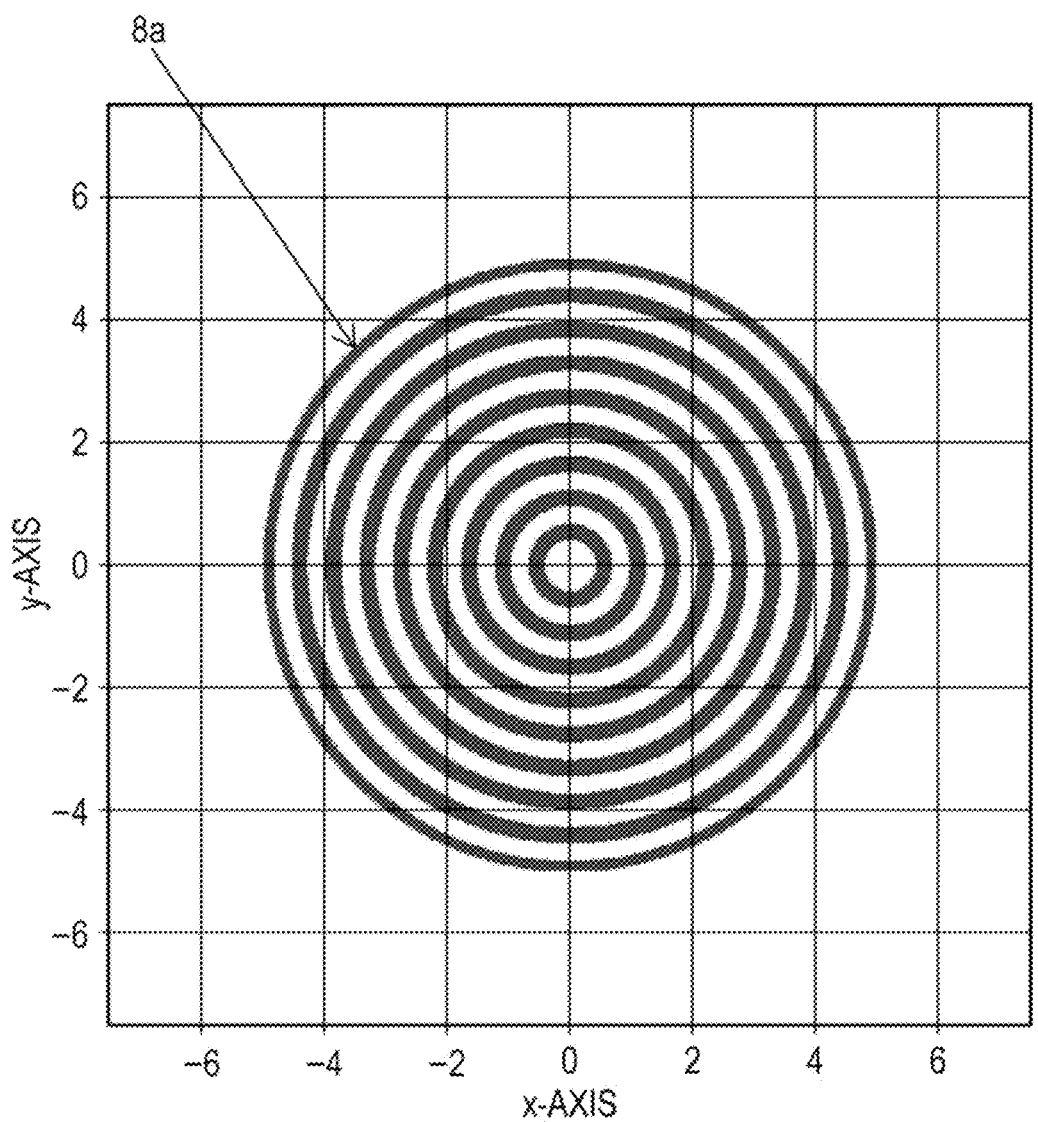
FIG. 3D is a cross-sectional view schematically depicting an input grating coupler.
Figure 3E:
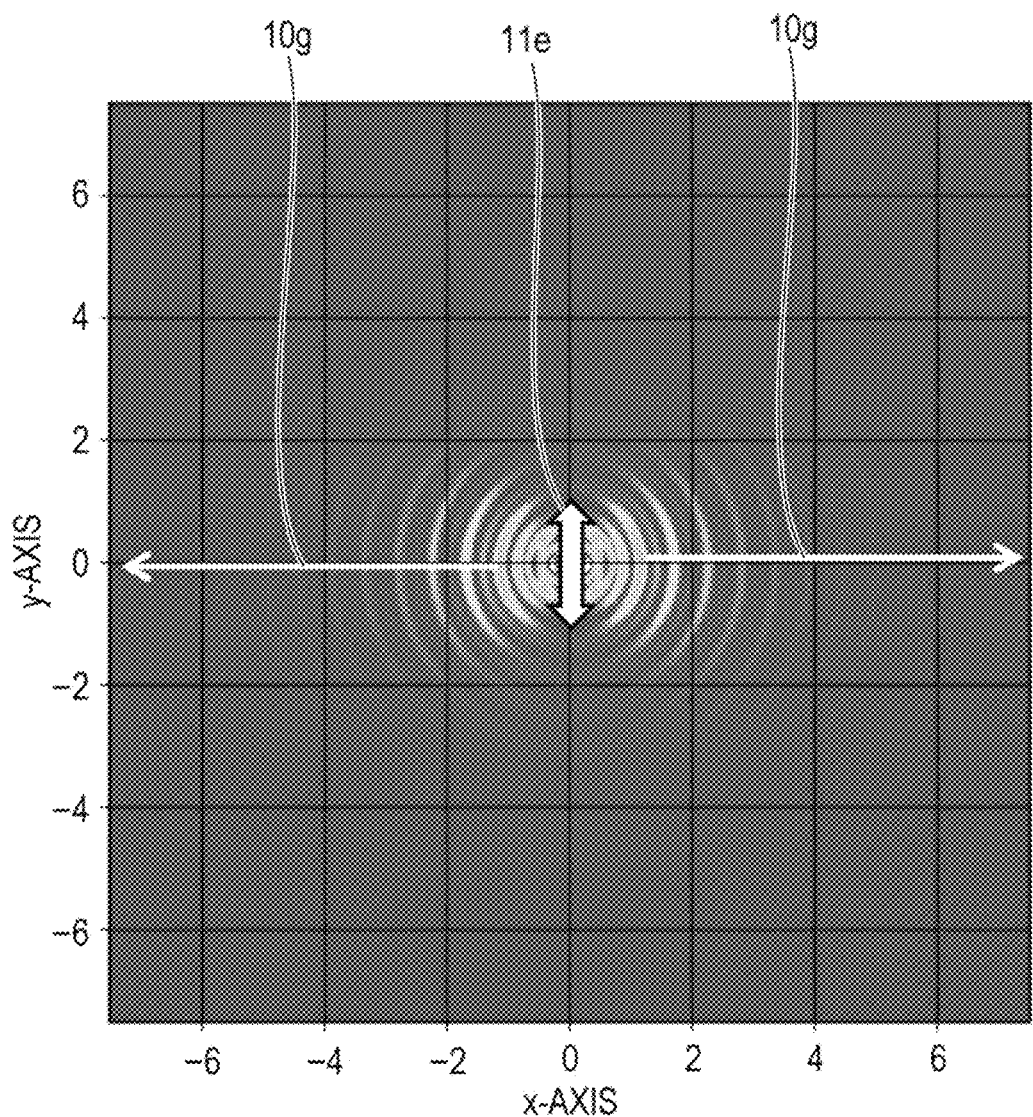
FIG. 3E is a plan view in which the relationship between the polarization direction and the input propagation direction is depicted according to light intensity.
Figure 3F:
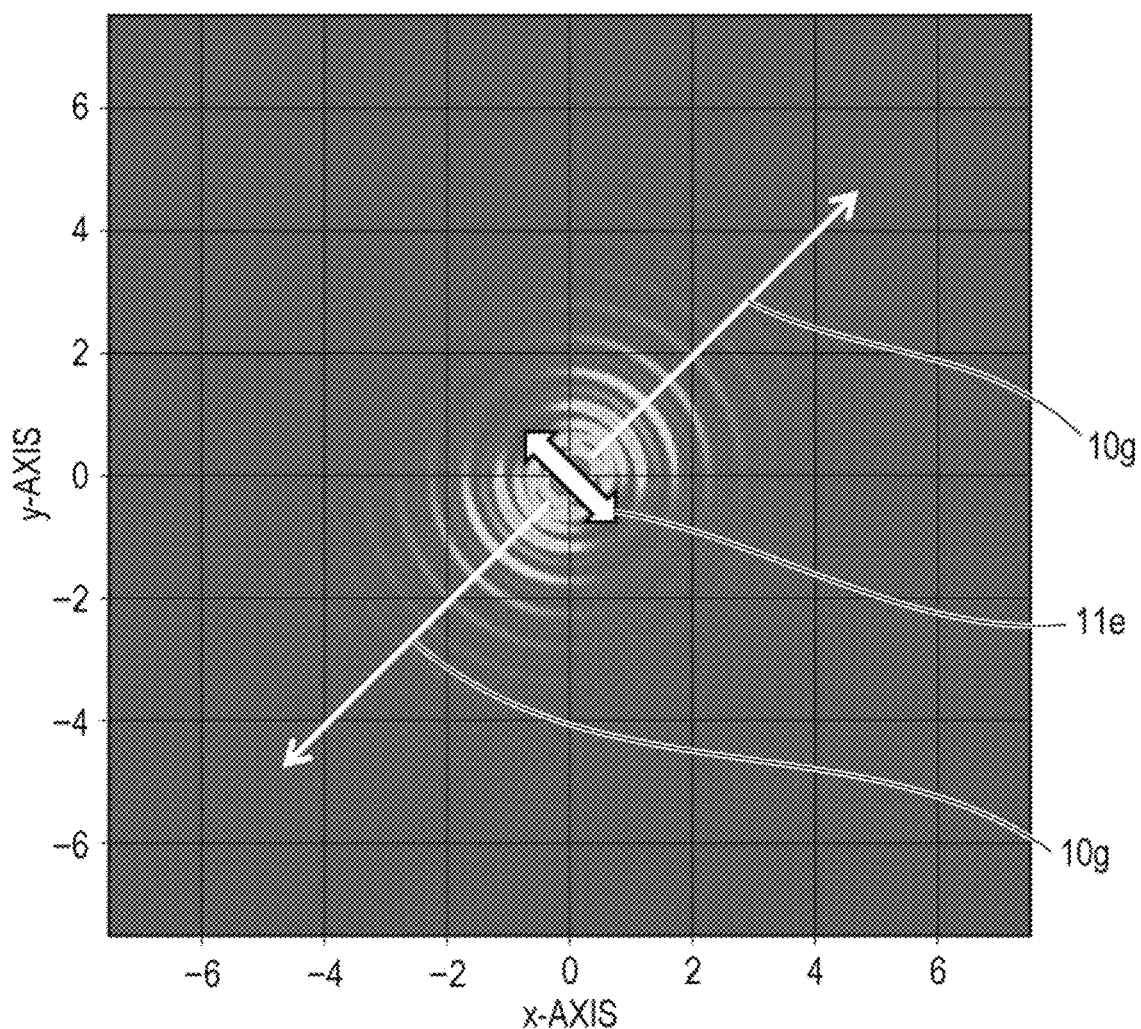
FIG. 3F is a plan view in which the relationship between the polarization direction and the input propagation direction is depicted according to light intensity.
Figure 3G:
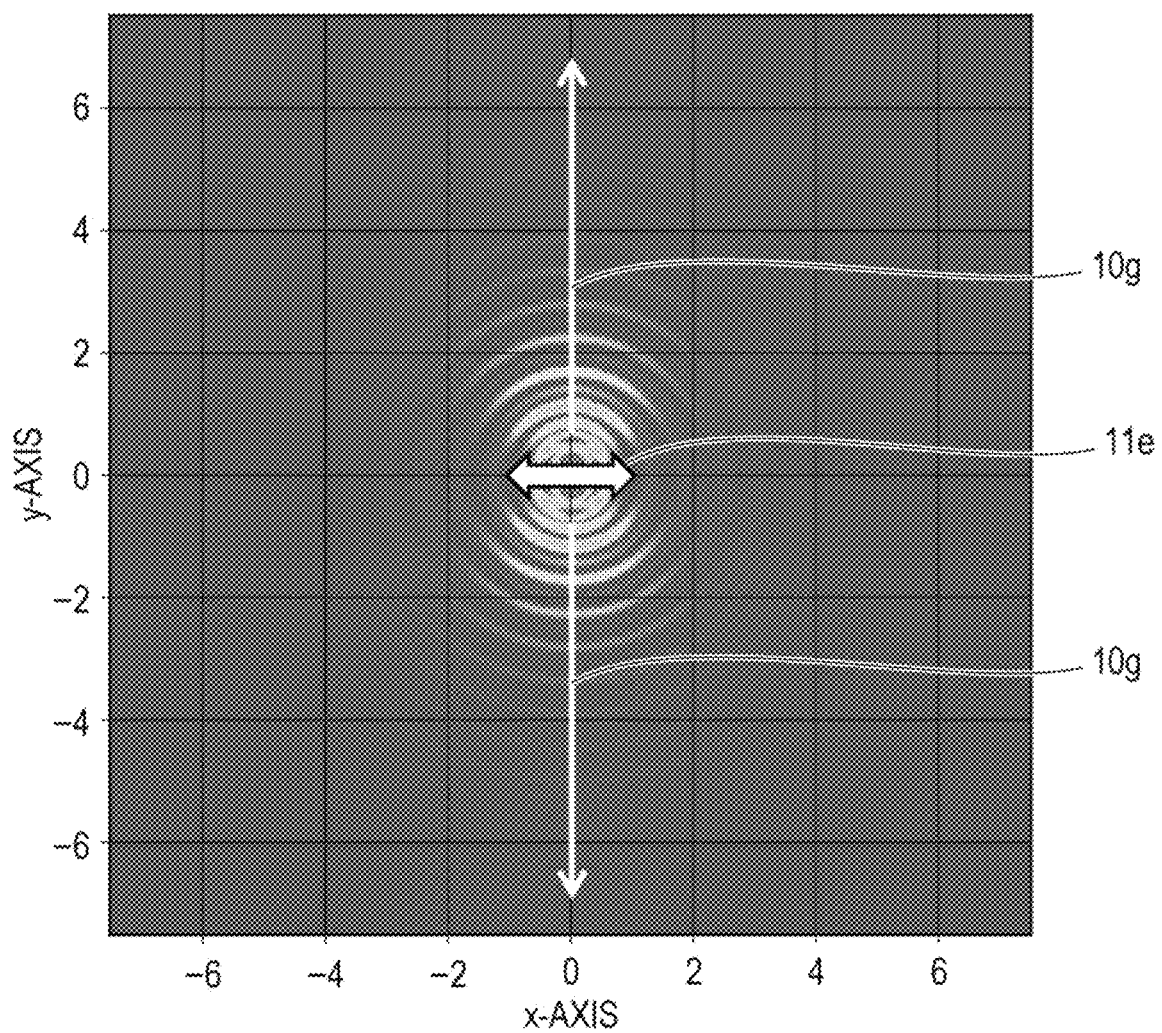
FIG. 3G is a plan view in which the relationship between the polarization direction and the input propagation direction is depicted according to light intensity.

FIG. 3A is a perspective view schematically depicting the polarization direction of incident light and the state of input in the first embodiment. FIG. 3B is a cross-sectional view schematically depicting the input grating 8a. FIG. 3C is a cross-sectional view in which the state of light that is input-coupled and guided is depicted according to light intensity. FIG. 3D is a cross-sectional view schematically depicting an input grating coupler. FIGS. 3E to 3G are plan views in which the relationship between the polarization direction and the input propagation direction is depicted according to light intensity. In the examples depicted in FIGS. 3B and 3D, the diameter of the grating 8a is $2r_1=10$ µm, the pitch is $\Lambda_0=0.57$ µm, and the depth is $d_0=0.10$ µm. The material of the waveguide layer 7d is $Ta_2O_5$ and the layer thickness is 0.15 µm. The refractive indices of the liquid crystal layer 7e and the buffer layer 7c are the same as the refractive index of $SiO_2$. At such time, TE-mode guided light is excited by perpendicular incidence. In the examples depicted in FIGS. 3C and 3E to 3G, an analysis result where the wavelength $\lambda=0.94$ µm is depicted.

As depicted in FIGS. 3C and 3E, in a case where the polarization direction 11e of the light 10f which is incident light is parallel with the y-axis direction, the guided light that is excited propagates strongly in the x-axis direction. As depicted in FIG. 3F, in a case where the polarization direction 11e of the light 10f is parallel with the 135-degree direction, the guided light that is excited propagates strongly in the 45-degree direction. As depicted in FIG. 3G, in a case where the polarization direction 11e of the light 10f is parallel with the x-axis direction, the guided light that is excited propagates strongly in the y-axis direction. As depicted in FIGS. 3C and 3E to 3G, the grating 8a causes a portion of the light 10f to propagate by diverging centered on a direction perpendicular to the polarization direction 11e, within the waveguide layer 7d in the optical waveguide element 7. For example, when the guided light that is excited is in the TM mode, the propagation direction is rotated 90 degrees and aligned with the polarization direction in effect at the time of incidence. If the polarization direction of incident light can be controlled, the propagation direction of guided light can be changed. The responsiveness of changing the propagation direction is decided by the responsiveness of controlling the polarization direction.

With an optical device provided with the light source 1, the polarization rotator 5, and the optical waveguide element 7, by applying a voltage to the polarization rotator 5, the propagation direction of guided light that propagates through the waveguide layer 7d can be changed to an arbitrary direction parallel with the waveguide layer 7d.

Figure 4A:
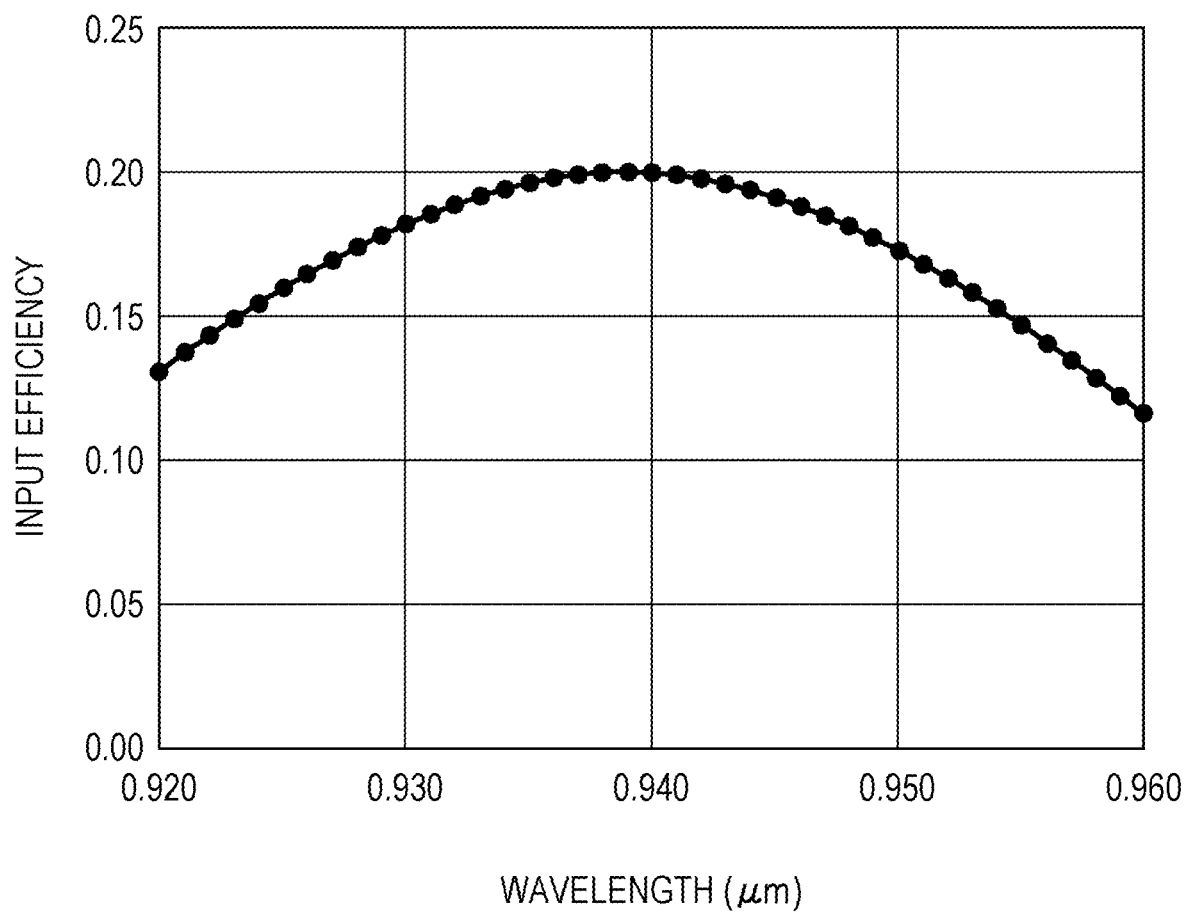
FIG. 4A is a drawing depicting the wavelength dependency of the input coupling efficiency of the input grating coupler in a case where there is no reflection layer.
Figure 4B:
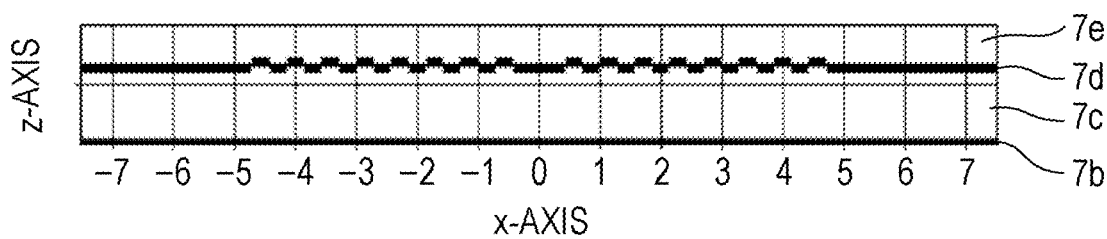
FIG. 4B is a cross-sectional view schematically depicting the input grating coupler in a case where there is a reflection layer.
Figure 4C:
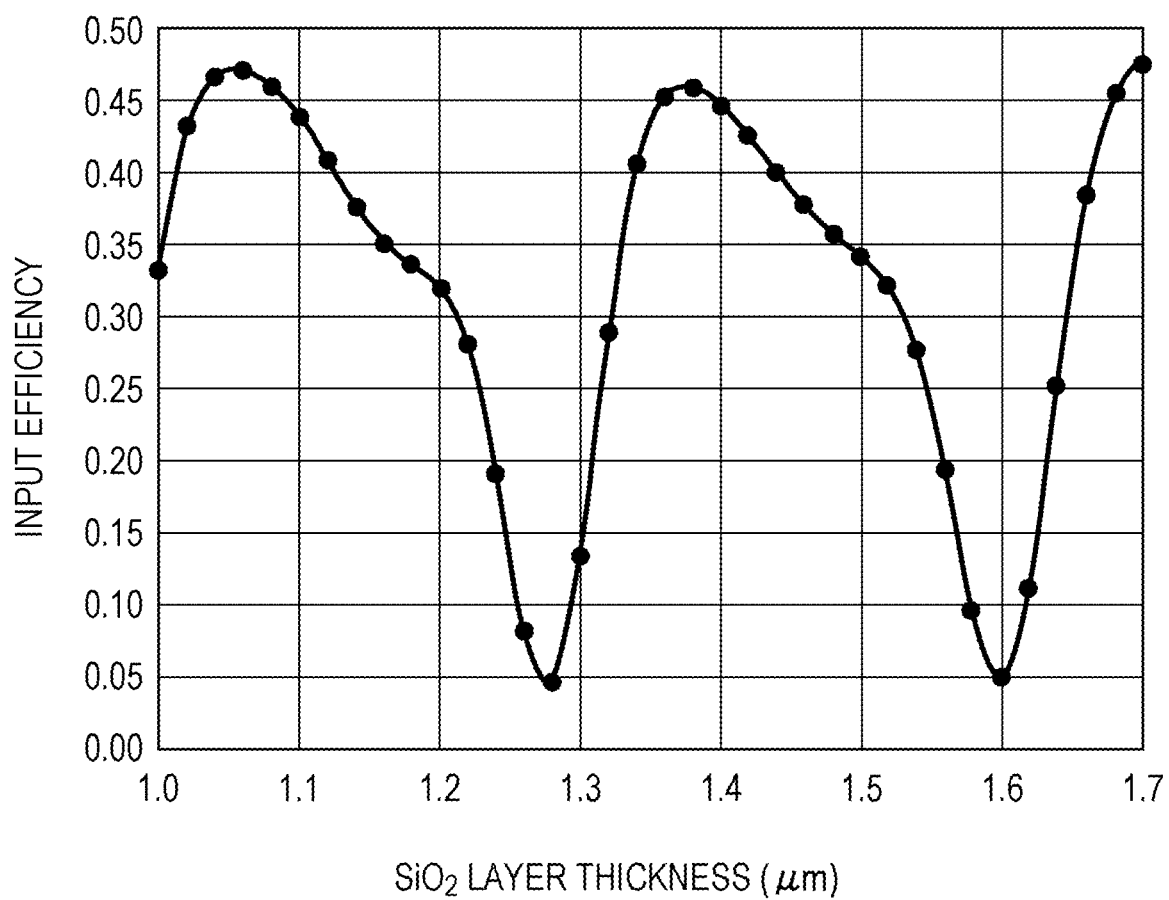
FIG. 4C is a drawing depicting the dependency of the input coupling efficiency on the thickness of a buffer layer in a case where there is a reflection layer.
Figure 4D:
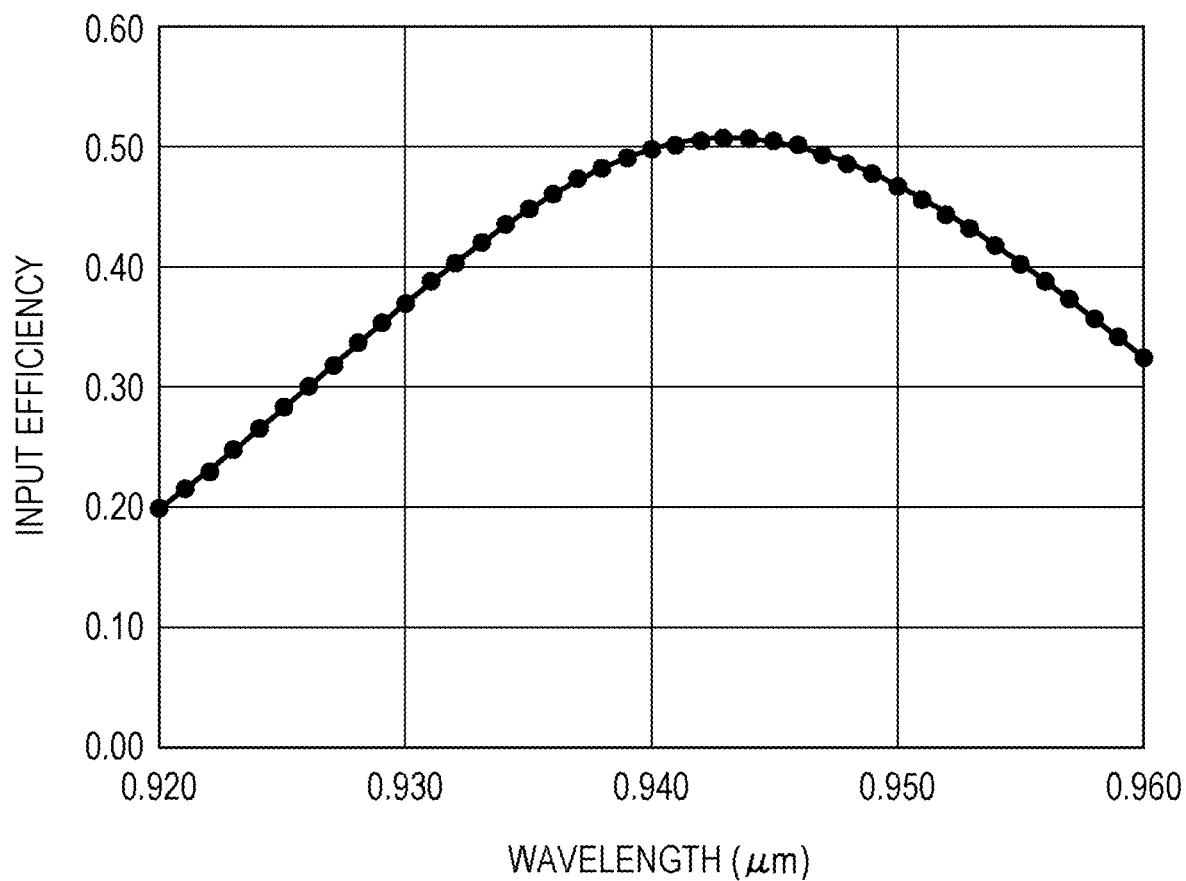
FIG. 4D is a drawing depicting the wavelength dependency of the input coupling efficiency in a case where there is a reflection layer.

FIG. 4A is a drawing depicting the wavelength dependency of the input coupling efficiency of the grating 8a, which is an input grating coupler, in a case where there is no reflection layer in the first embodiment. FIG. 4B is a cross-sectional view schematically depicting the grating 8a in a case where there is a reflection layer in the first embodiment. FIG. 4C is a drawing depicting the dependency of the input coupling efficiency on the thickness of an $SiO_2$ layer, which is the buffer layer, in a case where there is a reflection layer. FIG. 4D is a drawing depicting the wavelength dependency of the input coupling efficiency in a case where there is a reflection layer.

The analysis conditions in the example depicted in FIG. 4A are the same as the analysis conditions in the examples depicted in FIGS. 3A to 3G. As depicted in FIG. 4A, when the wavelength is 0.94 µm, a maximum input efficiency of 20% can be obtained. The shape conditions in the example depicted in FIG. 4B are the same as the shape conditions in the examples depicted in FIGS. 3A to 3G, apart from being provided with the Al reflection layer 7b. As depicted in FIG. 4C, due to changes in the thickness of the buffer layer 7c, the input efficiency increases and decreases periodically. When the thickness of the buffer layer 7c is 1.06 µm, the input efficiency is at its maximum. The example depicted in FIG. 4D depicts the wavelength dependency in a case where the thickness of the buffer layer 7c is fixed at 1.06 µm. When the wavelength is 0.944 µm, the input efficiency becomes the maximum, and the maximum value is 50%. If only TE-mode components of incident light are input-coupled and guided, by introducing a reflection layer and optimizing the thickness of the buffer layer, a coupling efficiency of almost 100% can be obtained.

Figure 5A:
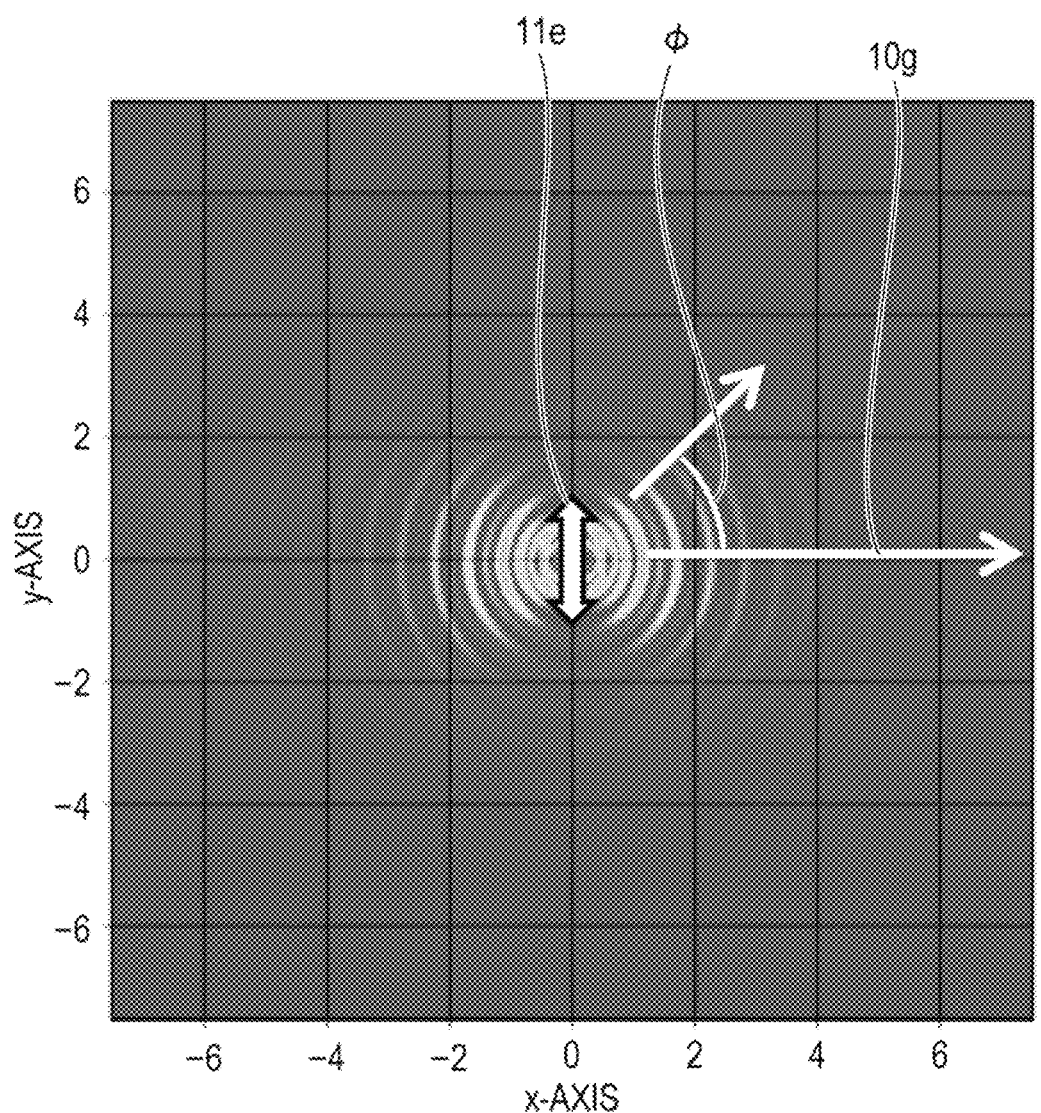
FIG. 5A is a plan view in which the relationship between the polarization direction and input propagation direction of incident light is depicted according to light intensity.

FIG. 5A is a plan view in which the relationship between the polarization direction and input propagation direction of incident light in the first embodiment is depicted according to light intensity. As depicted in FIGS. 3E to 3G, in a case where TE-mode guided light is excited by perpendicular incidence, an argument φ with respect to the x-axis is defined with the polarization direction being parallel with the y-axis.

Figure 5B:
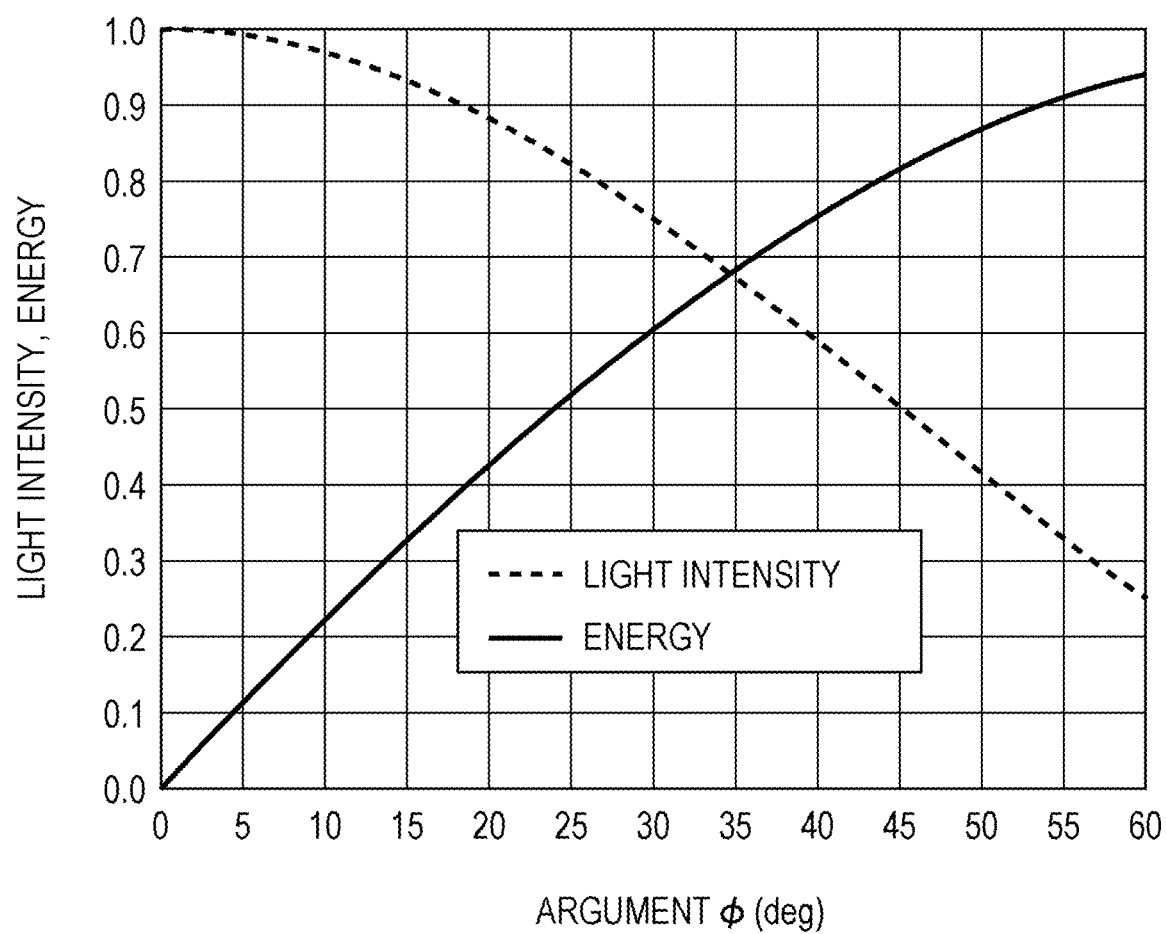
FIG. 5B is a drawing depicting the relationship between an argument and the intensity of guided light that propagates, and the relationship of light energy included in an argument range from −φ to φ with respect to the argument.

FIG. 5B is a drawing depicting the relationship between the argument φ and the intensity I of guided light that propagates, and the relationship of light energy E included in an argument range from –φ to φ with respect to the argument φ. The argument range from –φ to φ also includes light that propagates in a diagonal direction. Light intensity is described by expression 8, and light energy is described by expression 9. In a case where light that propagates in a diagonal direction is not included, if light in the range from –45 to 45 degrees can be captured, it is possible to use excitation guided light of 41%. In other words, together with an input efficiency of 50%, it is possible to use 21% of the incident light.

$$I = \cos^2\phi \tag{8}$$

$$E = \frac{\int_{-\phi}^{+\phi}\cos^2 x\,dx}{\int_{-\pi/2}^{\pi/2}\cos^2 x\,dx} = \frac{\sin 2\phi + 2\phi}{\pi} \tag{9}$$

However, components of the incident light that could not be coupled such as TM-mode components are reflected by the grating 8a and return to the polarization light splitter 4 via the columnar body 6, the condenser lens 2b, and the polarization rotator 5. By causing the polarization rotator 5 to move in a reciprocal manner within the time during which the light source 1 emits light, the polarization direction of light is rotated by twice the rotation angle in the outward path. Consequently, the photodetector 12 is able to detect reflected light that corresponds to the rotation angle φ implemented by the polarization rotator 5. The details will be described later with reference to the example depicted in FIG. 16A.

However, the maximum value of the amount of light detected when the light source emits light is proportional to the efficiency of the light that could not be input to the grating 8*a* out of the incident light. By monitoring the maximum value of the amount of light detected, this can be used for controlling the input efficiency. The details will be described later with reference to the example depicted in FIG. 16A.

Next, the principles of the polarization rotator will be described.

Figure 6:
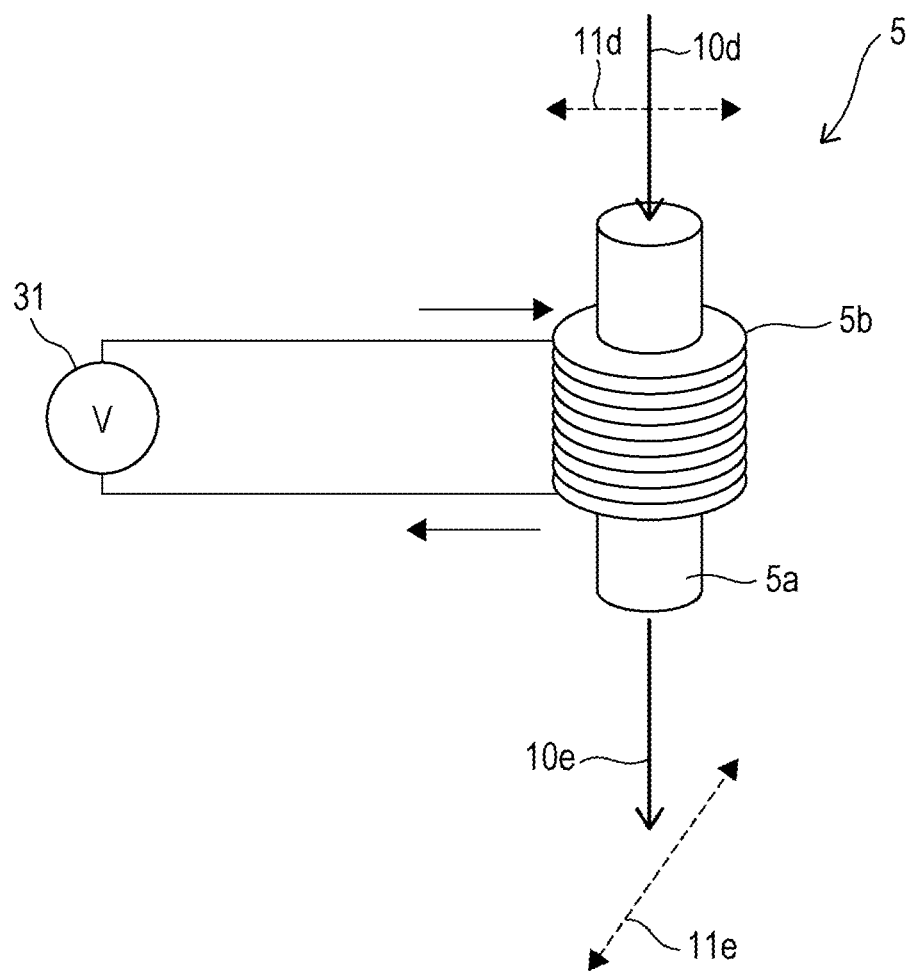
FIG. 6 is a perspective view schematically depicting an example configuration of a polarization rotator.

FIG. 6 is a perspective view schematically depicting an example configuration of the polarization rotator in the first embodiment. Here, a description will be given using a Faraday rotator which is capable of faster responses as the polarization rotator 5. The Faraday rotator is provided with a columnar magnetic glass rod 5*a* and a coil 5*b* wound therearound. When a current is passed to the coil 5*b* in accordance with a control signal from the control circuit 31 controlling polarization, a magnetic field vector that flows along the central axis within the magnetic glass rod 5*a* changes in proportion to the current amount. As a result, due to the Faraday effect, when light propagates along the central axis and transitions from the light 10*e* to the light 10*d*, the polarization direction thereof rotates from the polarization direction 11*d* to the polarization direction 11*e*. In the case of a Faraday rotator, the polarization rotation responsiveness reaches the GHz order, which is extremely fast. It should be noted that, although inferior to the Faraday rotator in terms of responsiveness, polarization rotation can also be carried out using a liquid crystal element.

Figure 7A:
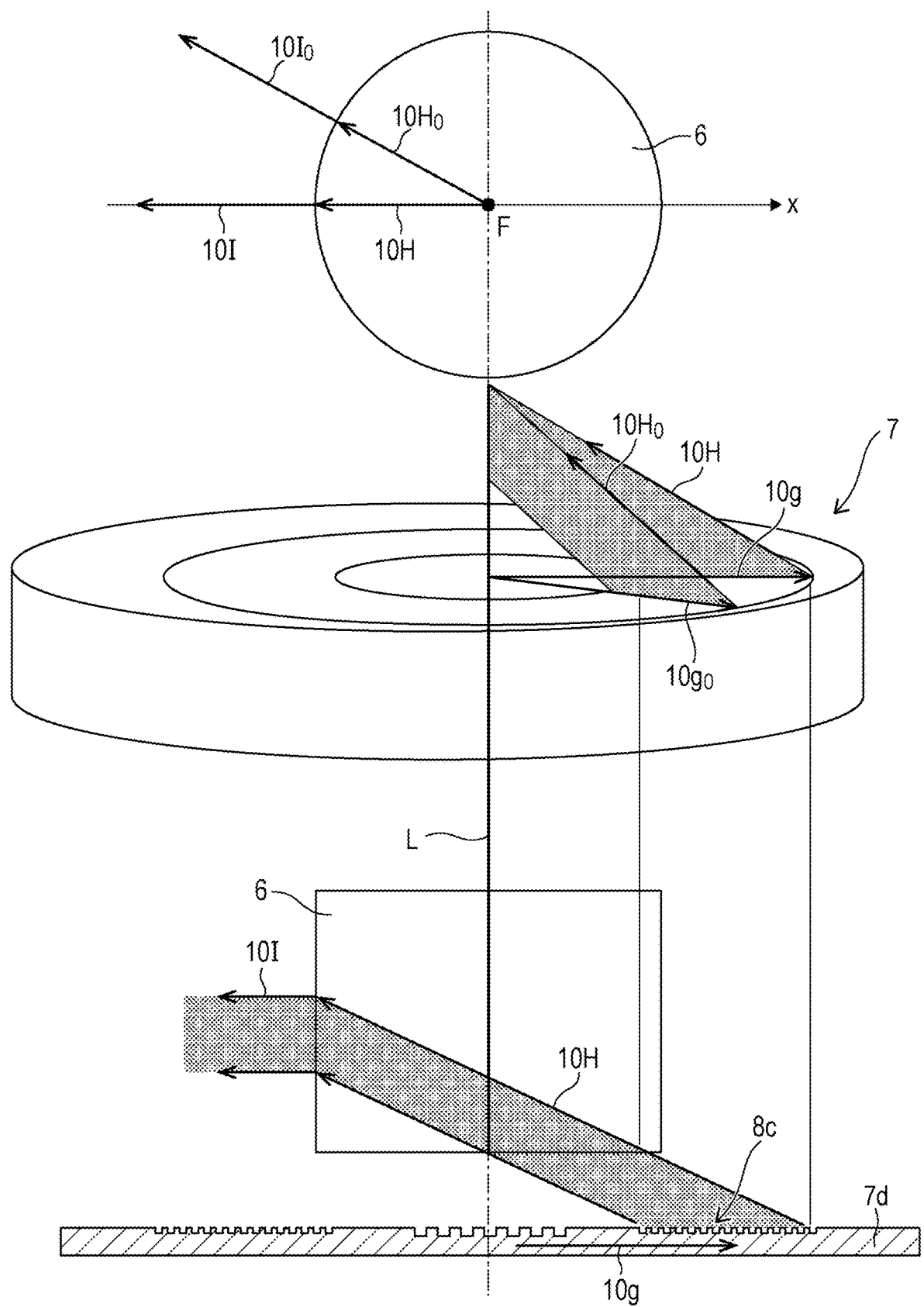
FIG. 7A is a drawing schematically depicting the propagation path of radiated light in an output grating coupler in a case where there is no aberration correction.
Figure 7B:
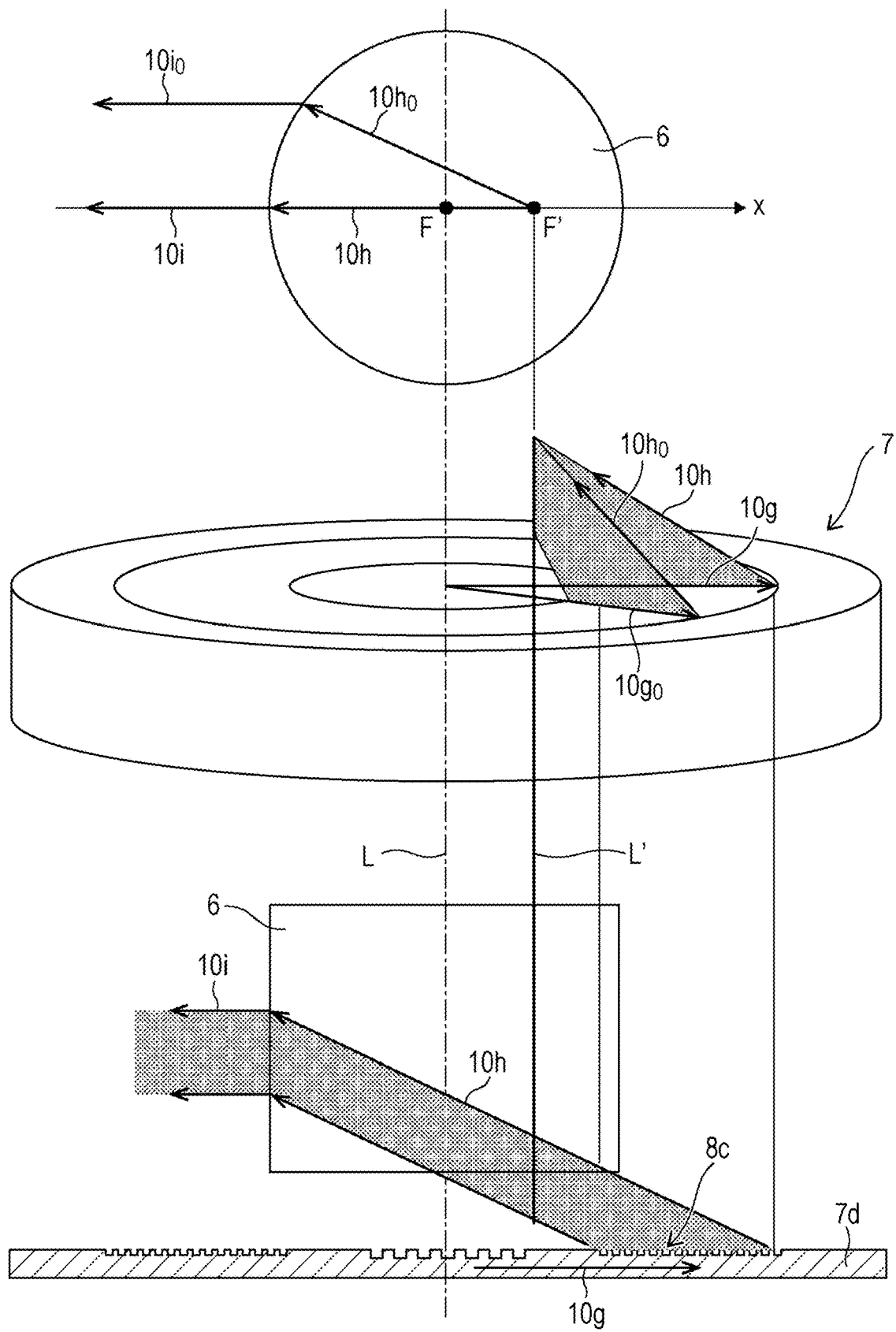
FIG. 7B is a drawing schematically depicting the propagation path of radiated light in the output grating coupler in a case where there is aberration correction control.

FIG. 7A is a drawing schematically depicting the propagation path of radiated light in the grating 8*c* which is an output grating coupler, in a case where there is no aberration correction, in the first embodiment. FIG. 7B is a drawing schematically depicting the propagation path of radiated light in the grating 8*c*, in a case where there is an aberration correction, in the first embodiment. In the examples depicted in FIGS. 7A and 7B, the upper sections depict plan views, the middle sections depict perspective views, and the lower sections depict cross-sectional views.

As depicted in FIG. 7A, in a case where there is no aberration correction, guided light 10*g* and 10*g*$_0$ that propagates within the waveguide layer 7*d* is emitted from the grating 8*c*, becomes light 10H and light 10H$_0$ that propagates within the columnar body 6, and becomes light 10I and light 10I$_0$ that refracts at the surface, namely the side surface, of the columnar body and is emitted outside. As depicted in the middle section of FIG. 7A, the light 10H and the light 10H$_0$ intersect at the central axis L. As depicted in the upper section of FIG. 7A, in plan view, the light 10I and 10I$_0$ intersect at point F on the central axis L, and become divergent light that travels straight along the radius of the column without bending even after being emitted from the surface of the columnar body 6.

As depicted in FIG. 7B, in a case where there is an aberration correction, guided light 10*g* and 10*g*$_0$ that propagates within the waveguide layer 7*d* is emitted from the grating 8*c*, becomes light 10*h* and 10*h*$_0$ that propagates within the columnar body 6, and becomes light 10*i* and 10*i*$_0$ that refracts at the surface, namely the side surface, of the columnar body and is emitted outside. As depicted in the middle section of FIG. 7B, the light 10*h* and 10*h*$_0$ intersect at an axis L' that is away from the central axis L in the x-axis positive direction. As depicted in the upper section of FIG. 7B, in plan view, the light 10*h* and 10*h*$_0$ intersect at point F' on the axis L', are emitted from the surface of the columnar body 6, and thereafter bend and become parallel light.

Next, a method for estimating the amount of aberration correction will be described.

Figure 8A:
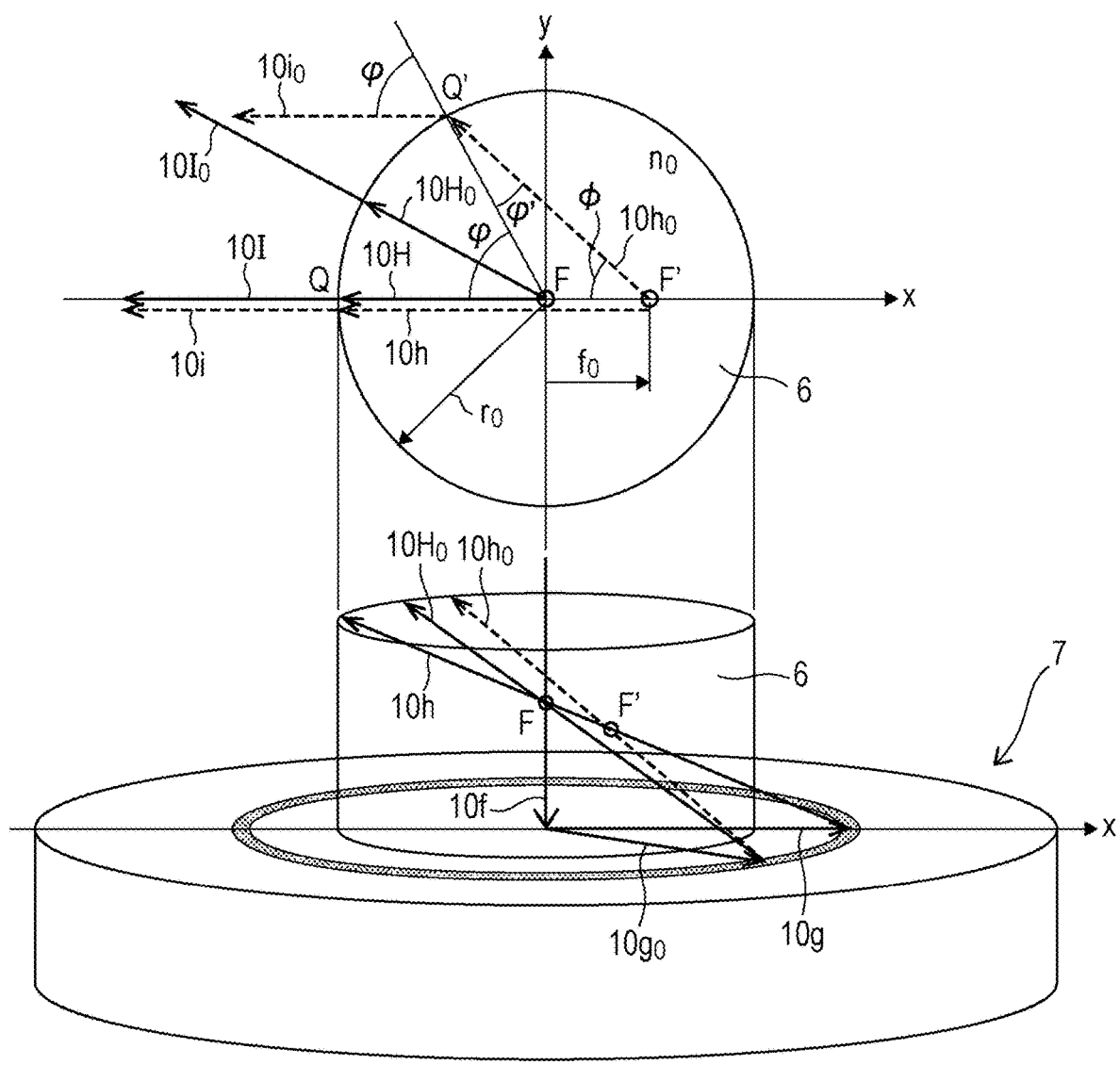
FIG. 8A is a drawing schematically depicting radiated light from the output grating coupler being refracted and emitted at a columnar surface.

FIG. 8A is a drawing schematically depicting radiated light from the grating 8*c*, which is an output grating coupler, being refracted and emitted at the columnar surface, in the first embodiment.

The paths of the light beams depicted in FIG. 8A are as described in FIGS. 7A and 7B. In plan view, the intersection between the light 10*h* and the side surface of the columnar body 6 is defined as Q, the intersection between the light 10*h*$_0$ and the surface of the columnar body 6 is defined as Q', the angle QFQ' is defined as φ, and the angle FF'Q' is defined as Φ. The light 10*i*$_0$ is parallel with the light 10*i*, and therefore expression 10 is established, where the angle φ' satisfies the relationship of expression 11.

$$\sin\varphi = n_0 \sin\varphi' \quad (10)$$

$$\Phi = \varphi - \varphi' \quad (11)$$

From expressions 10 and 11, the angle φ is given by expression 12. Meanwhile, if the interval between points F and F' is defined as $f_0$, $f_0$ is given by expression 13. The light 10H and 10H$_0$ are light that converges at point F, and the light 10*h* and 10*h*$_0$ are light that converges at point F'. According to aberration theory, an aberration that displaces the focal position of converged light from F to F', namely a vertical focal shift aberration, is given by the left side of expression 14.

$$\sin\varphi = \frac{n_0 \sin\phi \sqrt{n_0^2 + 1 + 2n_0 \cos\phi}}{\sqrt{(n_0^2 - 1)^2 + 4n_0^2 \sin^2\phi}} \quad (12)$$

$$f_0 = \frac{r_0 \sin\varphi'}{\sin\phi} = \frac{r_0 \sin\varphi}{n_0 \sin\phi} \quad (13)$$

$$n_0 f_0 (1 - \cos\phi) = (r_2 - r_1)\Delta N \quad (14)$$

Figure 8B:
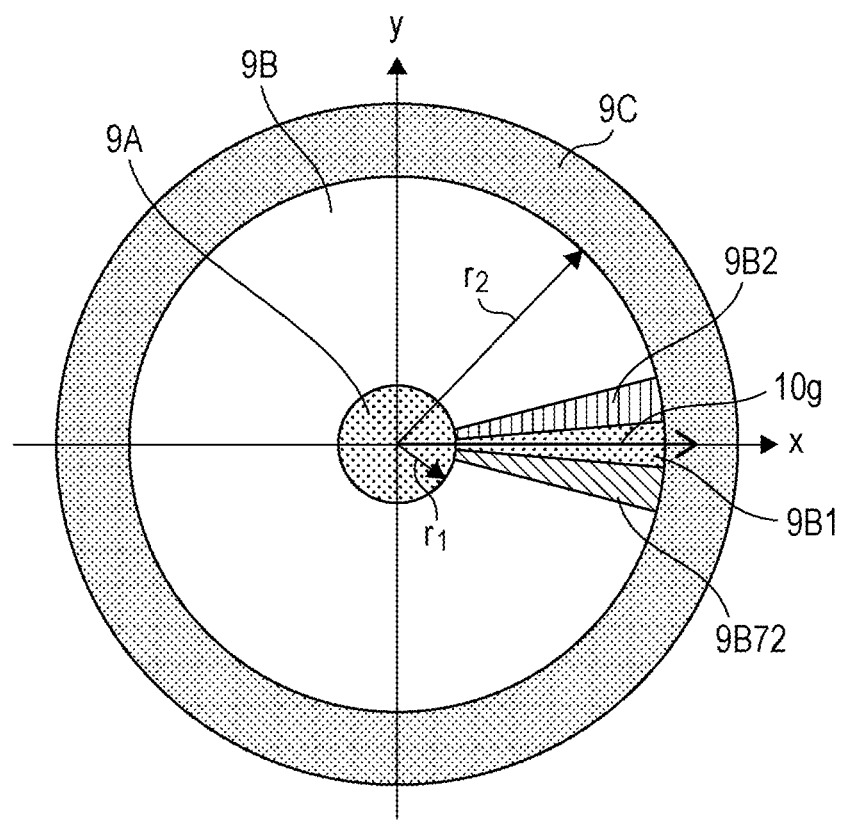
FIG. 8B is a drawing schematically depicting the appearance of a pattern of a transparent electrode layer for realizing an aberration correction.

FIG. 8B is a drawing schematically depicting the appearance of a pattern of a transparent electrode layer for realizing an aberration correction. The electrode 9B is in a position facing the grating 8*b* and is formed in a range from the radii $r_1$ to $r_2$. The electrode 9B is divided in the radiation direction. In other words, the electrode 9B has a plurality of divided regions that are electrically conductive, arranged side-by-side along the circumference of a virtual circle centered on the point where the light 10*f* is incident. The control circuit 31 causes the polarization direction 11*e* of the light 10*e* to rotate a predetermined angle by causing the voltage applied to the polarization rotator 5 to change. The control circuit 31 thereby sequentially changes the propagation direction of the guided light 10*g* within the waveguide layer 7*d*. In synchronization with the change in the propagation direction, the control circuit 32 independently and sequentially applies a voltage to the divided region opposing the portion of the waveguide layer 7*d* in which the guided light 10*g* propagates, from among the plurality of divided regions in the electrode 9B. Thus, aberration correction is realized and the radiated beam is rotated.

In the example depicted in FIG. 8B, the electrode 9B is divided equally into 5-degree segments in the rotation direction, and is divided into 72 segments from electrode 9B1 to electrode 9B72, each of which is a divided region. Only some thereof are shown in the example depicted in FIG. 8B. These annular-sector shaped divided regions are electrically insulated from each other, and a voltage can be independently applied thereto. When different voltages are applied to the divided regions, the refractive index of the adjacent liquid crystal layer 7e changes. As a result, the effective refractive index of the guided light 10g that propagates in the corresponding position also changes. In this way, the phase of the guided light can be changed for each argument of propagation. When the change range for the effective refractive index is taken as ΔN, the phase difference generated between the propagation distances $(r_2-r_1)$ is given by the right side of expression 14. Consequently, a conditional expression for radiated light to be refracted at the columnar surface and become parallel light is described by expression 14. ΔN in the aberration correction is given by expression 15, from expressions 13 and 14.

$$\Delta N = \frac{n_0 f_0 (1 - \cos\phi)}{(r_2 - r_1)} \quad (15)$$

Figure 9A:
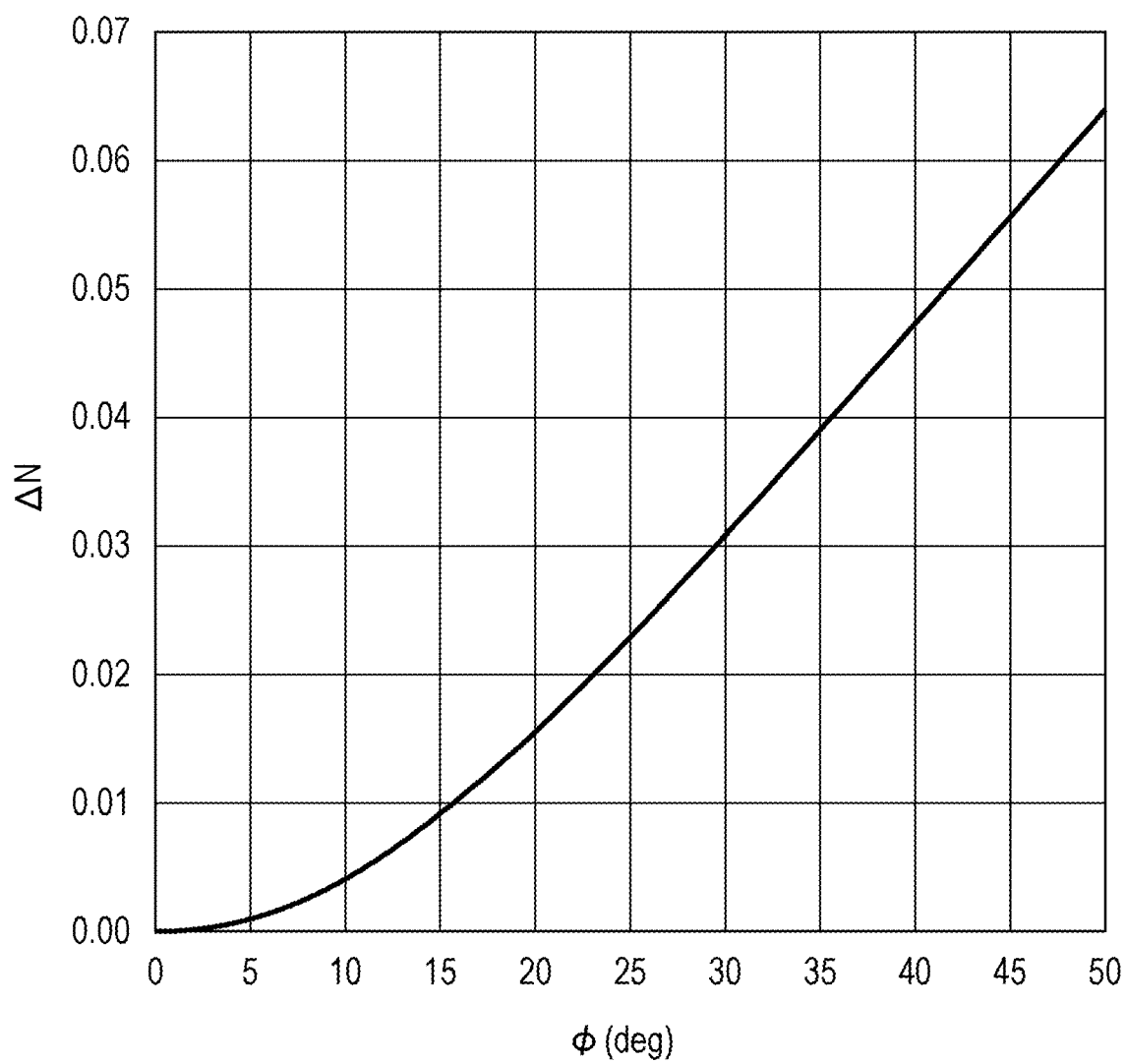
FIG. 9A is a drawing depicting the relationship between the argument of a propagation direction and an amount of change in the effective refractive index of guided light for realizing an aberration correction.

FIG. 9A is a drawing depicting the relationship between the argument φ of the propagation direction and an amount of change in the effective refractive index of guided light for realizing an aberration correction in the first embodiment. The example depicted in FIG. 9A depicts the plotting of the change range ΔN in the case where the refractive index $n_0$ of the columnar body 6 is 1.58, the radius $r_0$ is 1.25 mm, and the width $(r_2-r_1)$ of the electrode 9B is 8 mm, based on expression 15. To capture light in the argument range from −45 to 45 degrees, it is understood that ΔN=0.056.

Figure 9B:
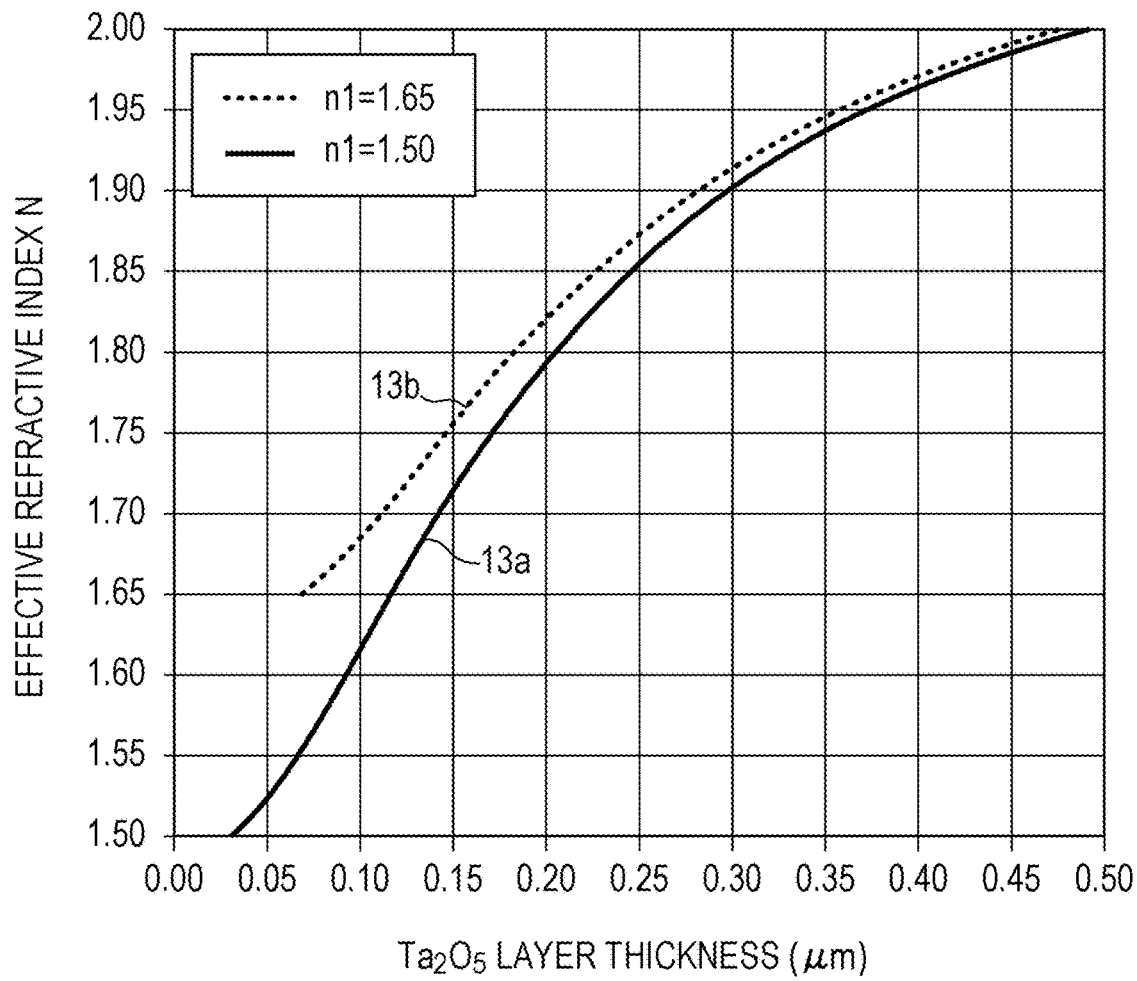
FIG. 9B is a drawing depicting the relationship between the thickness of a waveguide layer and the effective refractive index, with a liquid crystal refractive index being used as a parameter.
Figure 9C:
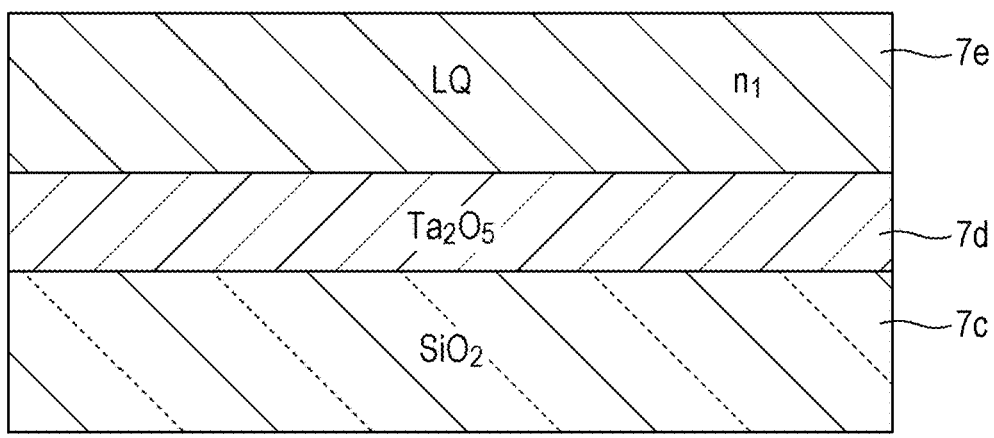
FIG. 9C is a drawing schematically depicting the arrangement of the buffer layer, waveguide layer, and liquid crystal.

FIG. 9B is a drawing depicting the relationship between the thickness of a $Ta_2O_5$ layer, which is the waveguide layer, and the effective refractive index, with the liquid crystal refractive index $n_1$ being used as a parameter. FIG. 9C is a drawing schematically depicting the arrangement of the buffer layer 7c, the waveguide layer 7d, and the liquid crystal layer 7e.

The difference in the refractive index of nematic liquid crystal molecules is large and is approximately 0.20. Considering that 80% thereof acts as the difference in the effective refractive index, the difference in the effective refractive index is approximately 0.15. In the example depicted in FIG. 9B, in a case where the wavelength of light is 0.94 μm and the refractive index of the buffer layer 7c is 1.45, the relationship between the layer thickness and the effective refractive index N of the waveguide layer 7d calculated with $n_1$=1.50 and $n_1$=1.65 is represented by curves 13a and 13b, respectively. In the example depicted in FIG. 9C, in a case where the difference in the effective refractive index of the liquid crystal is 0.15, if the thickness of the waveguide layer 7d formed from $Ta_2O_5$ is changed from 0.10 μm to approximately 0.15 μm, it is understood that a change from ΔN=0.06 to ΔN=0.04 can be expected.

FIGS. 10A to 10D are drawings illustrating the relationship between the pattern of the transparent electrode layer and the propagation direction of guided light in the first embodiment.

Figure 10A:
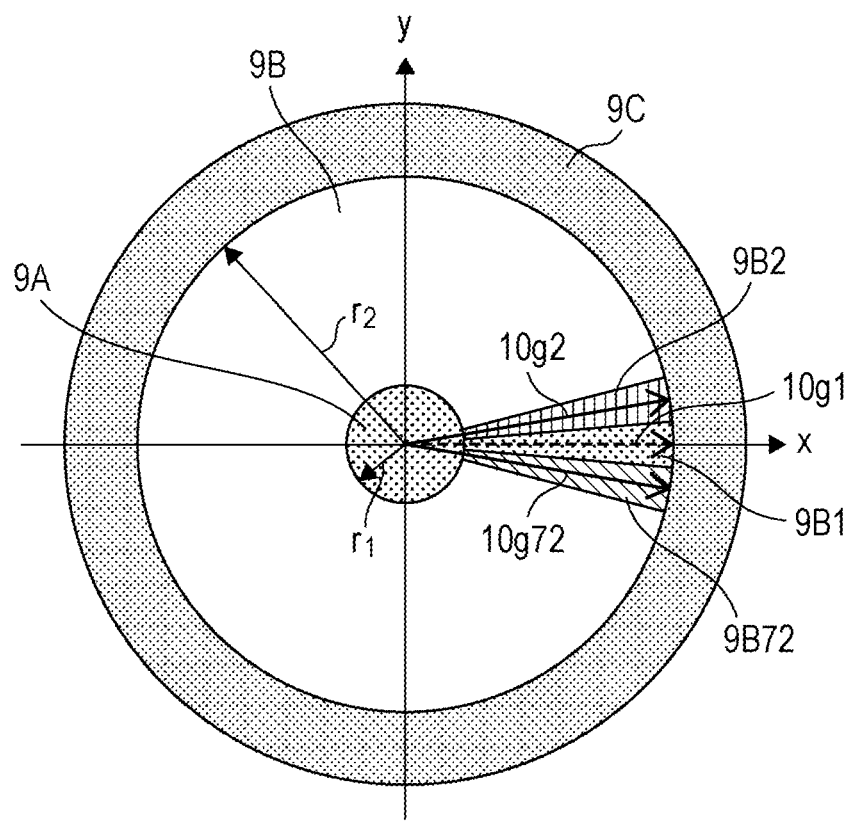
FIG. 10A is a drawing illustrating the relationship between the pattern of the transparent electrode layer and the propagation direction of guided light.

In the example depicted in FIG. 10A, the beams of guided light that propagate from the center O toward the outer circumferential side, corresponding to the positions of the annular-sector shaped electrodes 9B1, 9B2, and 9B72 centered on point O, are the guided light 10g1, 10g2, and 10g72, respectively.

Figure 10B:
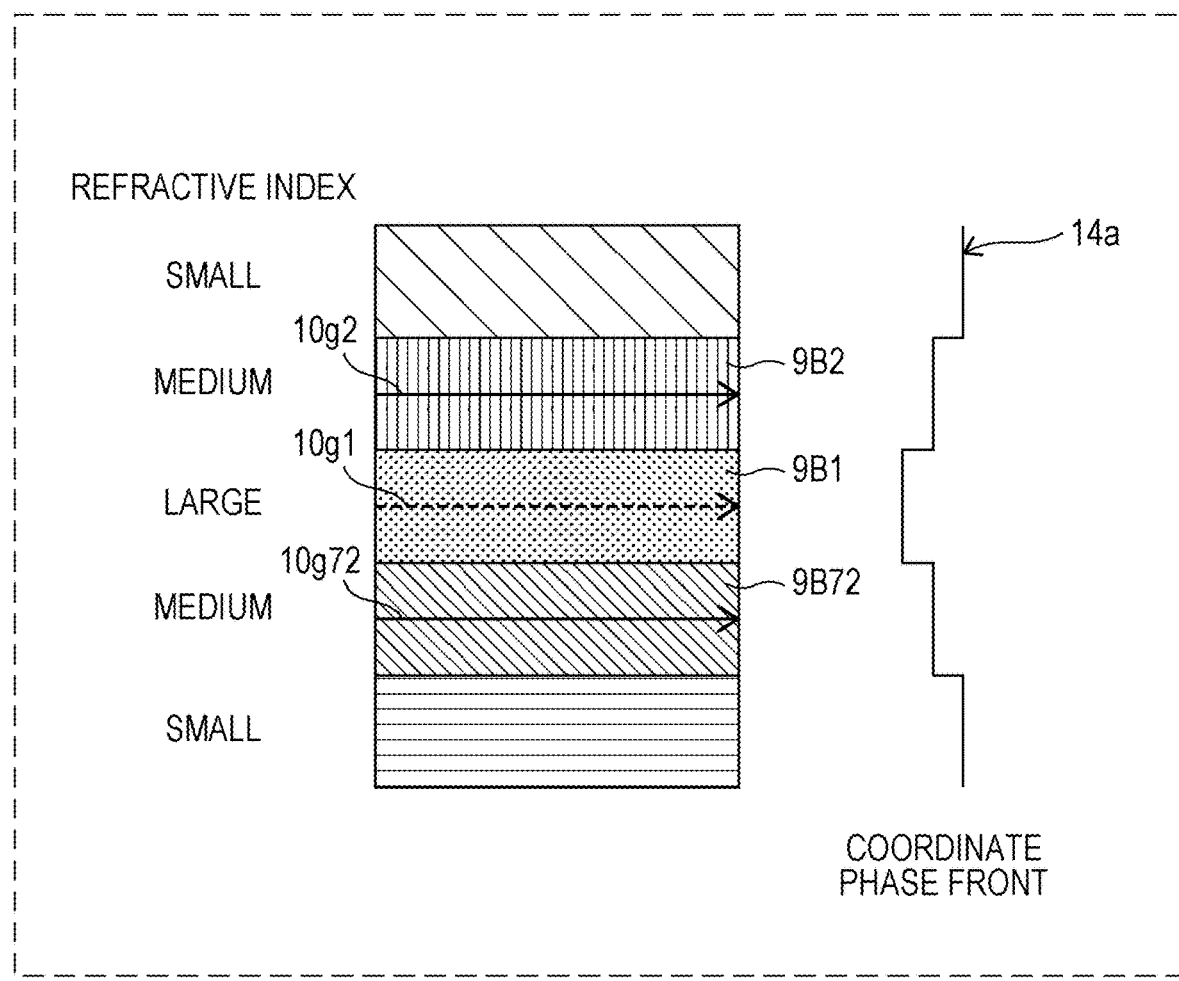
FIG. 10B is a drawing illustrating a phase front generated according to the relationship between the pattern of the transparent electrode layer and the propagation direction of guided light.

In the example depicted in FIG. 10B, the annular-sector shaped electrodes are replaced with rectangular shapes to aid understanding, and the positional relationship between the light beam propagation paths and the electrodes is depicted. Depending on the voltage applied to the electrodes, a high/low difference occurs in the refractive index of the propagation path. If the refractive index at the position corresponding to the electrode 9B1 is the highest and decreases as the distance from the electrode 9B1 increases, the coordinate phase front 14a of the light after passing through the electrodes has a stepped shape.

Figure 10C:
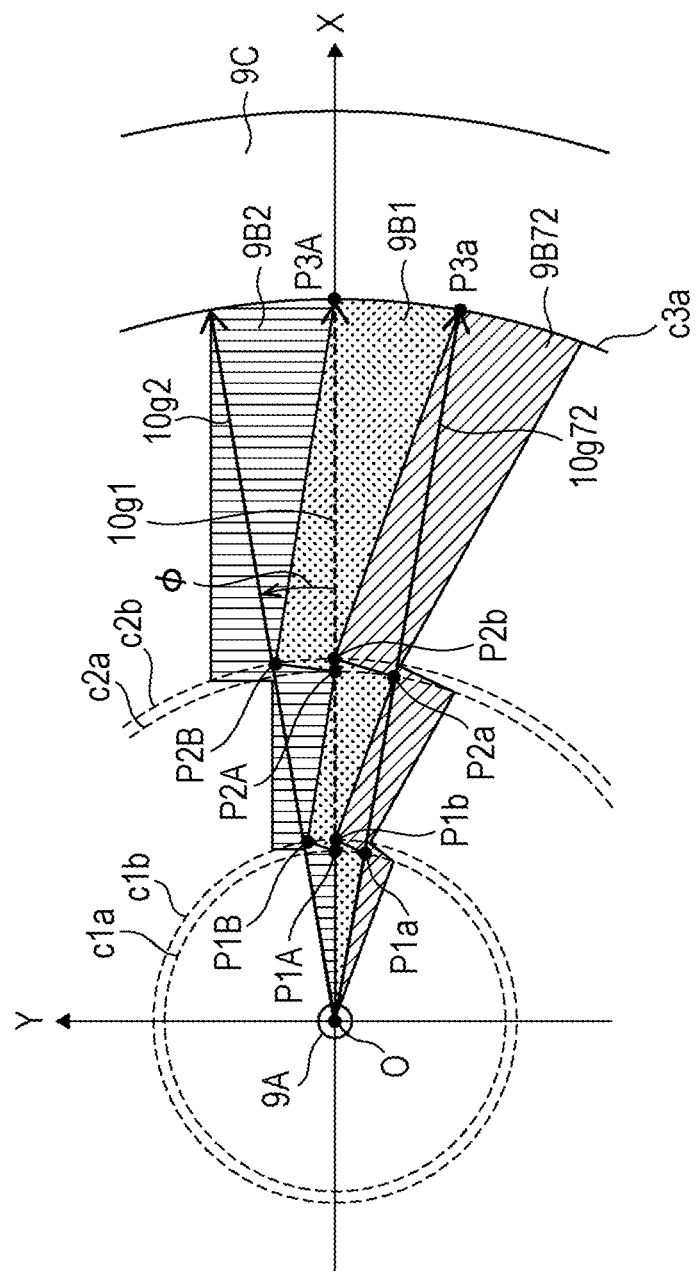
FIG. 10C is a drawing illustrating the relationship between the pattern of the transparent electrode layer and the propagation direction of guided light.

In the example depicted in FIG. 10C, the annular-sector shapes have been transformed into zigzag shapes. In other words, the region of the electrode 9B is divided by circles c1a, c1b, c2a, c2b, and c3a. The circles c1b and c2b are circles that are slightly larger than the circles c1a and c2a, respectively. Intersections between the guided light 10g72 and the circles c1a, c2a, and c3a are taken as intersections P1a, P2a, and P3a, respectively. Intersections between the guided light 10g1 and the circles c1a, c1b, c2a, c2b, and c3a are taken as intersections P1A, P1b, P2A, P2b, and P3A, respectively. Intersections between the guided light 10g2 and the circles c1b and c2b are taken as intersections P1B and P2B, respectively. The zigzag shape of the electrode 9B1 is a shape sandwiched between a line connecting points O, P1a, P1b, P2a, P2b, and P3a, and a line connecting points O, P1A, P1B, P2A, P2B, and P3A, and does not include the region of the electrode 9A. The section between points P3a and P3A follows the circle c3a. Other electrodes have a shape in which the electrode 9B1 is rotated about point O according to the division angle. In the case of 72 divisions, the division angle is 5 degrees.

Figure 10D:
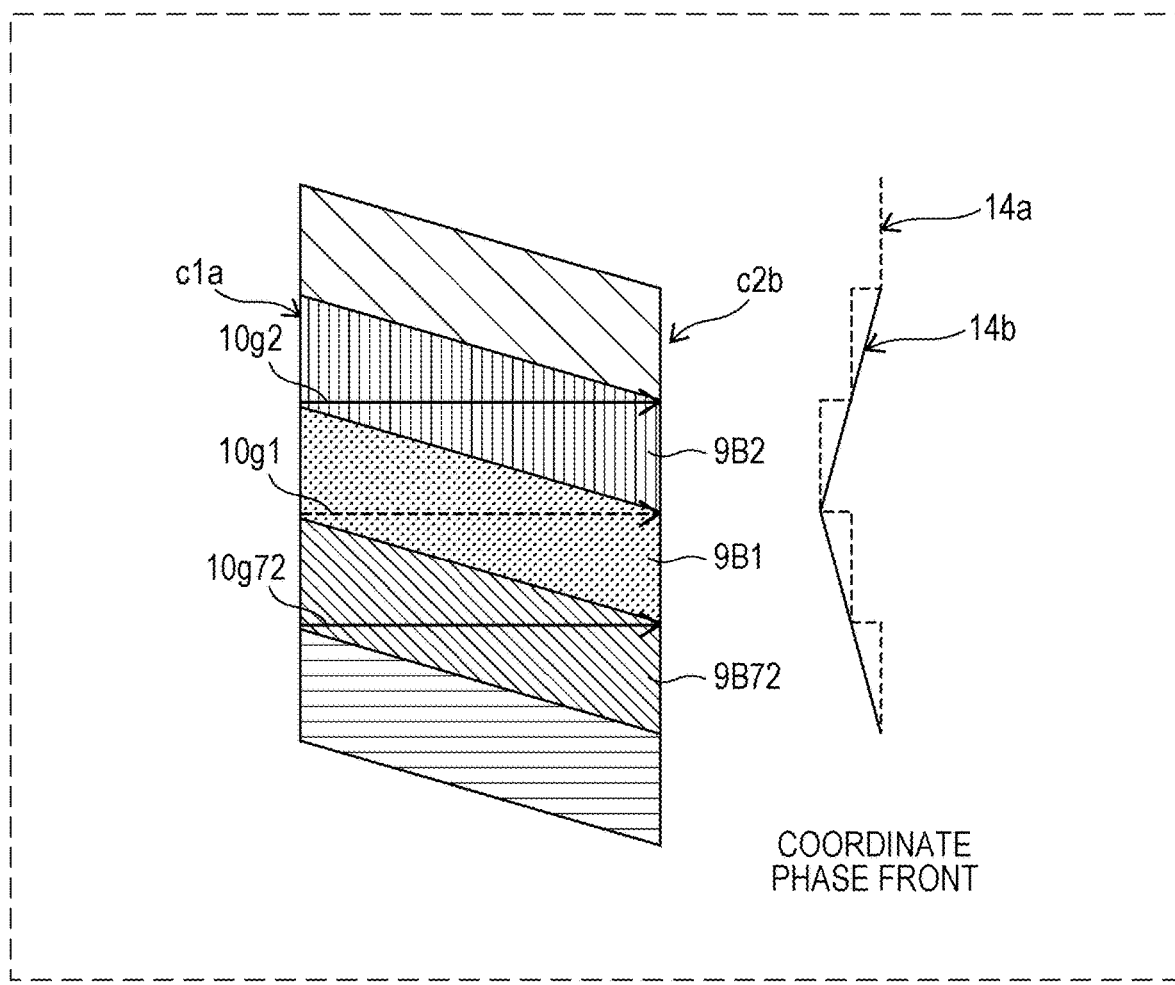
FIG. 10D is a drawing illustrating a phase front generated according to the relationship between the pattern of the transparent electrode layer and the propagation direction of guided light.

In the example depicted in FIG. 10D, the electrodes between the circles c1a and c2b are replaced with rhomboids to aid understanding, and the positional relationship between the light beam propagation paths and the electrodes is depicted. Since the electrodes are replaced with rhomboids, the propagation directions of the depicted guided light 10g1, 10g2, and 10g72 are rotated in the opposite direction by the argument φ and are depicted in parallel. Light beams that propagate along the propagation direction between the guided light 10g1 and 10g2, and between the guided light 10g1 and 10g72 propagate across two adjacent electrodes. The ratio of the propagation distance for each electrode changes in proportion to the argument φ of the light beam. This relationship is also established between the circles c2a and c3a. Consequently, depending on the voltage applied to the electrodes, a high/low difference occurs in the refractive index of the propagation path. For example, if the refractive index at the position corresponding to the electrode 9B1 is the highest and decreases as the distance from the electrode 9B1 increases, the coordinate phase front of the light after passing through the electrodes changes from the stepped shape 14a to a shape 14b that is linearly interpolated. It should be noted that, although five dividing circles have been used in the example depicted in FIG. 10C, another combination such as seven or nine may be used.

Figure 10E:
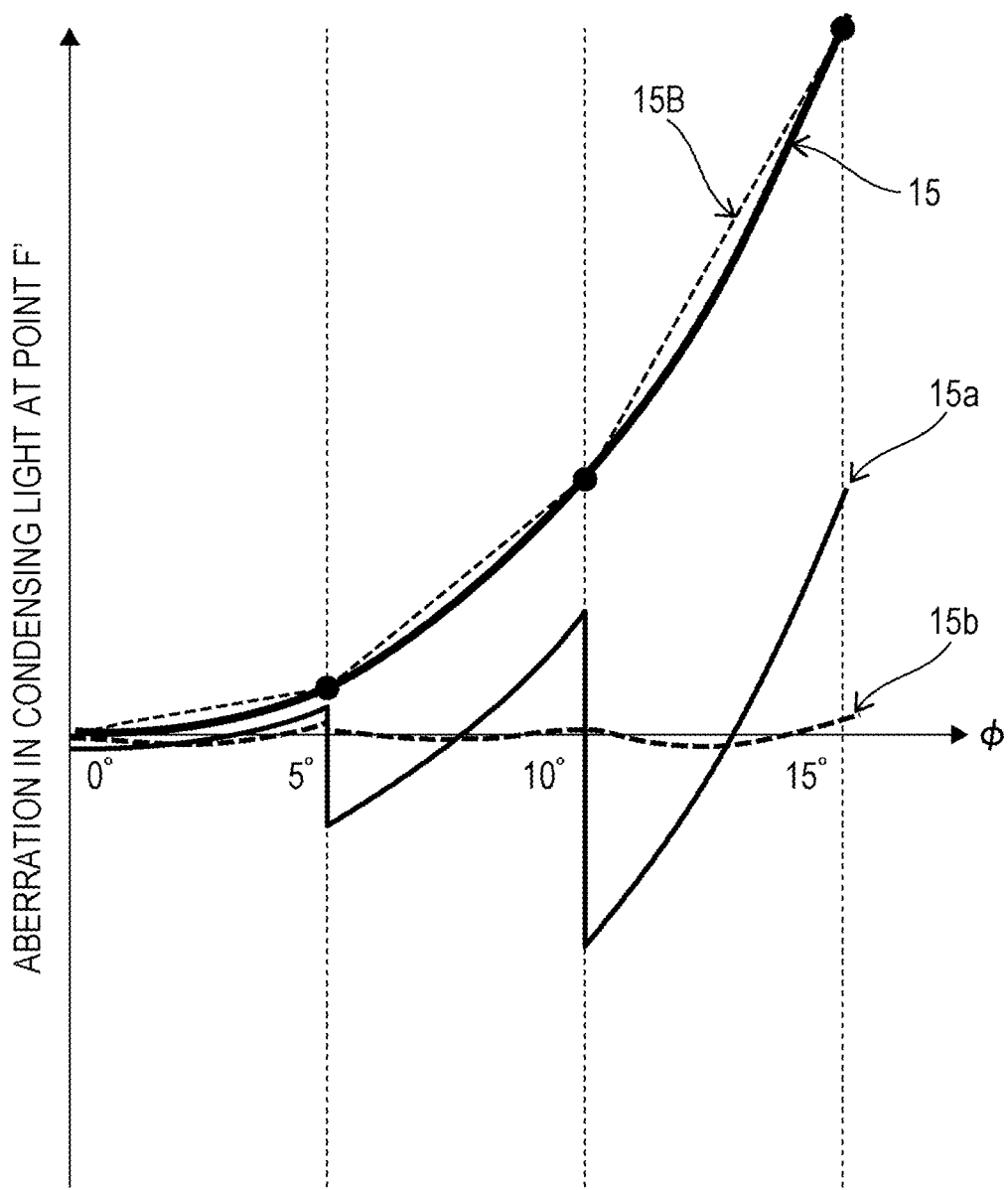
FIG. 10E is a drawing schematically depicting the way in which an aberration in condensing light at point F' is corrected.

FIG. 10E is a drawing schematically depicting the way in which an aberration in the condensing light at point F' is corrected. The vertical axis represents the amount of aberration, and the horizontal axis represents the argument φ. An aberration in the condensing light at point F' prior to correction is indicated by a curve 15. By optimizing the voltage applied to the electrodes, in the case of the electrode shape in the example depicted in FIG. 10A, the aberration in the condensing light at point F' is corrected as indicated by a curve 15a. In the case of the electrode shape in the example depicted in FIG. 10C, the aberration in the condensing light at point F' is corrected as indicated by a curve 15b. The curve 15b corresponds to the difference of a bent line 15B with respect to the curve 15. It is understood that the aberration is compressed to approximately 1/10 even in the curve 15a, and most of the aberration is corrected in the curve 15b.

Consequently, by controlling the application of voltage to the electrode shape in the example depicted in FIG. 10C, radiated light from the grating 8c can be emitted as parallel light from the columnar surface. It should be noted that application of a voltage to the electrode shape is synchronized with the propagation direction of guided light, namely the polarization rotation angle of incident light. At such time, a voltage that increases the liquid crystal refractive index is applied such that the phase in the propagation direction having the highest light intensity is delayed.

Given the above, the electrode 9B has the following configuration, and the control circuits 31 and 32 carry out the following operations.

The electrode 9B has a plurality of divided regions arranged side-by-side along the circumference of a virtual circle centered on the point where the light 10f is incident. The control circuit 31 causes the polarization direction 11e of the light 10e to rotate a predetermined angle by causing the voltage applied to the polarization rotator 5 to change. The control circuit 31 thereby sequentially changes the propagation direction of the guided light 10g within the waveguide layer 7d. In synchronization with the change in the propagation direction, the control circuit 32 independently and sequentially applies a voltage to the divided region opposing the portion of the waveguide layer 7d in which the guided light 10g propagates, from among the plurality of divided regions in the electrode 9B. Thus, aberration correction is realized and the radiated beam is rotated.

Figure 11A:
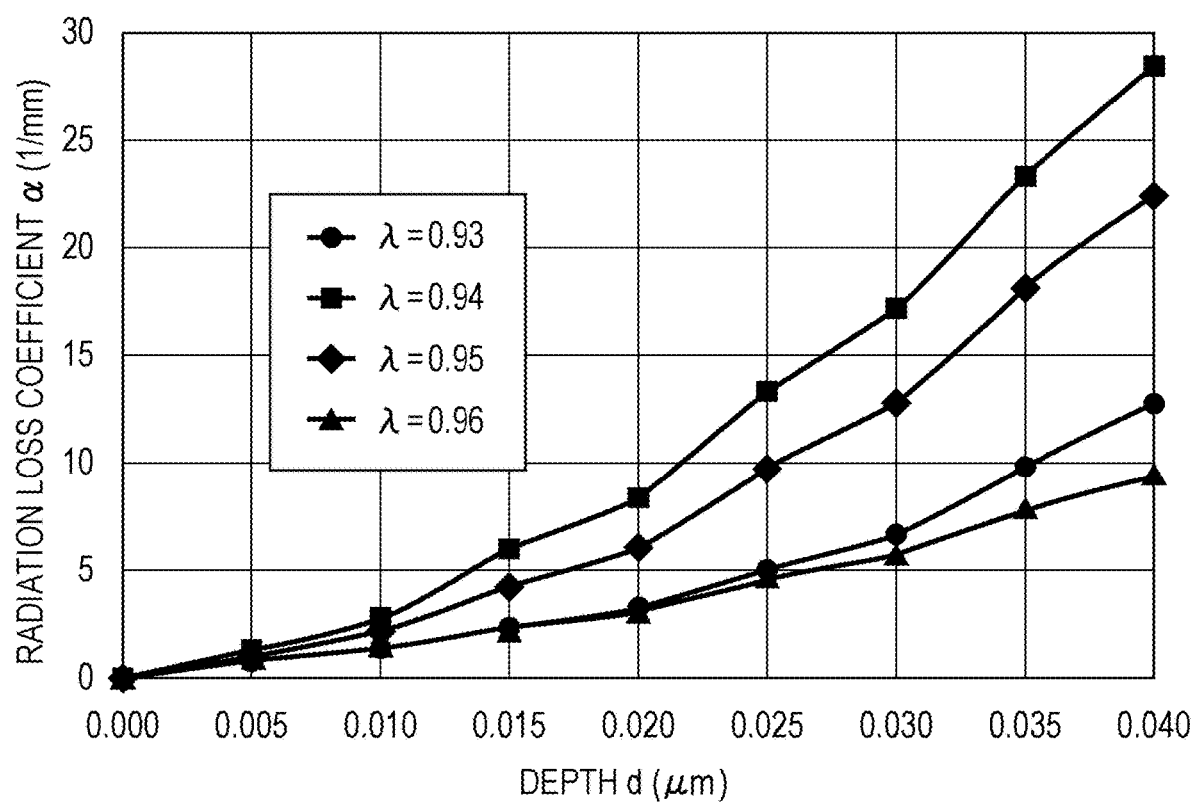
FIG. 11A is a drawing depicting the relationship between the depth of the output grating coupler and a radiation loss coefficient.
Figure 11B:
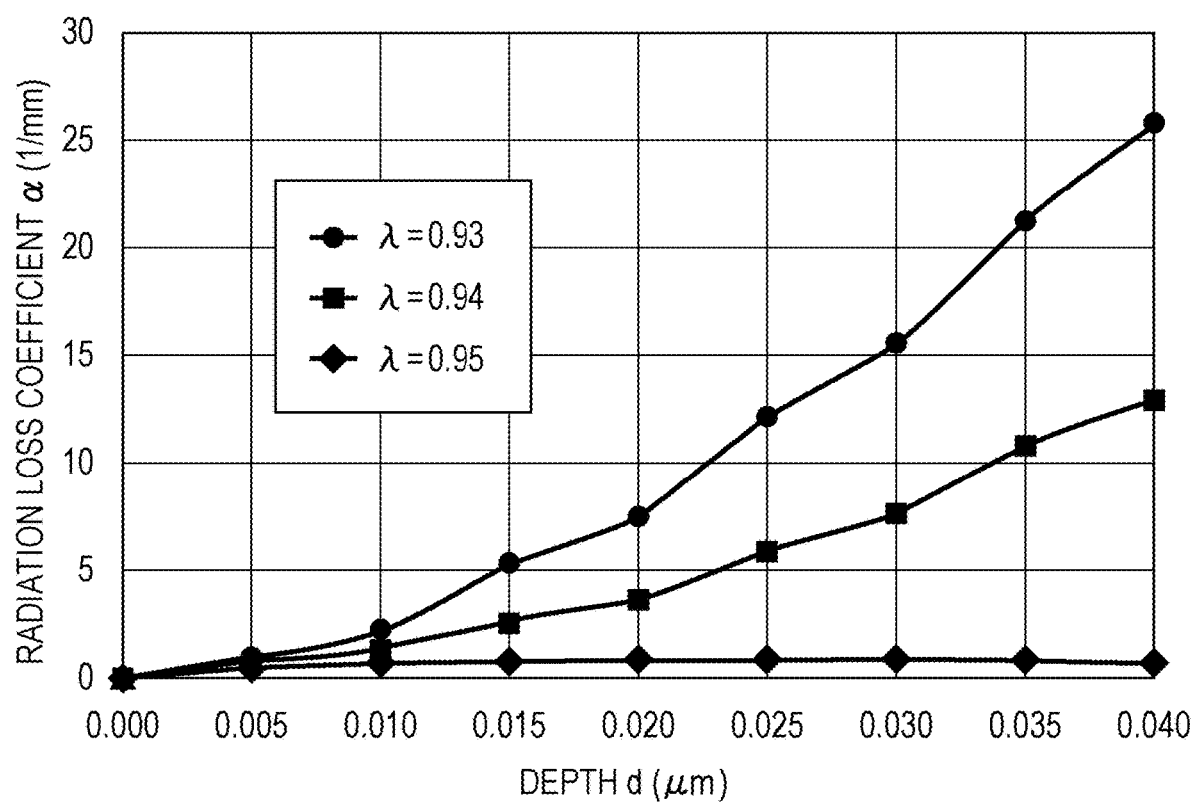
FIG. 11B is a drawing depicting the relationship between the depth of the output grating coupler and the radiation loss coefficient.
Figure 11C:
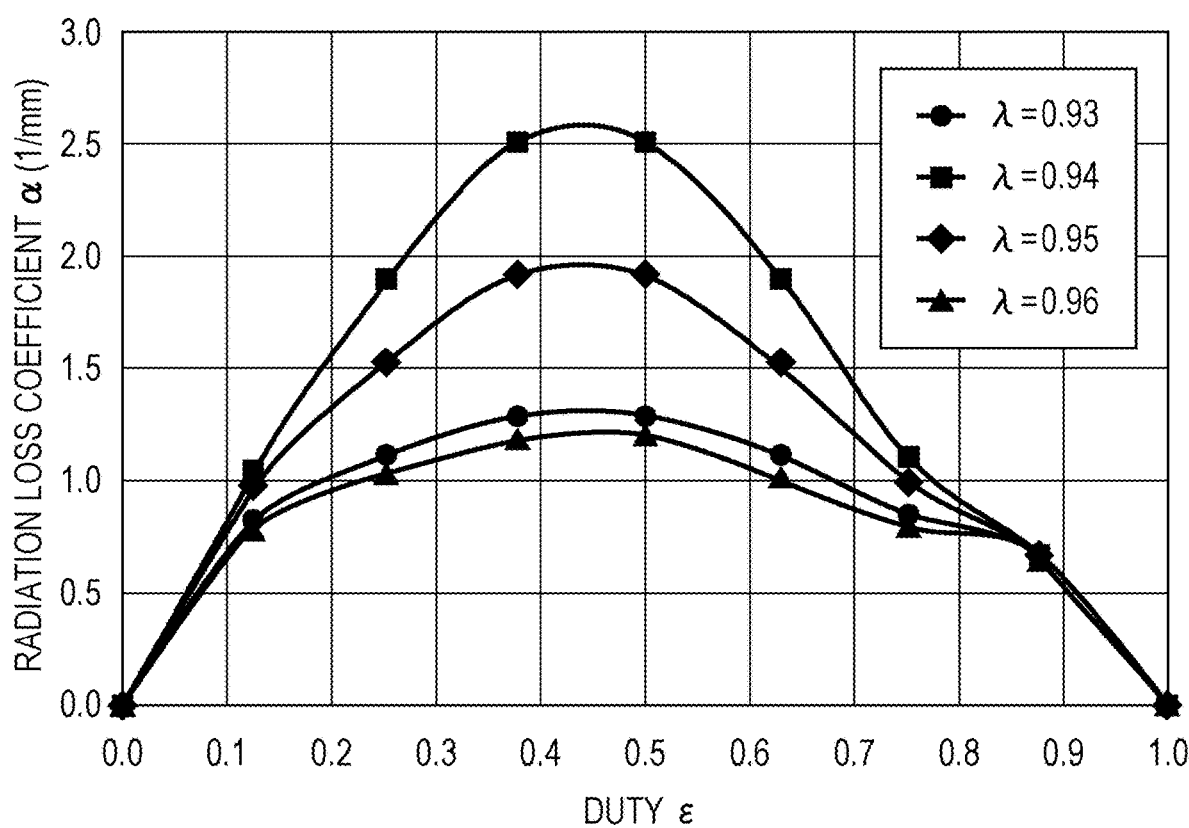
FIG. 11C is a drawing depicting the relationship between the duty and the radiation loss coefficient.
Figure 11D:
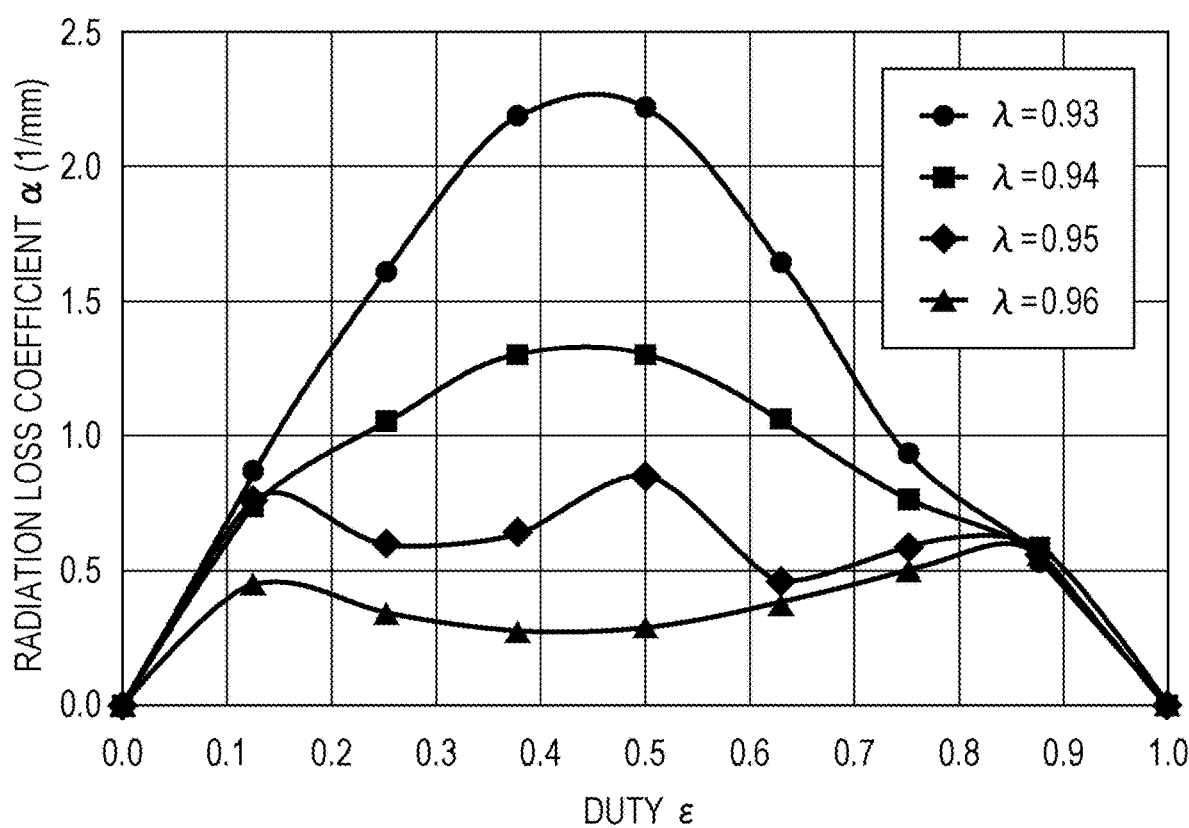
FIG. 11D is a drawing depicting the relationship between the duty and the radiation loss coefficient.

FIGS. 11A and 11B are drawings depicting the relationship between the depth d of the grating 8c and a radiation loss coefficient $\alpha$ in a case where the duty $\epsilon$ of the grating is fixed at 0.5 in the first embodiment. In the example depicted in FIG. 11A, the liquid crystal refractive index $n_1$=1.6, and in the example depicted in FIG. 11B, the liquid crystal refractive index $n_1$=1.45. FIGS. 11C and 11D are drawings depicting the relationship between the duty $\epsilon$ and the radiation loss coefficient $\alpha$ in a case where the depth d is fixed at 0.01 μm in the first embodiment. In the example depicted in FIG. 11C, the liquid crystal refractive index $n_1$=1.6, and in the example depicted in FIG. 11D, the liquid crystal refractive index $n_1$=1.45. Other analysis conditions in the examples depicted in FIGS. 11A to 11D are the same as in the case where the thickness of the buffer layer 7c is 1.06 μm in the example depicted in FIG. 4D.

In the case where the depth d of the grating is 0.01 μm, in the example depicted in FIG. 11A, the radiation loss coefficient $\alpha$ has a magnitude of approximately 2 (1/mm), and in the example depicted in FIG. 11B, the radiation loss coefficient $\alpha$ has a magnitude of approximately 1 (1/mm). As depicted in FIGS. 11C and 11D, the radiation loss coefficient $\alpha$ can be reduced by shifting the duty $\delta$ from 0.5. The radiation loss coefficient $\alpha$ increases as the liquid crystal refractive index increases, and increases as the wavelength decreases. However, in a design example of the present embodiment, the radiation loss coefficient $\alpha$ exhibits irregular behavior only when the wavelength $\lambda$=0.93 μm, due to the interference effect of reflected light from the reflection layer 7b.

Figure 11E:
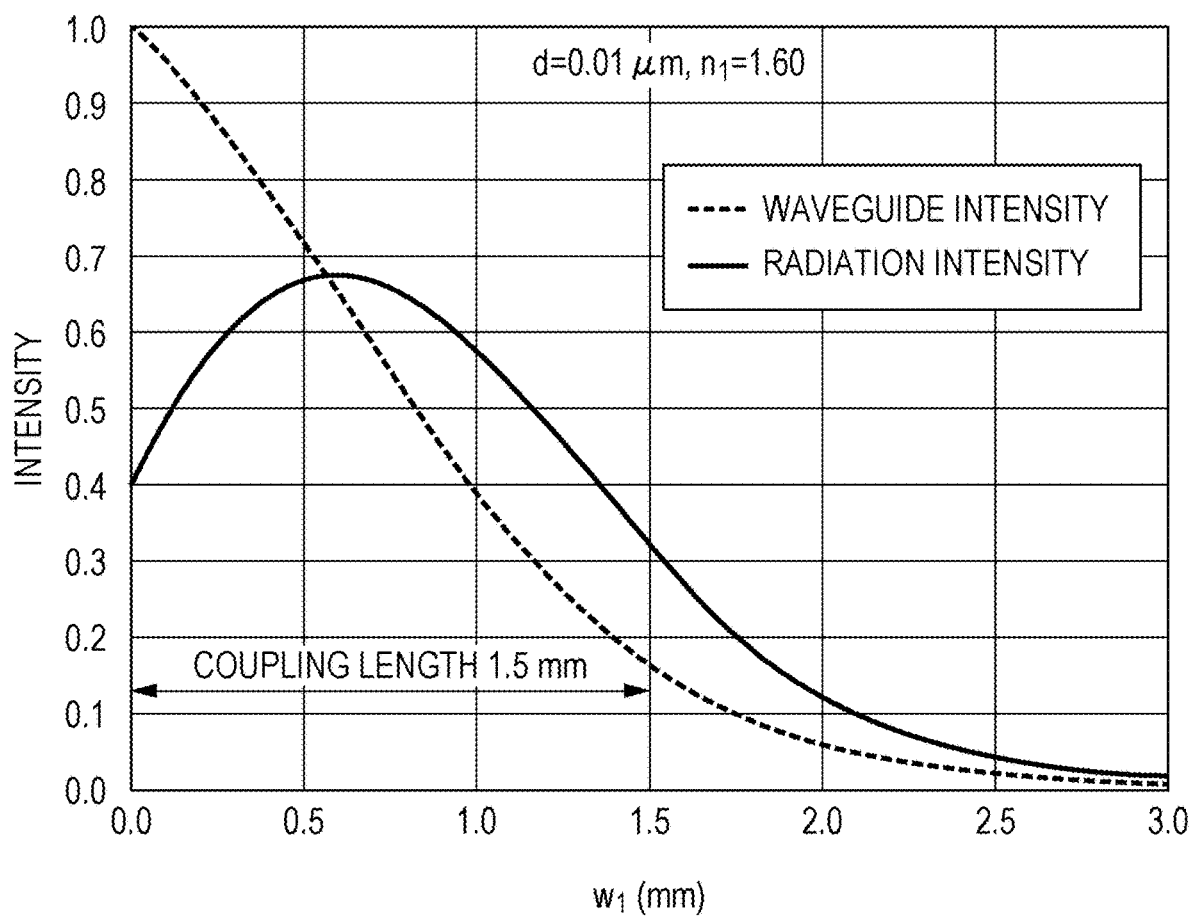
FIG. 11E is a drawing depicting the relationship between the coupling length and the waveguide intensity, and the relationship between the coupling length and the radiation intensity.
Figure 11F:
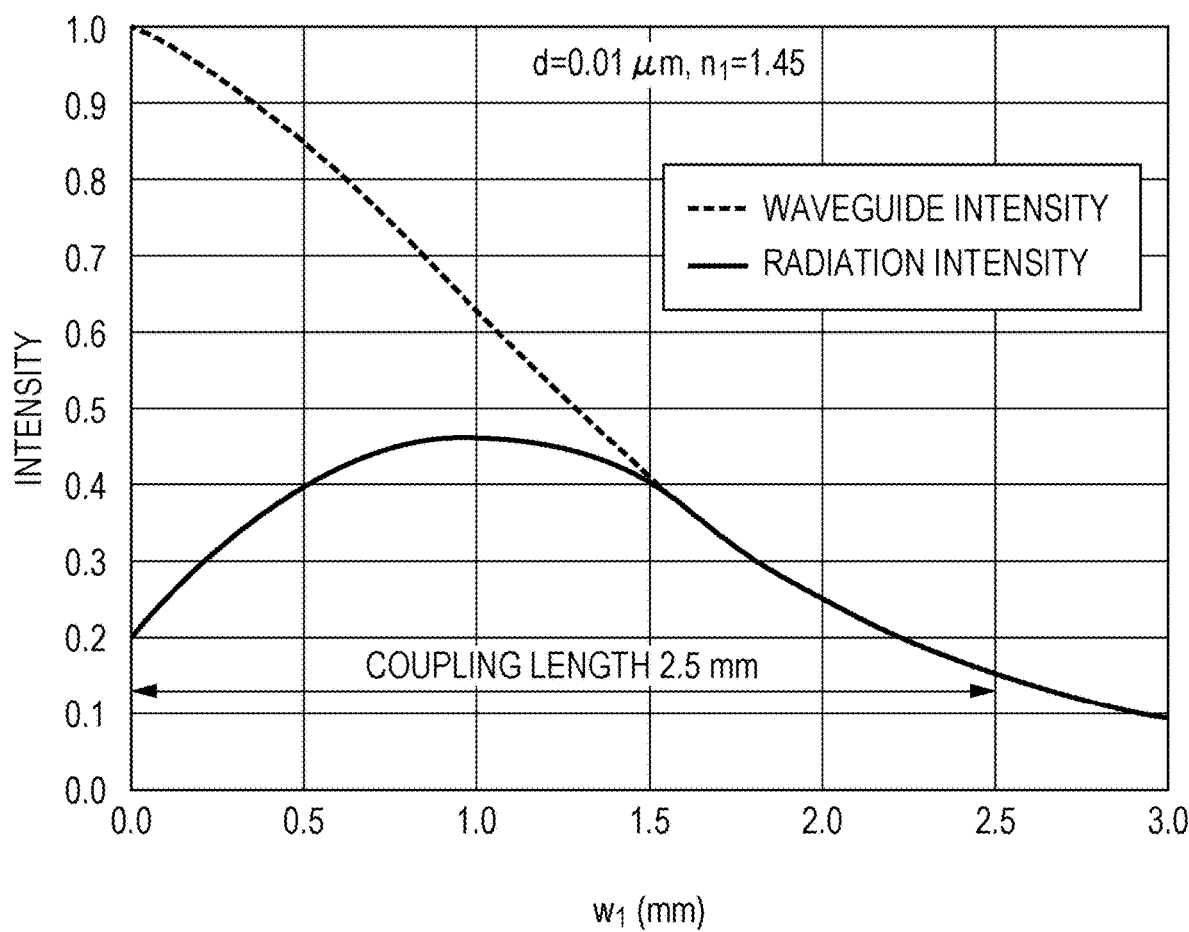
FIG. 11F is a drawing depicting the relationship between the coupling length and the waveguide intensity, and the relationship between the coupling length and the radiation intensity.
Figure 12A:
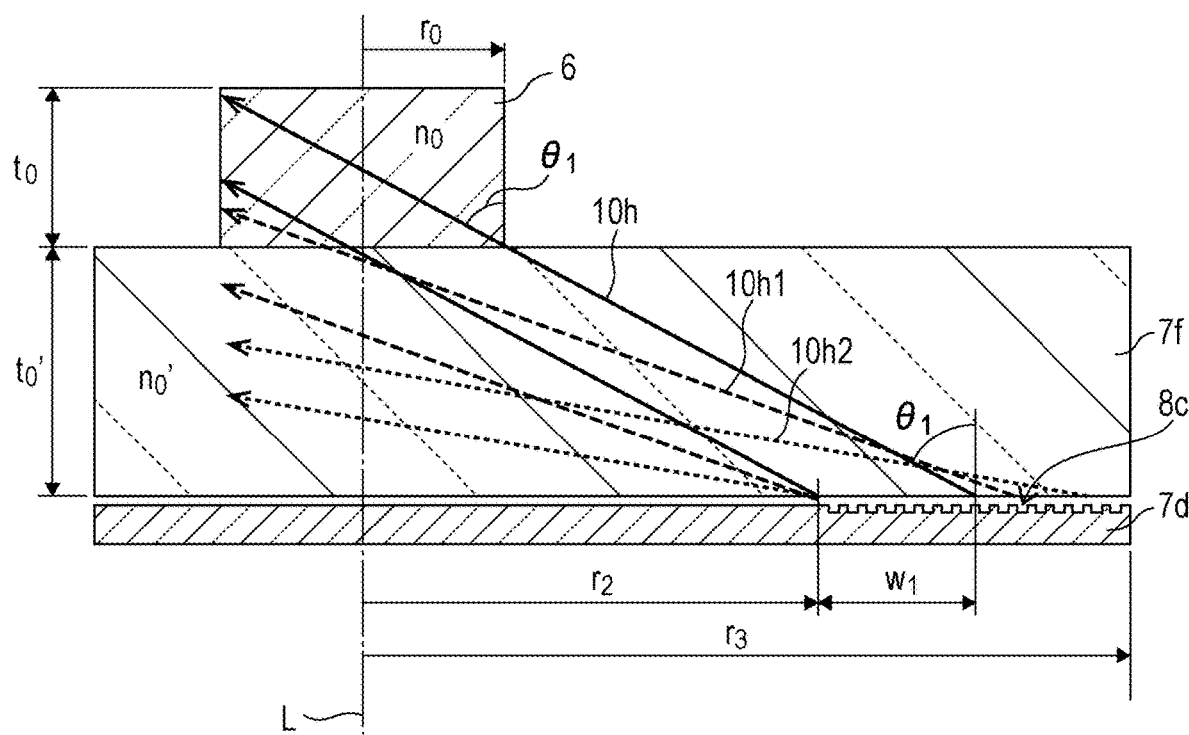
FIG. 12A is a drawing depicting the positional relationship between radiated light from the output grating coupler and the columnar body.
Figure 12B:
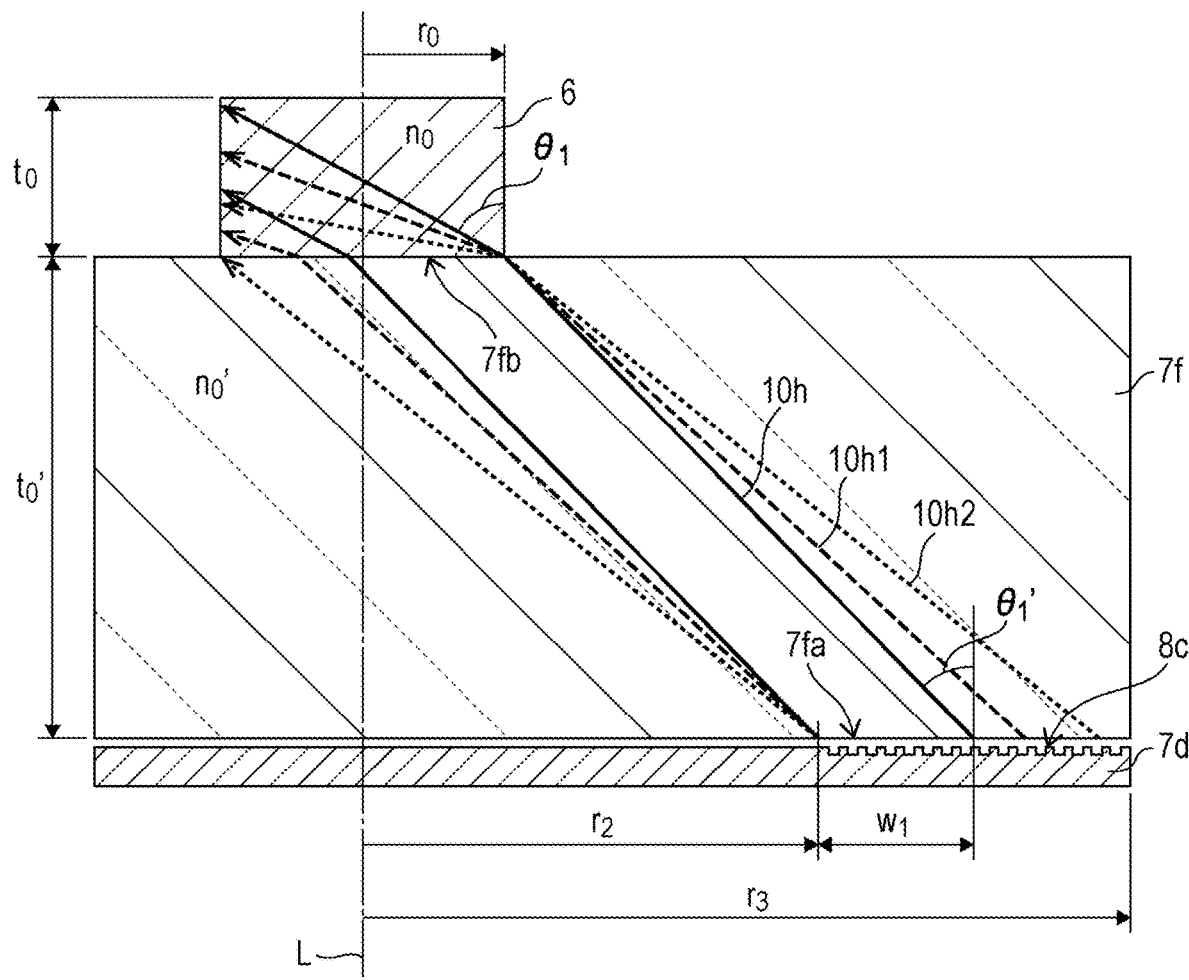
FIG. 12B is a drawing depicting the positional relationship between radiated light from the output grating coupler and the columnar body.

FIGS. 11E and 11F are drawings depicting the relationship between a coupling length $w_1$ and waveguide intensity, and the relationship between the coupling length $w_1$ and radiation intensity. In the example depicted in FIG. 11E, $\alpha$ increases from 0.4 to 2.0 in a linearly proportional manner when $w_1$=0 mm to 1.5 mm, and $\alpha$ is fixed at 2.0 when $w_1$>1.5 mm. In the example depicted in FIG. 11F, $\alpha$ increases from 0.2 to 1.0 in a linearly proportional manner when $w_1$=0 mm to 1.5 mm, and $\alpha$ is fixed at 1.0 when $w_1$>1.5 mm. The coupling length $w_1$ is the distance from a coupler start point $r_2$ to a radiation position, as depicted in FIGS. 12A and 12B described later. Here, the coupling length corresponding to the width of radiated light is defined by the position where the waveguide intensity becomes $1/e^2$.

The example depicted in FIG. 11E corresponds to a condition where the liquid crystal refractive index is high or the wavelength is short. At such time, the coupling length becomes 1.5 mm. The example depicted in FIG. 11F corresponds to a condition where the liquid crystal refractive index is low or the wavelength is long. At such time, the coupling length becomes 2.5 mm.

FIGS. 12A and 12B are drawings depicting the positional relationship between radiated light from the grating 8c and the columnar body in the first embodiment. In the example depicted in FIG. 12A, the refractive index $n_0$' of the transparent flat substrate 7f is 1.58 which is the same as the refractive index $n_0$ of the columnar body. In the example depicted in FIG. 12B, the refractive index $n_0$' of the transparent flat substrate 7f is 2.0. In the examples depicted in FIGS. 12A and 12B, the radiated light 10h, 10h1, and 10h2 from the grating 8c correspond to a condition where the wavelength increases in this order. At such time, the coupling length $w_1$ also increases in this order, corresponding to the radiated light 10h, 10h1, and 10h2.

In the example depicted in FIG. 12A, the radiation angle $\theta_1$ within the transparent flat substrate 7f is large. Therefore, under the condition that the radiated light 10h is made to enter the columnar body 6 having a small diameter, the other radiated light 10h1 and 10h2 cannot be made to enter. In the example depicted in FIG. 12B, the radiation angle $\theta_1$' within the transparent flat substrate 7f can be made to be small due to the large refractive index of the transparent flat substrate 7f. Thus, all the radiated light 10h, 10h1, and 10h2 can be made to enter the columnar body 6. It should be noted that, by increasing the refractive index of the transparent flat substrate 7f, a large reflection loss occurs at an interface 7fa between the transparent flat substrate 7f and the liquid crystal layer 7e, and at an interface 7fb between the transparent flat substrate 7f and the columnar body 6. In order to suppress reflection loss, an AR coating process, for example, is carried out on the upper and lower surfaces of the transparent flat substrate 7f.

In this way, radiated light having different radiation angles can be efficiently guided into the columnar body 6 by increasing the refractive index of a medium between the columnar body 6 and the grating 8c to be a refractive index of 1.8 or higher, for example.

Figure 13A:
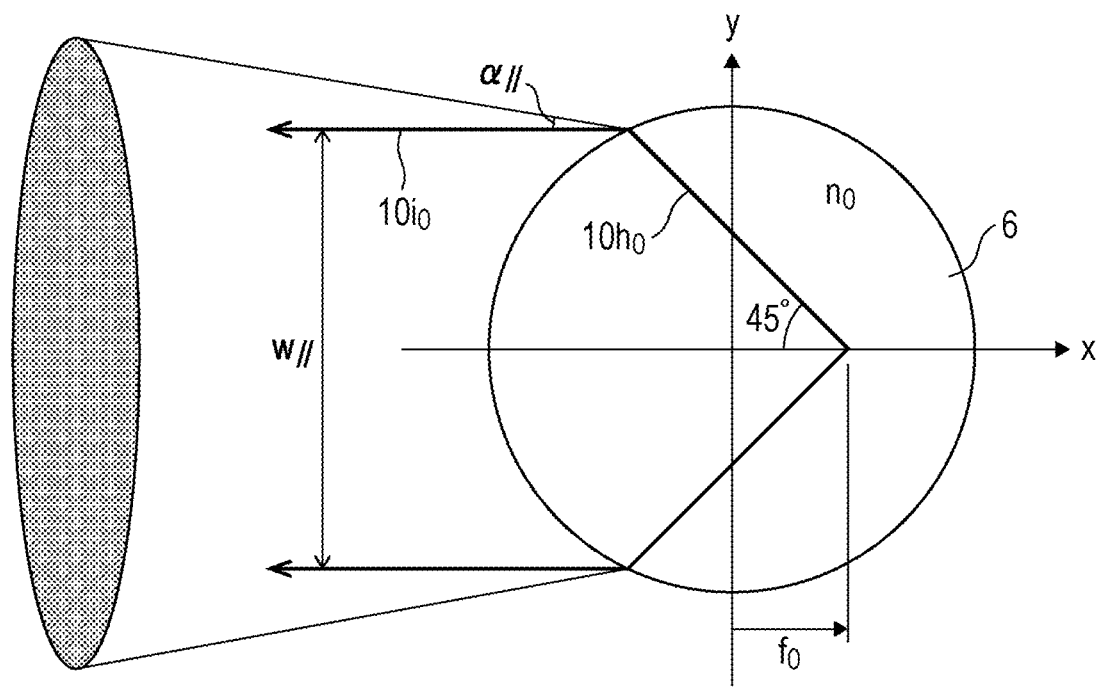
FIG. 13A is a horizontal cross-sectional view depicting the relationship between radiated light from the output grating coupler and the beam width of refracted light from the columnar surface.
Figure 13B:
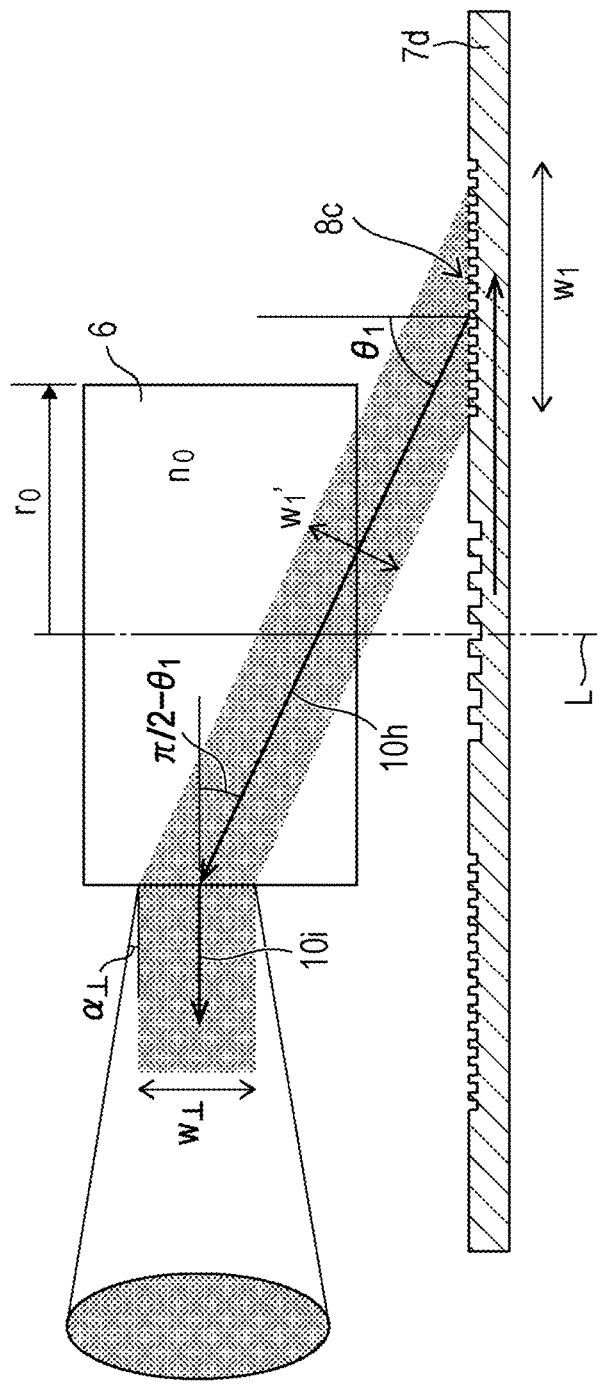
FIG. 13B is a vertical cross-sectional view depicting the relationship between radiated light from the output grating coupler and the beam width of refracted light from the columnar surface.

FIGS. 13A and 13B are respectively a horizontal cross-sectional view and a vertical cross-sectional view depicting the relationship between radiated light from the grating 8c and the beam width of refracted light from the columnar surface in the first embodiment. In the example depicted in FIG. 13B, a beam width within the columnar body 6 satisfies the relationship of expression 16, using the radiation angle $\theta_1$ and the coupling length $w_1$ within the columnar body 6. A beam width $w_\perp$ of refracted light at the columnar surface satisfies the relationship of expression 17, using the radiation angle $\theta_1$ and the beam width $w_1$' within the columnar body 6. Consequently, the beam width $w_\perp$ is given by expression 18. Meanwhile, as depicted in FIG. 13A, if the light $10h_0$ having an argument range of −45 to 45 degrees in a horizontal cross section is subjected to aberration correction and becomes parallel light $10i_0$, a beam width $w_\parallel$ in the horizontal cross section is approximate to the diameter $2r_0$ of the columnar body 6. Consequently, refracted light from the columnar surface becomes parallel light having the beam width $w_⊥$ and the beam width $w_∥$. These light beams are Fraunhofer-diffracted with a propagation of a sufficiently long distance. A divergence angle $α_⊥$ and a divergence angle $α_∥$ thereof are given by expressions 19 and 20, respectively.

$$w'_1 = w_1 \cos θ_1 \quad (16)$$

$$w_⊥ = w'_1 / \sin θ_1 \quad (17)$$

$$w_⊥ = w_1 / \tan θ_1 \quad (18)$$

$$\sin α_⊥ = \frac{1.21λ}{w_⊥} \quad (19)$$

$$\sin α_∥ = \frac{1.21λ}{w_∥} \quad (20)$$

In the case where the wavelength $λ=0.94$ µm, the radius $r_0=1.25$ mm, the coupling length $w_1=1.5$ mm, and the radiation angle $θ_1=66$ degrees, $α_⊥=0.1$ degrees and $α_∥=0.02$ degrees, and the beam divergence is kept sufficiently small. When the beam divergence is small, the diffusion of outward light can be suppressed. It is thereby possible to increase the amount of light detected.

Figure 14A:
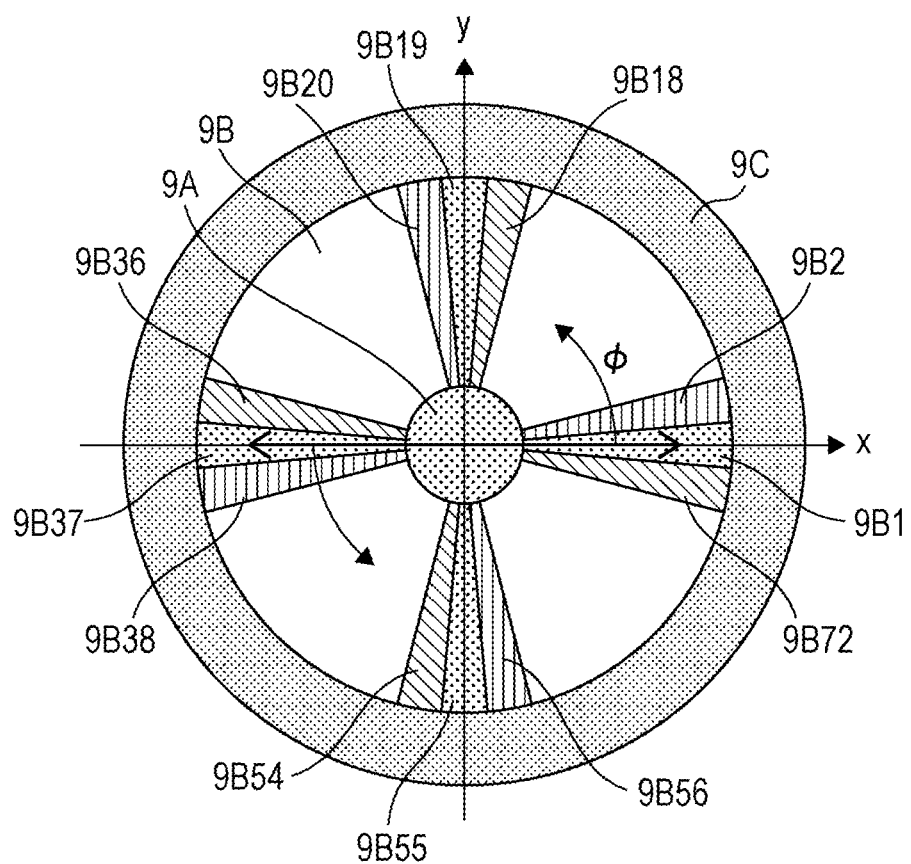
FIG. 14A is a drawing illustrating the relationship between the pattern of the transparent electrode layer and the propagation direction of guided light.
Figure 14B:
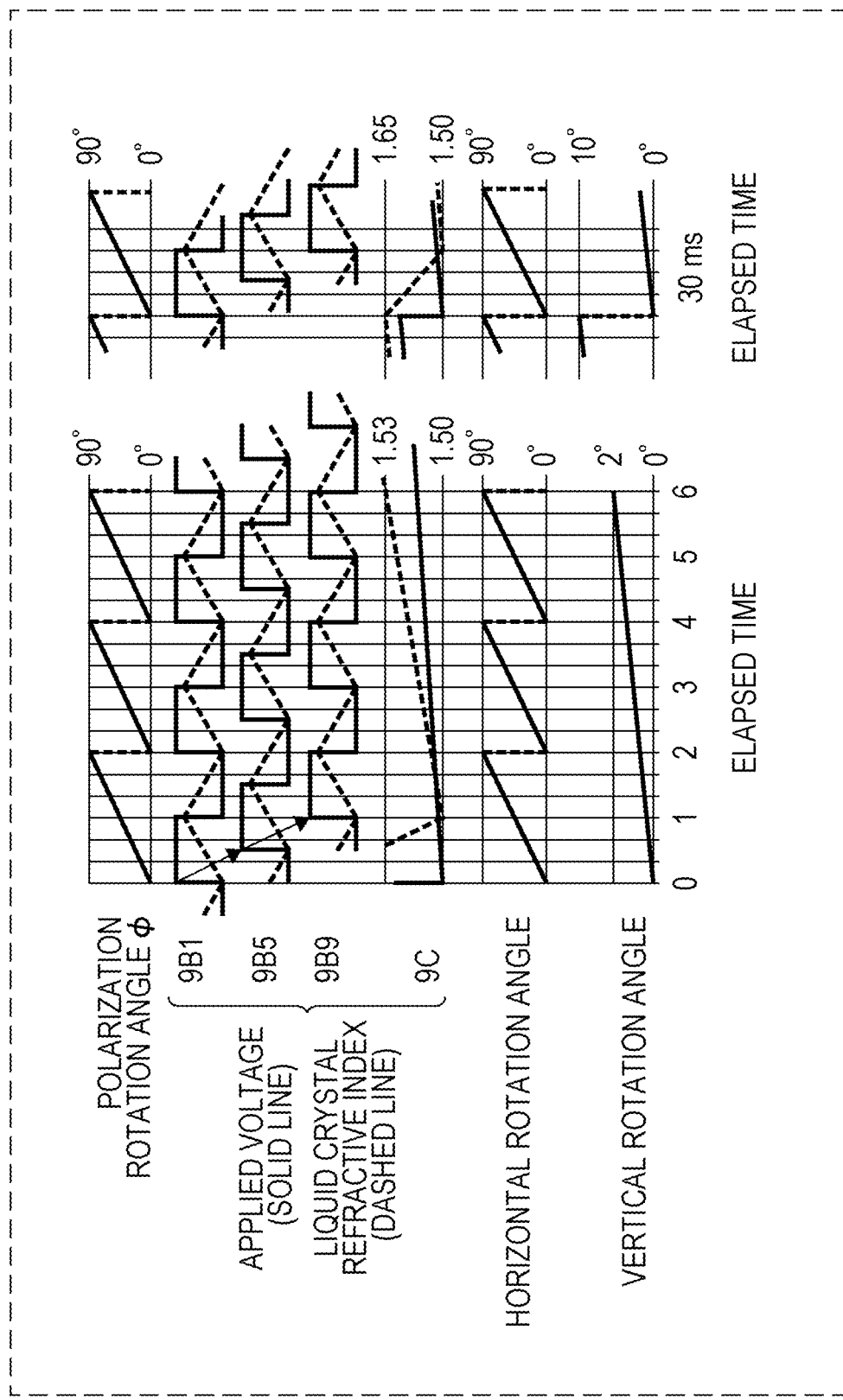
FIG. 14B is a drawing illustrating the relationship over time between the polarization rotation angle of input light, the voltage applied to a transparent electrode, and horizontal and vertical rotation angles.

FIG. 14A is a drawing illustrating the relationship between the pattern of the transparent electrode layer and the propagation direction of guided light in the first embodiment. FIG. 14B is a drawing illustrating the relationship over time between the polarization rotation angle of input light and the voltage applied to the transparent electrode, in the case of laser scanning using only liquid crystal refractive index control in the first embodiment. It should be noted that a description is given here with the limit for the response speed of liquid crystal being 1 ms between on/off and the beam scanning speed being 30 ms per frame.

In the example depicted in FIG. 14A, the voltage applied to the divided electrode 9B has a period of 90 degrees in the rotation direction. For example, the same voltage is applied to the electrodes 9B1, 9B19, 9B37, and 9B55. The same voltage is also applied to the electrodes 9B2, 9B20, 9B38, and 9B56. The voltage applied to an electrode within an angle range of 90 degrees, which is one period, indicates a voltage distribution pattern having a high/low difference under the condition that aberration is corrected. This voltage distribution pattern rotates in synchronization with the polarization rotation angle φ implemented by the polarization rotator, in a state where the pattern shape is maintained. The rotation of polarization is able to respond much faster compared to the voltage distribution pattern. Consequently, within the period of the voltage distribution pattern, it is also possible to cause only the polarization to rotate and to detect reflected light from a plurality of directions.

In the example depicted in FIG. 14B, the polarization rotation angle φ of input light repeats in the range of 0 to 90 degrees with a period of T=2 ms. The voltage applied to the electrode 9B1 represented by a solid line repeatedly transitions between high/low as a rectangular signal having a period of 2 ms. The frequency of this repetition is approximate to the response limit of liquid crystal. Therefore, the change in the refractive index of liquid crystal represented by the dashed line is more gradual than the change in the applied voltage and exhibits a movement having a period of 2 ms. As indicated by the diagonal arrows, by gradually shifting the phase of the applied voltage from the electrode 9B2 to the electrode 9B3, the phase of the applied voltage in the electrode 9B9 is shifted by a half period, and the phase of the applied voltage in the electrode 9B18 is shifted by one period, namely 2 ms. The phase shift range for the applied voltage is decided according to a rule for correcting aberration. In the entire electrode 9B, the voltage distribution pattern rotates in synchronization with the polarization rotation angle φ. The movement of the voltage distribution pattern corresponds to horizontal scanning performed using an emission beam.

The voltage applied to the electrode 9C represented by a solid line increases and decreases linearly with a period of 30 ms. The change in the refractive index of liquid crystal represented by the dashed line also exhibits the same movement as the applied voltage. However, the change in the refractive index of liquid crystal is more gradual compared to the sharp falls of the applied voltage. The change in the refractive index of liquid crystal with the electrode 9C corresponds to the change in the angle of the radiated light from the grating 8c. Consequently, vertical scanning performed using an emission beam exhibits a linear oscillation with a period of 30 ms. From expression 5, if $n_0=1.58$, $θ_1=75$ degrees, and $ΔN=0.045$, the change range of $θ_1$ is 6.3 degrees. From expressions 3 and 4, if $Λ_2=2.5$ µm, the change in the emission angle $θ_⊥$ in the vertical direction is approximately 10 degrees. Consequently, by applying a voltage to the electrode 9C, it is possible to perform vertical scanning with a change in emission angle of 10 degrees where a period is 30 ms.

Figure 14C:
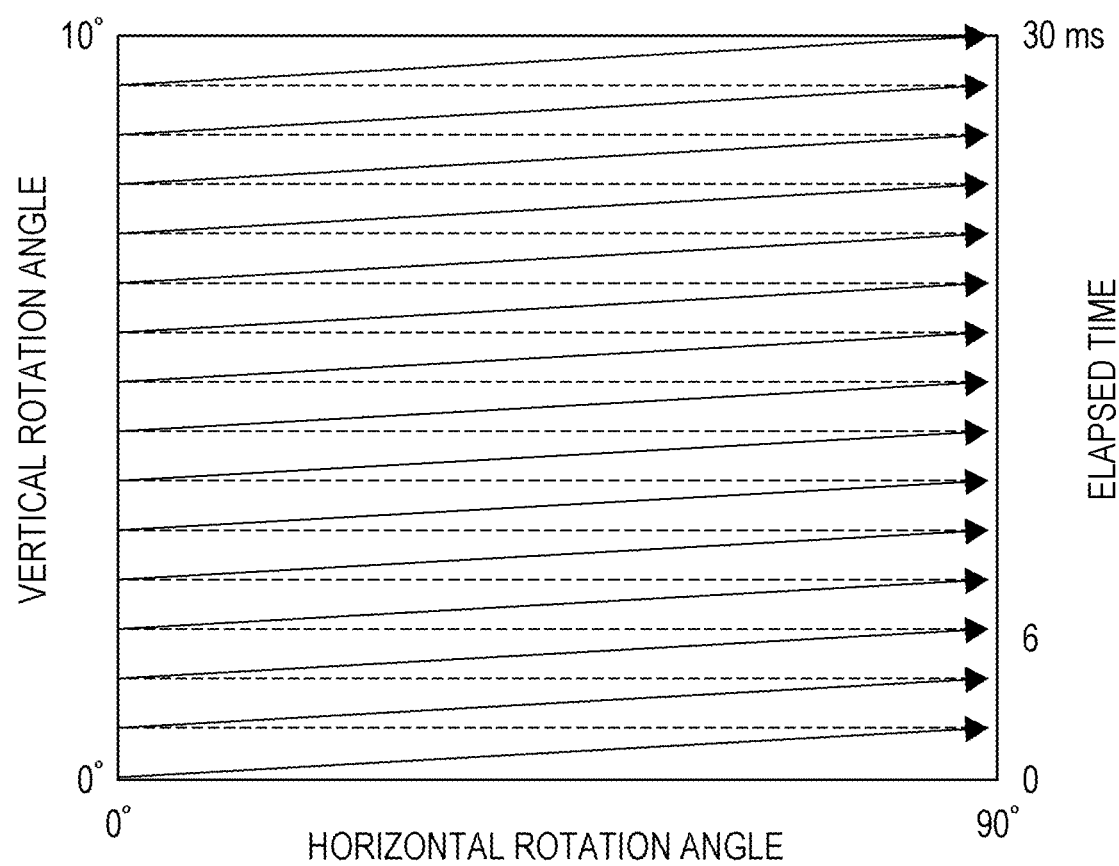
FIG. 14C is a drawing depicting the state of horizontal and vertical scanning using laser light.

FIG. 14C is a drawing depicting the state of horizontal and vertical scanning using laser light.

By controlling polarization and controlling liquid crystal orientation with respect to the electrode 9B, scanning is carried out in the horizontal direction in the range from 0 to 90 degrees. By controlling liquid crystal orientation with respect to the electrode 9C, the scanning position is shifted up to 10 degrees in the vertical direction over 30 ms. In other words, scanning is carried out in the horizontal direction from 0 to 90 degrees while shifting in the vertical direction, and thereafter the horizontal position returns to 0 degrees while maintaining the vertical position as it is. This motion is repeated 15 times. In the next scan, the scanning position is returned to a vertical position of 0 degrees and a horizontal position of 0 degrees which is the original position, and the same motion as above is repeated. There is no limit to the resolution in the horizontal direction, and the resolution in the vertical resolution, namely the number of scanning lines, is 15 per 30 ms frame.

Figure 15A:
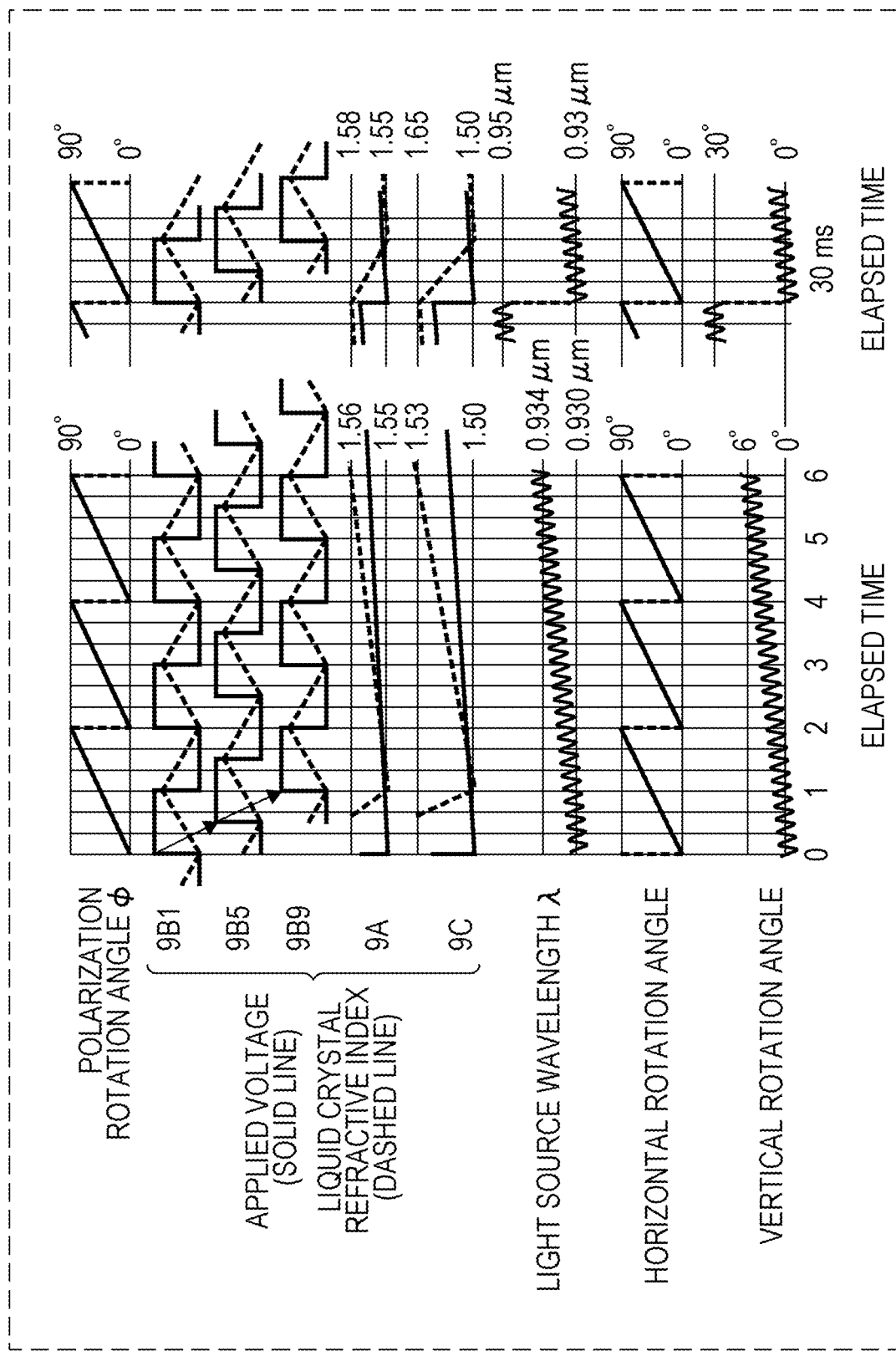
FIG. 15A is a drawing illustrating the relationship over time between the polarization rotation angle of input light, a light source wavelength, the voltage applied to a transparent electrode, and horizontal and vertical rotation angles.
Figure 15B:
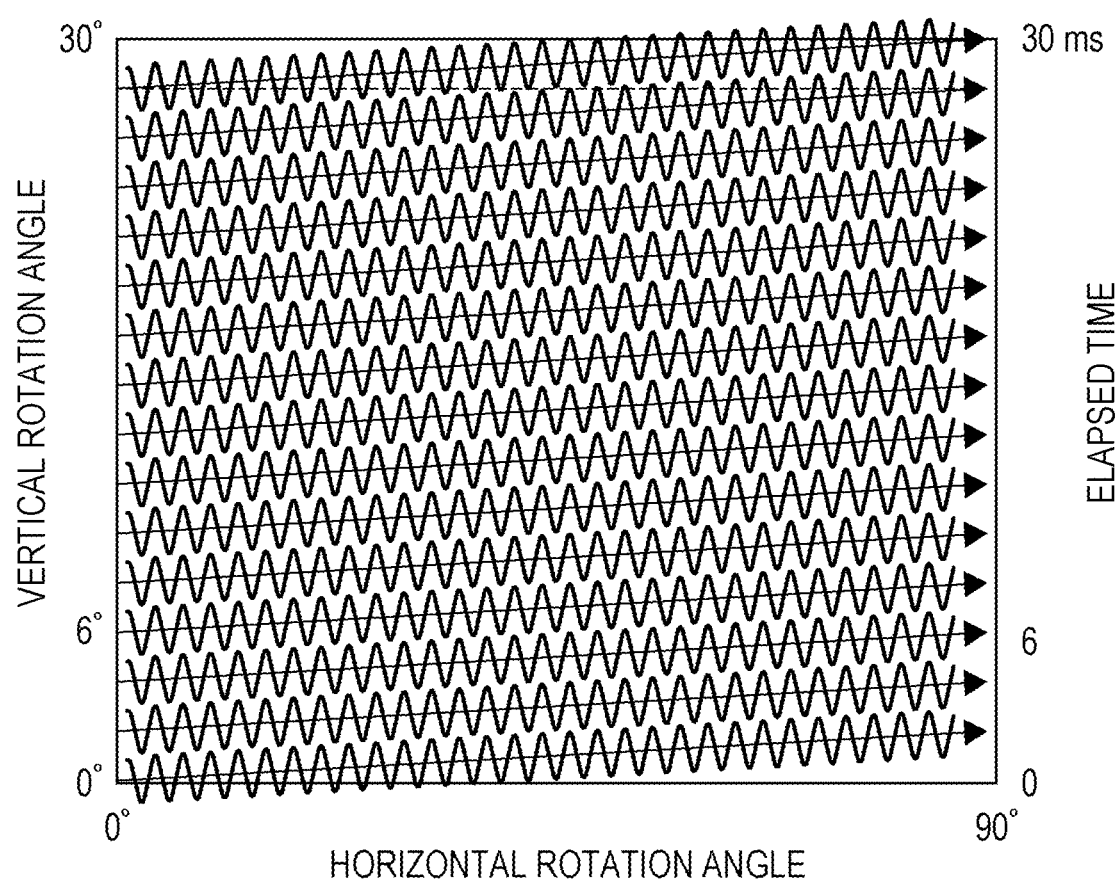
FIG. 15B is a drawing depicting the state of horizontal and vertical scanning of laser light.

FIG. 15A is a drawing illustrating the relationship over time between the polarization rotation angle of input light, the light source wavelength, the voltage applied to the transparent electrode, and the horizontal and vertical rotation angles, in the case of laser scanning using both liquid crystal refractive index control and variable control of the light source wavelength, in the first embodiment. FIG. 15B is a drawing depicting the state of horizontal and vertical scanning of laser light. The relationship between the pattern of the transparent electrode layer and the propagation direction of guided light is as described in the example depicted in FIG. 14A. Furthermore, a description is given here with the limit for the response speed of liquid crystal being 1 ms between on/off and the beam scanning speed being 30 ms per frame. The principles of variably controlling the wavelength have been described in the example depicted in FIG. 1C. Aside therefrom, there is a super-periodic structure diffraction type of DBR (Distributed Bragg Reflector), for example. A super-periodic structure diffraction type of DBR is able to sweep a range of 40 nm as a wavelength change range at high speed with a period of 20 KHz.

In the example depicted in FIG. 15A, the polarization rotation angle φ of input light repeats in the range of 0 to 90 degrees with a period of T=2 ms. The voltage applied to the electrode 9B1 represented by a solid line repeatedly transitions between high/low as a rectangular signal having a period of 2 ms. The frequency of this repetition is approximate to the response limit of liquid crystal. Therefore, the change in the refractive index of liquid crystal represented by the dashed line is more gradual than the change in the applied voltage and exhibits a movement having a period of 2 ms. As indicated by the diagonal arrows, by gradually shifting the phase of the applied voltage from the electrode 9B2 to the electrode 9B3, the phase of the applied voltage is shifted by a half period in the electrode 9B9, and the phase of the applied voltage is shifted by one period, namely 2 ms, in the electrode 9B18. The phase shift range for the applied voltage is decided according to a rule for correcting aberration. In the entire electrode 9B, the voltage distribution pattern rotates in synchronization with the polarization rotation angle φ. The movement of the voltage distribution pattern corresponds to horizontal scanning performed using an emission beam.

The voltage applied to the electrodes 9A and 9C represented by solid lines repeatedly increase and decrease with a period of 30 ms. The change in the refractive index of liquid crystal represented by the dashed lines also exhibits the same movement as the applied voltage. However, the change in the refractive index of liquid crystal is more gradual compared to the sharp falls of the applied voltage.

The wavelength of the light source 1 gradually increases from 0.93 to 0.95 μm within 30 ms while repeating a high-frequency oscillation with a total amplitude of 1.5 nm, and this movement is repeated in periods of 30 ms. When the wavelength of the light source 1 changes, the input conditions at the grating 8a change. Consequently, in order to respond to changes in the input conditions, the voltage applied to the electrode 9A also gradually increases within 30 ms, and this movement is repeated in periods of 30 ms. A high-frequency wavelength fluctuation with a total amplitude of 1.5 nm does not have a large effect on input efficiency. For this reason, the voltage applied to the electrode 9A is set so as to correspond to only a low-frequency fluctuation of a 20 nm range. The change in the refractive index of liquid crystal with the electrode 9C corresponds to the change in the angle of the radiated light from the grating 8c. Consequently, together with the wavelength change, vertical scanning performed using an emission beam exhibits a linear oscillation with a period of 30 ms.

From expression 7, if $n_0=1.58$, $\theta_1=75$ degrees, $\Lambda_1=0.29$ μm, and $\Lambda_2=2.5$ μm, the change in the emission angle $\theta_\perp$ in the vertical direction becomes approximately 30 degrees due to a wavelength change of 20 nm and an effective refractive index change of $\Delta N=0.045$. In addition, due to a high-frequency wavelength oscillation with a total amplitude of 1.5 nm, an emission angle oscillation with a total amplitude of 2 degrees is obtained in the vertical direction.

FIG. 15B is a drawing depicting the state of horizontal and vertical scanning performed using laser light. By controlling polarization and controlling liquid crystal orientation with respect to the electrode 9B, scanning is carried out in the horizontal direction in the range from 0 to 90 degrees. Due to liquid crystal orientation control with respect to the electrode 9C and low-frequency wavelength control, the scanning position is shifted up to 30 degrees in the vertical direction over 30 ms. Furthermore, due to high-frequency wavelength control, each scanning line oscillates with a total oscillation range of 2 degrees in the vertical direction. In other words, scanning is carried out in the horizontal direction from 0 to 90 degrees while shifting in the vertical direction, and thereafter the horizontal position returns to 0 degrees while maintaining the vertical position as it is. This motion is repeated 15 times. In the next scan, the scanning position is returned to a vertical position of 0 degrees and a horizontal position of 0 degrees which is the original position, and the same motion is repeated. There is no limit to the resolution in the horizontal direction. The resolution in the vertical resolution, namely the number of scanning lines, is 15 per 30 ms frame. The interval between scanning lines is 30 degrees/15=2 degrees. However, the scanning lines oscillate such that the spaces between the vertical directions are filled. Consequently, there is also substantially no limit to the resolution in the vertical resolution.

The voltage applied to the electrode 9A is used for control to maximize the input coupling efficiency. The control circuit 32 controls the efficiency at which the light 10f couples with the light 10g that propagates in the waveguide layer 7d, namely the input coupling efficiency, by adjusting the voltage applied to the electrode 9A. The voltage applied to the electrode 9C is used to control the radiation angle. The control circuit 32 controls the direction of the light 10h emitted from the grating 8c to outside thereof, by adjusting the voltage applied to the electrode 9C. As previously mentioned, while the light source 1 is emitting the light 10a, a portion of the light 10a emitted by the light source 1 passes through the polarization rotator 5, is reflected by the optical waveguide element 7, once again passes through the polarization rotator 5, and is detected by the photodetector 12 via the polarization light splitter 4. Thus, the maximum value of the amount of light detected by the photodetector 12 when the light source is emitting light is proportional to the efficiency of the light that could not be input to the grating 8a out of the incident light. Consequently, the voltage applied to the electrode 9A is controlled so as to minimize the maximum value of the amount of light detected when the light source emits light. While the light source 1 is emitting the light 10a, the control circuit 32 controls the voltage applied to the electrode 9A to thereby minimize the maximum value of the amount of light detected by the photodetector 12. This operation is carried out by recording the maximum value in a time-sequential manner, comparing changes in the maximum value at each control period of the voltage applied to the polarization rotator 5 by the control circuit 31, and analyzing the direction of minimization.

Figure 16A:
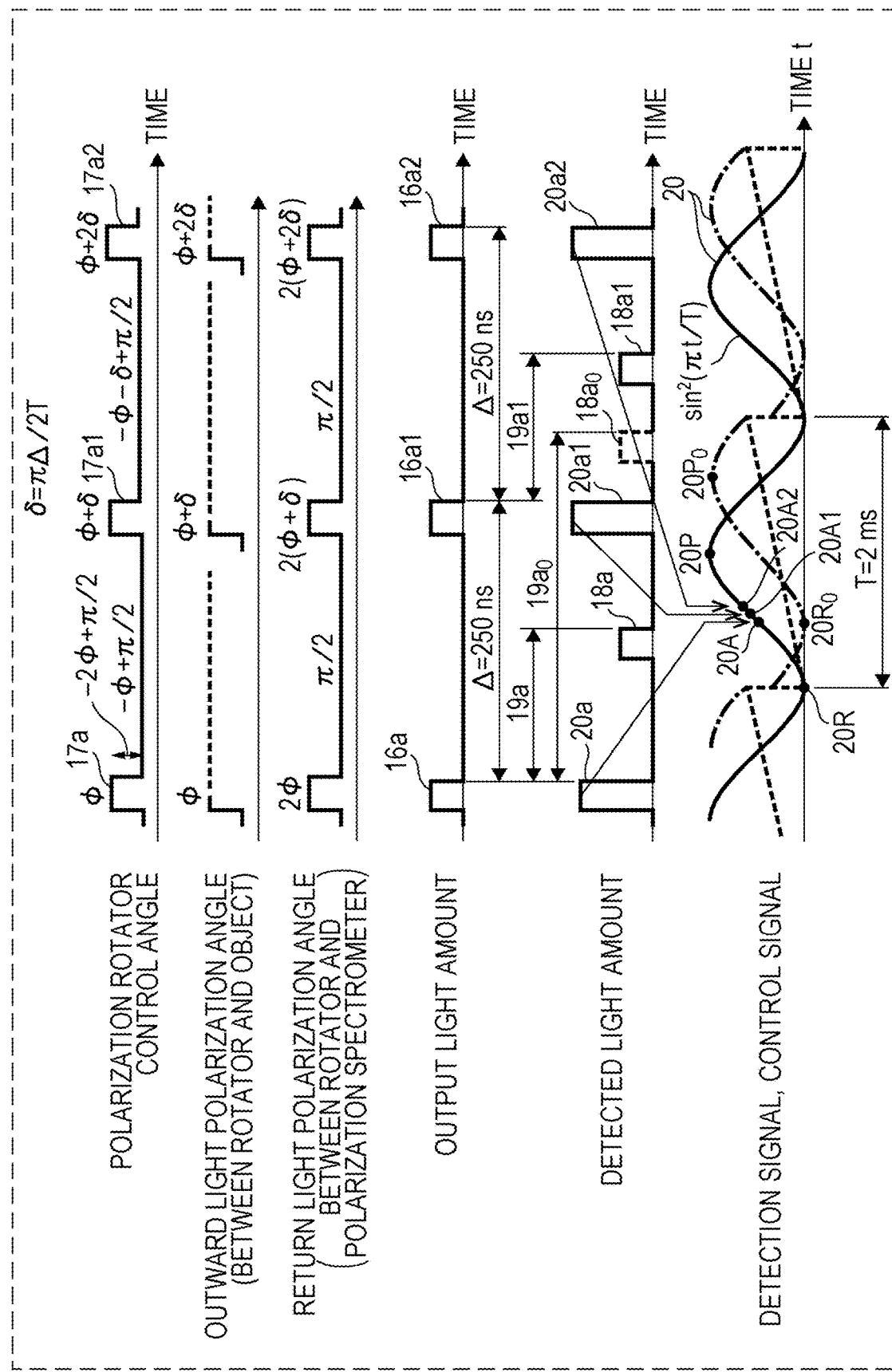
FIG. 16A is a drawing depicting the relationship over time between a polarization rotator control signal, a light polarization angle, the amount of light output by a light source, and the amount of light detected by a photodetector.
Figure 16B:
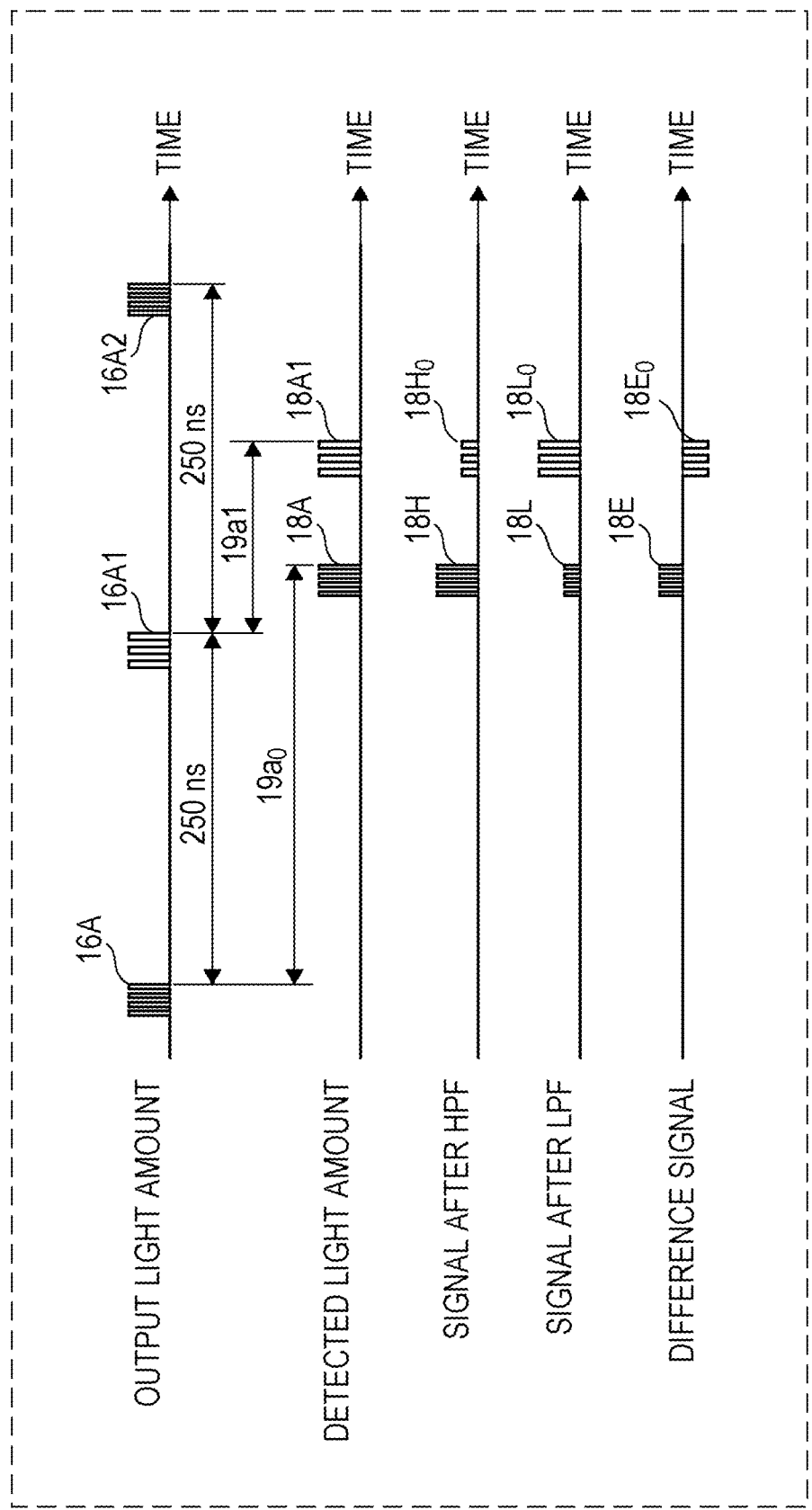
FIG. 16B is a drawing depicting the relationship over time between a polarization rotator control signal, the amount of light output by a light source, and the amount of light detected by a photodetector.

FIGS. 16A and 16B are drawings depicting the relationship over time between control signals for the polarization rotator 5, amounts of light output by the light source 1, and amounts of light detected by the photodetector 12, in the first embodiment. Compared to the example depicted in FIG. 16A, in the example depicted in FIG. 16B, frequency signals are superposed on rectangular pulses.

In the example depicted in FIG. 16A, an oscillation signal from the control circuit 30 controlling the oscillation of the light source 1 changes as a rectangular pulse having a width of 10 ns every 4=250 ns, for example. Signal waveforms 16a, 16a1, and 16a2 correspond to the amount of output light of light pulses emitted from the light source 1 in accordance with the rectangular-pulse control signals. A pulse oscillation every 250 ns results in 120,000 pulses within one frame of 30 ms. This corresponds to scanning being performed over a range of 90×30 degrees at a pixel resolution of 600×200 (=120,000) if the resolution is aligned in the horizontal and vertical directions.

The control signals 17a, 17a1, and 17a2 from the control circuit 31 controlling polarization are also switched in synchronization with the signal waveforms 16a, 16a1, and 16a2 constituting the aforementioned pulse signals. The polarization rotation angle is controlled as follows, for example. First, the polarization rotation angle φ is set in the time range of the rectangular pulse of the signal waveform 16a, and the polarization rotation angle π/2−φ is set in the time range between the rectangular pulse of the signal waveform 16a and the rectangular pulse of the signal waveform 16a1. The polarization rotation angle in the time range between the rectangular pulse of the signal waveform 16a and the rectangular pulse of the signal waveform 16a1, namely the polarization rotation angle at the time of detection, is generally π/2−φ+nπ where n is an integer. n is determined so that the absolute value of the polarization rotation angle is minimized. In the rectangular pulse of the signal waveform 16a1, an amount of change δ (=πΔ/2T) corresponding to the beam scanning is added, the polarization rotation angle becomes φ+δ in the time range of the rectangular pulse of the signal waveform 16a1, and the polarization rotation angle becomes π/2−φ−δ in the time range between the rectangular pulse of the signal waveform 16a1 and the rectangular pulse of the signal waveform 16a2. In the rectangular pulse of the signal waveform 16a2, an amount of change δ corresponding to the beam scanning is added, and the polarization rotation angle becomes φ+2δ in the time range of the rectangular pulse of the signal waveform 16a2. During T=2 ms, a quarter rotation is performed about the axis L. The polarization angles of outward light between the polarization rotator 5 and the object become φ, φ+δ, and φ+2δ in the rectangular pulses of the signal waveforms 16a, 16a1, and 16a2, respectively. The polarization angles of return light between the polarization rotator 5 and the polarization light splitter 4 become 2φ, 2(φ+δ), and 2(φ+2δ) in the time ranges of the rectangular pulses of the signal waveforms 16a, 16a1, and 16a2, respectively, and π/2 in other time ranges.

In the example depicted in FIG. 1A, light emitted according to the rectangular pulses of the signal waveforms 16a, 16a1, and 16a2 is emitted as a parallel beam 10i from the columnar body 6. Light reflected from outside returns in a time range outside of the rectangular pulses. Consequently, the polarization direction of the reflected light is rotated 90 degrees compared with the time of light emission through the polarization rotator 5. The reflected light for which the polarization direction has been rotated 90 degrees is detected as a signal waveform 18a and a signal waveform 18a1 by the photodetector 12 via the polarization light splitter 4, for example. The time interval 19a between the end edges of the signal waveform 16a and the signal waveform 18a and the time interval 19a1 between the end edges of the signal waveform 16a1 and the signal waveform 18a1 are referred to as a TOF (time-of-flight) signals. A TOF signal may be the time interval between the front ends. The distance to the external object can be calculated based on this time difference. For example, in a case where the time delay of reflected light is 250 ns, the distance to the object is 37.5 m. In the model depicted in FIG. 16A, it is possible to measure up to 37.5 m.

However, within light of the rectangular pulses of the signal waveforms 16a, 16a1, and 16a2, components reflected by the optical waveguide element 7 pass through the polarization rotator 5 once again, the polarization angles rotate by 2φ, 2(φ+δ), and 2(φ+2δ), respectively, compared with the time of light emission, and are detected as signal waveforms 20a, 20a1, and 20a2, respectively, by the photodetector 12 via the polarization light splitter 4. An extracted detection signal 20 represented by a solid line is a signal obtained by extracting the signal waveforms 20a, 20a1, and 20a2 in the time ranges of the rectangular pulses of the signal waveforms 16a, 16a1, and 16a2 from among the detection signals, for example. The time ranges of the rectangular pulses of the signal waveforms 16a, 16a1, and 16a2 correspond to the time during which the light source emits light. For reference, the polarization rotation angles in the time ranges of the rectangular pulses of the signal waveforms 16a, 16a1, and 16a2 are extracted and are overlaid using dashed lines. T=2 ms is taken as the period of the polarization rotation control signal. The polarization rotation angle changes from 0 to 90 degrees for each period T. In response, the extracted detection signal 20 draws a sin-squared curve with T as the period. The signal waveforms 20a, 20a1, and 20a2 correspond to extracted detection signals 20A, 20A1, and 20A2, respectively, on the extracted detection signal 20.

A minimum point 20R on the extracted detection signal 20 corresponds to the start point or end point of the period of the polarization rotation control signal. A maximum point 20P corresponds to an intermediate point between the start point and end point of the polarization rotation control signal. More specifically, the interval between the minimum point 20R and the maximum point 20P is equal to 45 degrees. In other words, the rotation angles of the polarization rotation control signal and the detection signal match. In a case where the polarization rotator 5 is a Faraday rotator, the magnetic glass rod 5a constituting the polarization rotator 5 exhibits a change in a physical property value such as the Verdet constant given for the Faraday effect due to a change in temperature and/or wavelength. When the characteristics of the polarization rotator 5 have deviated, the polarization does not rotate according to the control signal. For example, when the polarization rotation sensitivity with respect to the applied voltage decreases, the extracted detection signal 20 extends with respect to the time axis, as indicated by the dot-dash line in FIG. 16A. At this time, the minimum point $20R_0$ on the extracted detection signal 20 is shifted from the start point or the end point of the polarization rotation control signal, and the interval between the minimum point $20R_0$ and the maximum point $20P_0$ is shifted from 45 degrees. In other words, the rotation angles of the polarization rotation control signal and the detection signal do not match. To address this problem, the control circuit 31 detects the minimum point 20R and the maximum point 20P in each period from the extracted detection signal 20. The minimum point 20R corresponds to the start point or the end point of the period of the polarization rotation control signal. The time interval between the minimum point 20R and the maximum point 20P is controlled so as to be a time with which the polarization rotation angle becomes 45 degrees. The polarization rotation angle of 45 degrees is ½ of 90 degrees, which is the period of the polarization rotation control signal. This operation is performed by the control circuit 31 at each control period (T) of the voltage applied to the polarization rotator 5.

The maximum value 20P of the detection signal 20 in the time ranges of the rectangular pulses of the signal waveforms 16a, 16a1, and 16a2 is proportional to the efficiency of the light that could not be input out of the incident light. Consequently, the output value of the maximum value 20P is used as a control signal when controlling the voltage applied to the electrode 9A in order to maximize the input coupling efficiency. The input efficiency increases as the maximum value 20P decreases. The control circuit 32 adjusts the voltage applied to the electrode 9A such that the maximum value 20P decreases, at each period (T) of the voltage applied to the polarization rotator 5. Thus, the control circuit 32 controls the efficiency at which the light 10*f* couples with the light 10*g* that propagates in the waveguide layer 7*d*, namely the input efficiency.

Given the above, the control circuits 31, 32, and 34 carry out the following operations.

The control circuit 31 adjusts the voltage applied to the polarization rotator 5, while the light source 1 is emitting the light 10*a*. The control circuit 34 obtains the maximum and minimum values of the amount of the light that passes through the polarization rotator 5, is reflected by the optical waveguide element 7, once again passes through the polarization rotator 5, and is detected by the photodetector 12 via the polarization light splitter 4. The control circuit 34 controls the rotation angle of the polarization direction 11*e* of the light 10*e* that has passed through the polarization rotator 5, by comparing the time positions of the maximum and minimum values. The control circuit 32 adjusts the voltage applied to the electrode 9A and controls the input efficiency of the light 10*g* that propagates in the waveguide layer 7*d*, by comparing the changes in the maximum value.

It should be noted that, as in the example depicted in FIG. 16A, when the time interval 19*a* becomes longer and becomes the time interval 19$a_0$, the signal waveform 18*a* is interposed between the rectangular pulses of the signal waveforms 16*a*1 and 16*a*2, and becomes the signal waveform 18$a_0$. As a result, it may be difficult to distinguish between the signal waveform 18$a_0$ and the signal waveform 18*a*1. At this time, as depicted in FIG. 16B, the frequencies of the adjacent pulse waveforms 16A and 16A1 are differentiated by superposing a high-frequency signal on an oscillation signal of the light source 1 and adding a high-frequency intensity modulation signal to the output light amount. To differentiate frequencies, high-frequency signals are superposed on the pulse waveform 16A and the pulse waveform 16A2, and a low-frequency signal is superposed on the pulse waveform 16A1, for example.

The superposed signals remain also in the detection signals 18A and 18A1 obtained in this manner. In a case where the detection circuit 33 includes a filter circuit, the detection signals 18A and 18A1 can be separated from the superposed signals by the superposed signals being processed by the filter circuit. The filter circuit functions as high-pass filter (HPF) or a low-pass filter (LPF). For example, if subjected to a high-pass filter, the detection signals 18A and 18A1 are respectively converted into signals 18H and 18$H_0$. If subjected to a low-pass filter, the detection signals 18A and 18A1 are respectively converted into signals 18L and 18$L_0$. A signal 18E is obtained from the difference between the signals 18H and 18L obtained by subtracting the signal 18L from the signal 18H. A signal 18$E_0$ is obtained from the difference between the signals 18$H_0$ and 18$L_0$ obtained by subtracting the signal 18$L_0$ from the signal 18$H_0$. By determining the positive or negative polarity of the signals 18E and 18$E_0$, it is possible to identify whether the detection signal 18A corresponds to the pulse waveform 16A or 16A1. As a result, the time intervals 19$a_0$ and 19*a*1 can be reliably measured. In the model depicted in FIG. 16B, it is possible to measure up to 75 m. If the frequency of the pulse waveform 16A2 can also be differentiated, the measurement distance can be further extended. The processing for superposed signals carried out by this kind of filter circuit can also be applied to a conventional optical device that measures the distance to an object.

Given the above, the control circuits 30 and 34 carry out the following operations.

The control circuit 30 causes the light source 1 to sequentially emit an optical pulse of the pulse waveform 16A and an optical pulse of the pulse waveform 16A1, in which intensity modulation signals of different frequencies are superposed.

The control circuit 34 causes the photodetector 12 to detect a portion of the optical pulse of the pulse waveform 16A and a portion of the optical pulse of the pulse waveform 16A1 which are emitted from the optical waveguide element 7, are reflected by the object, and are incident on the optical waveguide element 7, and to separately output a detection signal 18A corresponding to the amount of the portion of the optical pulse of the pulse waveform 16A and a detection signal 18A1 corresponding to the portion of the optical pulse of the pulse waveform 16A1.

It should be noted that the voltage applied to the electrode layer has a period of 90 degrees, as depicted in FIG. 14A. Consequently, four voltage distribution patterns are obtained with one rotation. These voltage distribution patterns exhibit a rotation motion at the response speed of liquid crystal. The response speed of the light emission implemented by the light source 1 and the polarization rotation speed implemented by the polarization rotator 5 far exceed the response speed of liquid crystal. Consequently, the emission of light and the polarization rotation can be controlled independently, in each of the plurality of directions corresponding to the voltage distribution pattern. For example, it is possible to emit light in two directions at once, cause beams to scan, and detect reflected light from the two directions. The two directions are, for example, a direction in the range of −45 to 45 degrees and a direction in the range of 45 to 135 degrees.

Figure 16C:
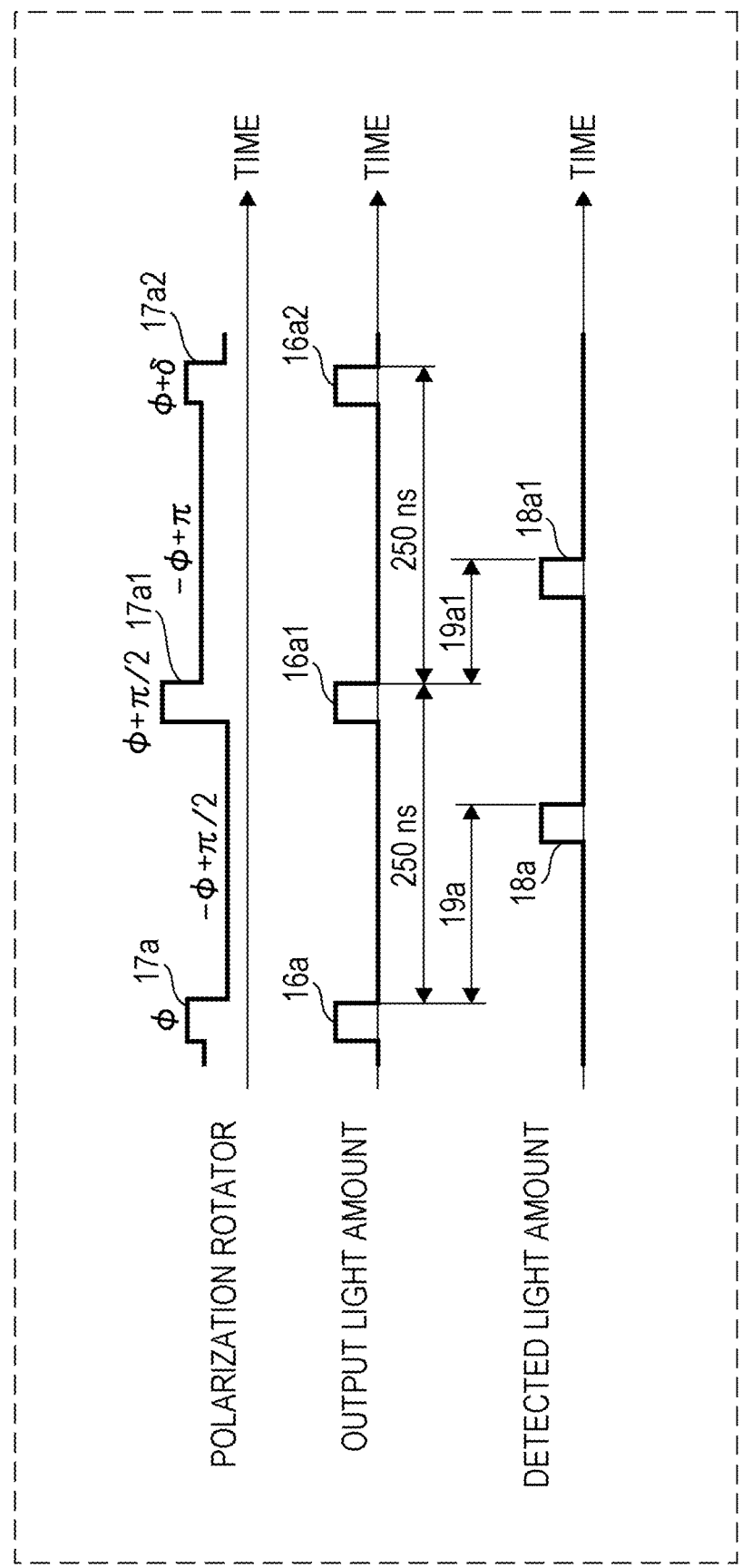
FIG. 16C is a drawing depicting the relationship over time between a polarization rotator control signal, the amount of light output by a light source, and the amount of light detected by a photodetector.

FIG. 16C is a drawing depicting the relationship over time between a control signal for the polarization rotator 5, the amount of light output by the light source 1, and the amount of light detected by the photodetector 12, in a case where overlapping scanning is carried out.

In the example depicted in FIG. 16C, an oscillation signal from the control circuit 30 controlling the oscillation of the light source 1 changes as a rectangular pulse having a width of 10 ns every 250 ns in a single direction, for example. Signal waveforms 16*a*, 16*a*1, and 16*a*2 correspond to the amount of output light of light pulses emitted from the light source 1 in accordance with the rectangular-pulse control signals. The control signals 17*a*, 17*a*1, and 17*a*2 from the control circuit 31 controlling polarization are also switched in synchronization with the signal waveforms 16*a*, 16*a*1, and 16*a*2 constituting the aforementioned pulse signals. The polarization rotation angle is controlled as follows, for example. In the rectangular pulse of the signal waveform 16*a*, the polarization rotation angle becomes φ in the time range of the rectangular pulse of the signal waveform 16*a*, and the polarization rotation angle becomes π/2−φ in the time range between the rectangular pulse of the signal waveform 16*a* and the rectangular pulse of the signal waveform 16*a*1. In the rectangular pulse of the signal waveform 16*a*1, the polarization rotation angle becomes φ+γ/2 in the time range of the rectangular pulse of the signal waveform 16*a*1, and the polarization rotation angle becomes −φ+π in the time range between the rectangular pulse of the signal waveform 16*a*1 and the rectangular pulse of the signal waveform 16*a*2. In the rectangular pulse of the signal waveform 16*a*2, an amount of change δ corresponding to the beam scanning is added, and the polarization rotation angle becomes φ+δ. The signal waveforms 16*a* and 16*a*2 correspond to light emission within a field of view having a range of −45 to 45 degrees, and the signal waveform 16a1 corresponds to light emission within a field of view having a range of 45 to 135 degrees.

In the example depicted in FIG. 1A, in the time range of the rectangular pulse of the signal waveform 16a, the light 10i is subjected to aberration correction and is emitted from the columnar body 6 within a field of view having a range of −45 to 45 degrees. Light reflected from outside returns outside the time range of the rectangular pulse of the signal waveform 16a. The polarization direction of the reflected light is rotated 90 degrees through the polarization rotator 5. Thereafter, the reflected light is separated toward the photodetector 12 by the polarization light splitter 4, and is detected as the signal waveform 18a by the photodetector 12. The time interval 19a between the end edges of the signal waveform 16a and the signal waveform 18a is a TOF signal. As a result, it is possible to detect the distance to the object within a field of view having a range of −45 to 45 degrees.

Similarly, also in the time range of the rectangular pulse of the signal waveform 16a1, the light 10i is subjected to aberration correction and is emitted from the columnar body 6 within a field of view having a range of 45 to 135 degrees. Light reflected from outside returns outside the time range of the rectangular pulse of the signal waveform 16a1. The polarization direction of the reflected light is rotated 90 degrees through the polarization rotator 5. Thereafter, the reflected light is separated toward the photodetector 12 by the polarization light splitter 4, and is detected as the signal waveform 18a1 by the photodetector 12. The time interval 19a1 between the end edges of the signal waveform 16a1 and the signal waveform 18a1 is a TOF signal. As a result, it is possible to detect the distance to the object within a field of view having a range of 45 to 135 degrees.

For example, in a case where the time delay of reflected light is 250 ns, the distance to the object is 37.5 m. In the model depicted in FIG. 16C, it is possible to measure up to 37.5 m in a range of −45 to 135 degrees, namely an angle range of 180 degrees.

It should be noted that the electrode patterning depicted in FIGS. 8B, 10A, and 10C may be formed at the reflection layer 7b side rather than the transparent electrode layer 7g side. In addition, the guided light 10g excited by the grating 8a may be in the TM mode. When using a liquid crystal element for the polarization rotator 5, a high-speed response is not possible such as with a Faraday rotator. Therefore, it is not possible to perform high-speed switching of the polarization angle synchronized with the on/off of light emission such as depicted in FIG. 16A. However, if a half mirror is used for the polarization light splitter 4, reflected light from outside can be detected without switching the polarization angle. In a case where a quarter-wave plate is used instead of the polarization rotator 5, circularly polarized light is incident on the grating 8a. Consequently, the guided light 10g is excited equally in all argument directions. Only some directions within the excitation light are subjected to aberration correction, and the light utilization efficiency decreases to a fraction. In this case also, if a half mirror is used for the polarization light splitter 4, reflected light from outside can be detected.

Consequently, according to the present embodiment, a narrowed laser beam having a divergence angle of 0.1 degrees or less can be emitted toward the external object. At such time, an emission beam can be scanned at a video speed of 30 frames or more per second within a field of view of 90 degrees in the horizontal direction and 30 degrees in the vertical direction. In addition, of the reflected light from the object, it is possible to remove stray light and selectively receive or detect only light having aligned wavelengths and phases. Furthermore, the detected light can be converted into accurate two-dimensional distance information of the object within the field of view. A three-dimensional positional relationship is obtained from the two-dimensional distance information.

Second Embodiment

Figure 17A:
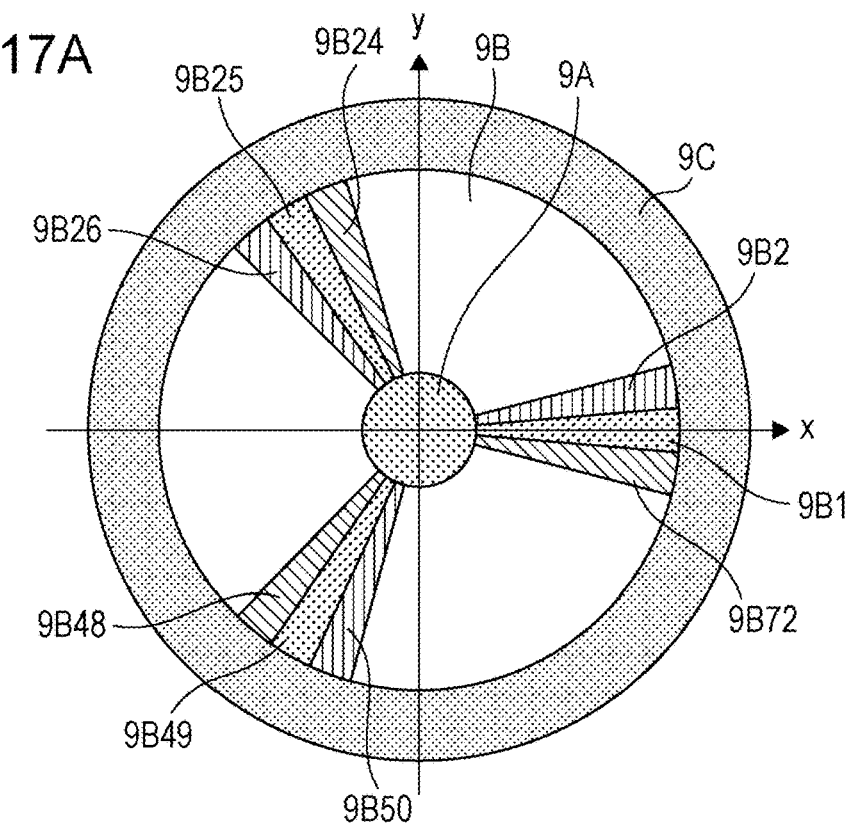
FIG. 17A is a drawing schematically depicting a pattern of a transparent electrode layer.
Figure 17B:
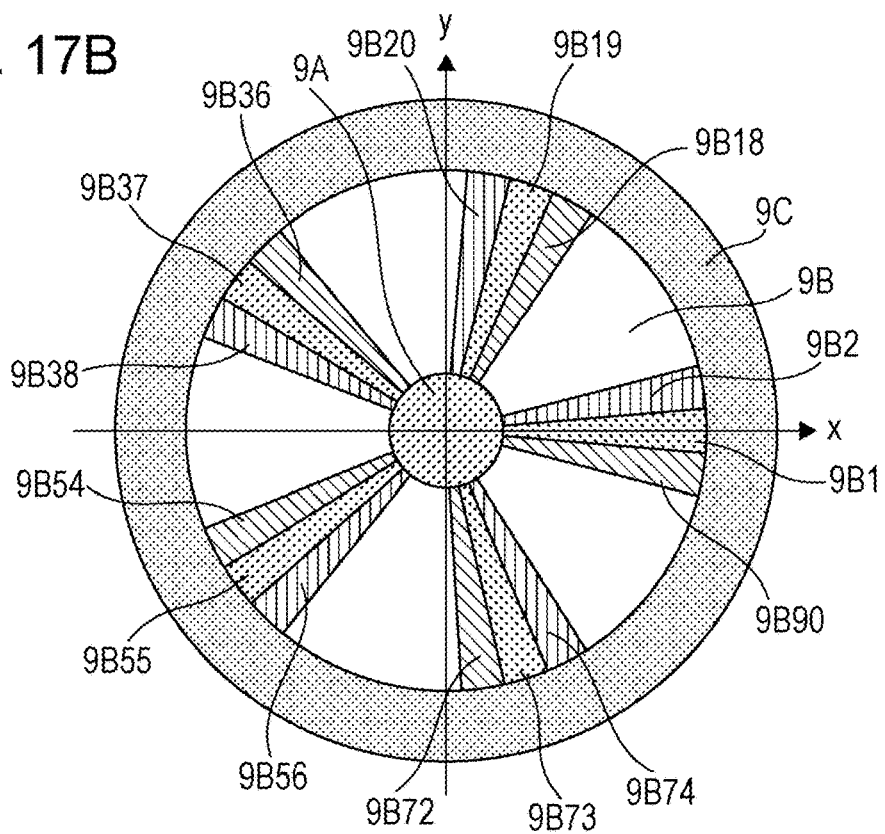
FIG. 17B is a drawing schematically depicting a pattern of a transparent electrode layer.

FIGS. 17A and 17B are drawings schematically depicting a pattern of a transparent electrode layer in a second embodiment.

In the example depicted in FIG. 17A, the voltage applied to the divided electrode layer has a period of 120 degrees. For example, the same voltage is applied to the electrodes 9B1, 9B25, and 9B49, and the same voltage is also applied to the electrodes 9B2, 9B26, and 9B50. The voltage applied to an electrode within an angle range of 120 degrees exhibits a high/low voltage distribution pattern under the condition that aberration is corrected. This voltage distribution pattern rotates in synchronization with the polarization rotation angle φ implemented by the polarization rotator, in a state where the pattern shape is maintained. In the division method depicted in FIG. 17A, the response speed of the light emission implemented by the light source 1 and the polarization rotation speed implemented by the polarization rotator 5 far exceed the response speed of liquid crystal. Therefore, the emission of light and the rotation of polarization can be controlled independently, in each of three directions corresponding to the voltage distribution pattern. Consequently, using the method depicted in FIG. 16C, light can be emitted in three directions at once, and reflected light from the three directions can be detected.

In the example depicted in FIG. 17B, the electrode 9B is divided equally into 4-degree segments in the rotation direction, and is divided into 90 segments from electrode 9B1 to electrode 9B90. The voltage applied to the divided electrode layers has a period of 72 degrees. For example, the same voltage is applied to the electrodes 9B1, 9B19, 9B37, 9B55, and 9B73. For example, the same voltage is also applied to the electrodes 9B2, 9B20, 9B38, 9B56, and 9B74. The voltage applied to an electrode within an angle range of 72 degrees exhibits a high/low voltage distribution pattern under the condition that aberration is corrected. This voltage distribution pattern rotates in synchronization with the polarization rotation angle φ implemented by the polarization rotator, in a state where the pattern shape is maintained. In the division method depicted in FIG. 17B, the emission of light and the rotation of polarization can be controlled independently, in each of five directions corresponding to the voltage distribution pattern. Consequently, using the method depicted in FIG. 16C, light can be emitted in five directions at once, and reflected light from the five directions can be detected.

As understood from FIGS. 1A and 1B, the paths of the light beams of light 10f onward act in a 180-degree symmetrical manner also including the return paths. In the first embodiment, aberration correction is also realized in a 180-degree symmetrical manner, as depicted in FIGS. 14A to 14C. As a result, two types of signals are superposed and return as reflection signals from outside, namely from within a field of view having a range of −45 to 45 degrees corresponding to the front, and from within a field of view having a range of 135 to 225 degrees corresponding to the rear. Light from two diagonally positioned directions is obtained from the same light emission. In this case, two types of signals can be separated by comparing with images obtained in another imaging system and adding image processing, for example. However, in the division methods depicted in FIGS. 17A and 17B, the two voltage distribution patterns positioned on opposite sides of 180 degrees are different from each other. Thus, although aberration correction is carried out on the one hand, a large aberration remains in the diagonal direction. Therefore, phase correction is also asymmetric, and detection signals do not overlap. Consequently, perspective image processing can be simplified compared to the first embodiment.

Third Embodiment

Figure 18:
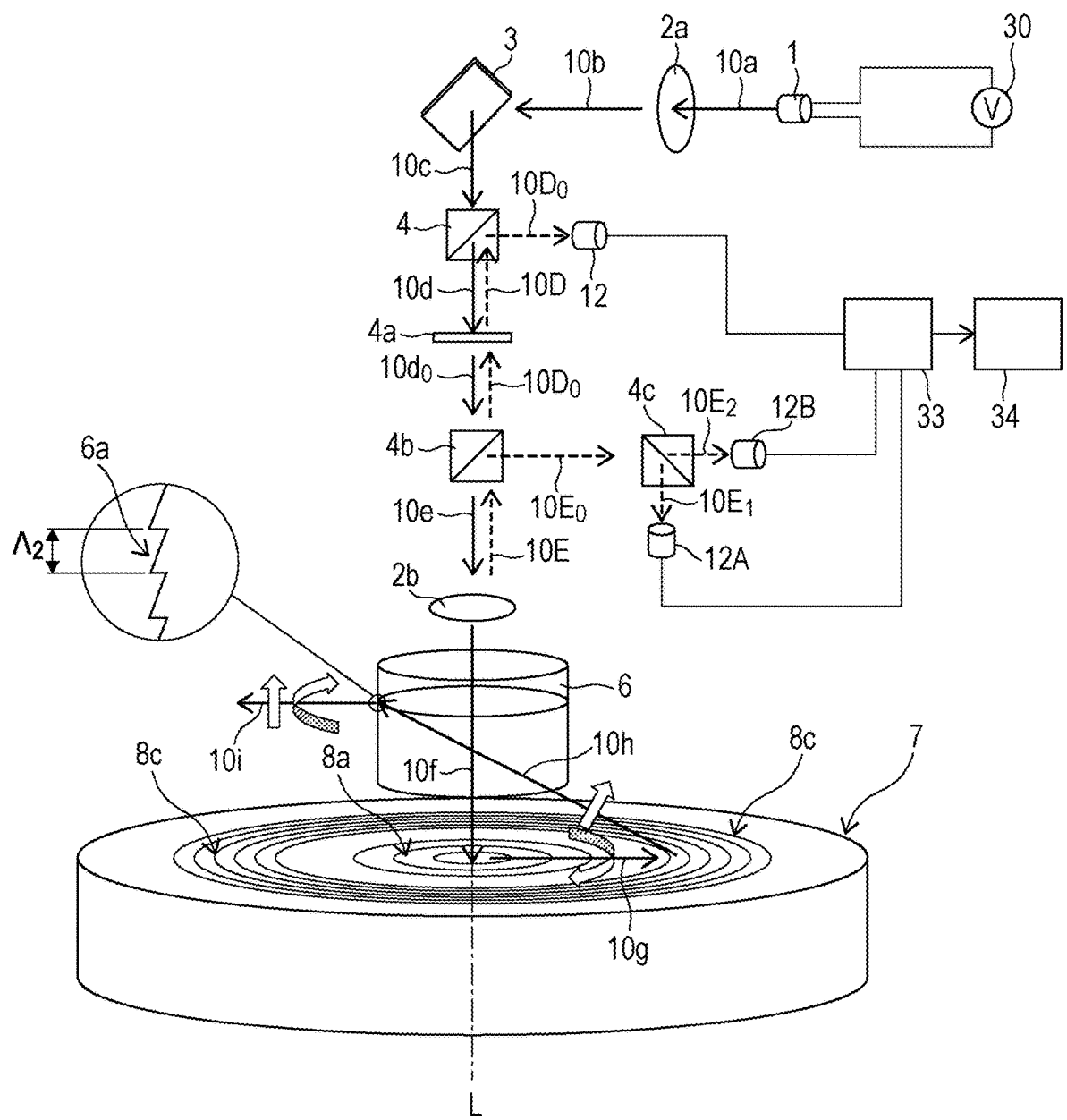
FIG. 18 is a perspective view schematically depicting the configuration of an optical device and the paths of light beams in a third embodiment.

FIG. 18 is a perspective view schematically depicting the configuration of an optical device and the paths of light beams in a third embodiment. The cross-sectional structure of the optical waveguide element 7 is similar to the structure depicted in FIG. 1B. In the third embodiment, the polarization rotator 5 in the first embodiment is replaced with a quarter-wave plate 4a and a half mirror 4b, the control circuit 31 is omitted, and a polarization light splitter 4c and photodetectors 12A and 12B are newly added. Aside therefrom, the configuration is the same as in the first embodiment, and overlapping descriptions are omitted.

Figure 19A:
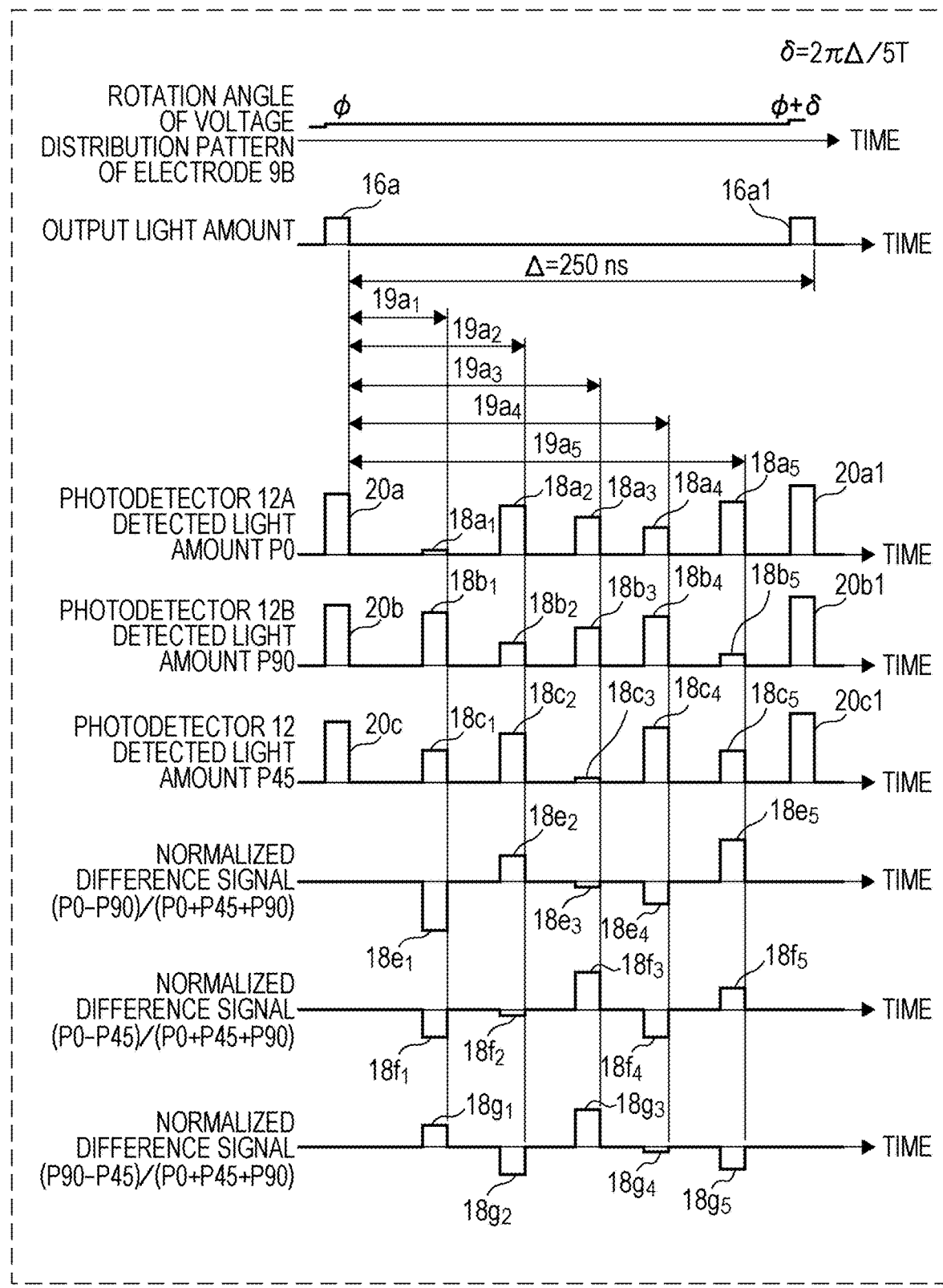
FIG. 19A is a drawing depicting the relationship over time between the rotation angle of a voltage distribution pattern of an electrode, the amount of light output by a light source, the amounts of light detected by photodetectors, and normalized difference signals therefor in the third embodiment.

FIG. 19A is a drawing depicting the relationship over time between the rotation angle of a voltage distribution pattern of the electrode 9B, the amount of light output by the light source 1, the detected light amounts P0, P90, and P45 of the photodetectors 12A, 12B, and 12, and normalized difference signals for the detected light amounts P0, P90, and P45 in the third embodiment.

Figure 19B:
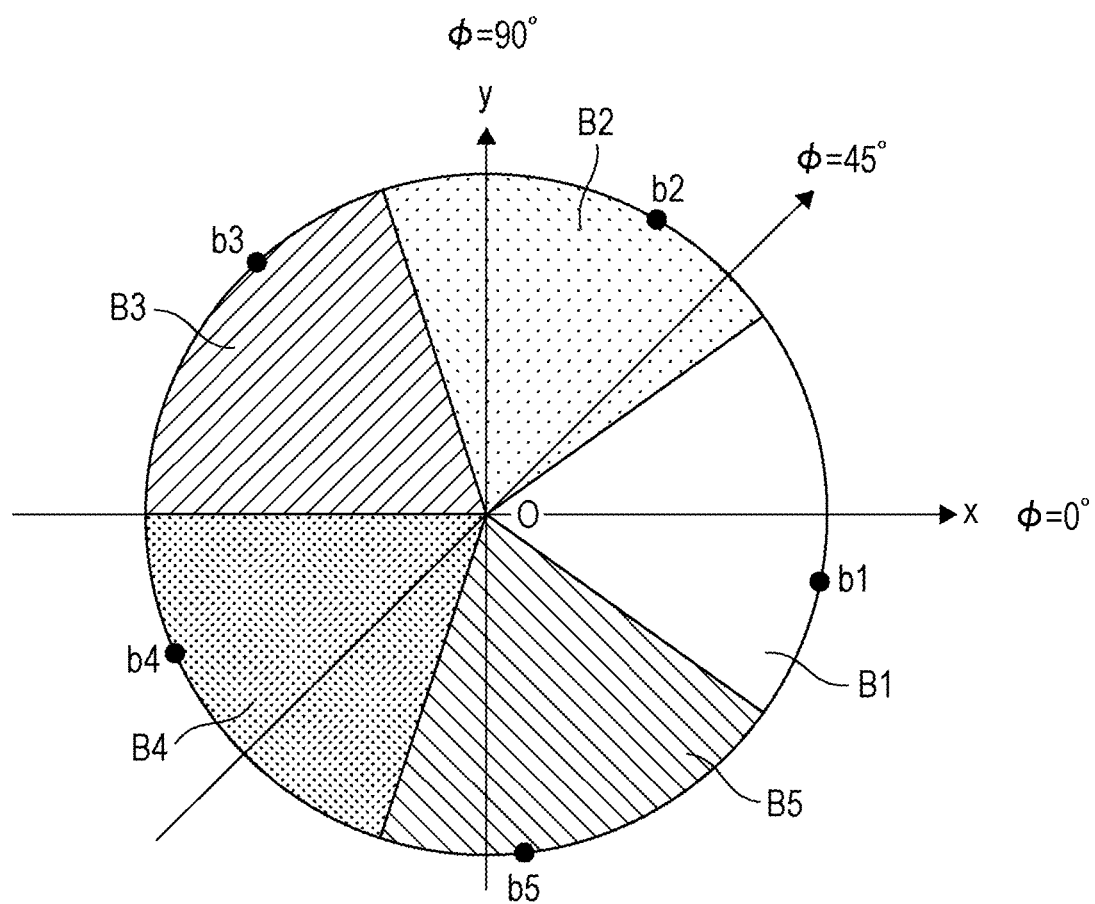
FIG. 19B is a drawing depicting the relationship between divided regions of the electrode and the azimuth of a horizontal scanning light beam in the third embodiment.

FIG. 19B is a drawing depicting the relationship between divided regions of the electrode 9B and the direction of a horizontal scanning light beam in the third embodiment. FIG. 19C is a drawing illustrating the relationship between the state of horizontal and vertical scanning using laser light corresponding to the divided regions of the electrode 9B, and positions among the scanning light beams.

The optical device in the third embodiment is provided with the light source 1, the collimating lens 2a, the reflection mirror 3, the polarization light splitter 4, the quarter-wave plate 4a, the half mirror 4b, the polarization light splitter 4c, the condenser lens 2b, the columnar body 6, the optical waveguide element 7, the control circuit 30, and the control circuit 32. The polarization light splitter 4, the quarter-wave plate 4a, the half mirror 4b, the condenser lens 2b, the columnar body 6, and the optical waveguide element 7 are arranged with the axis L as a central axis.

In the example depicted in FIG. 18, the light source 1 emits laser light 10a that is linearly polarized light having a wavelength λ. The light 10a becomes parallel light 10b due to the collimating lens 2a, is reflected by the reflection mirror 3 and becomes light 10c that is incident on the polarization light splitter 4, and passes through the polarization light splitter 4 and becomes light 10d. The polarization light splitter 4 is a polarization beam splitter, for example. The distribution of the laser light 10a diverges in an ellipse, and a beam-shaping prism that converts this distribution into a circular shape may be inserted between the collimating lens 2a and the reflection mirror 3. The light 10d passes through the quarter-wave plate 4a and becomes circularly polarized light $10d_0$, which is incident on the half mirror 4b, halved when passing therethrough, and becomes light 10e. The light 10e passes through the condenser lens 2b along the central axis L and is incident on the columnar body 6, which is an example of a transparent member having a refractive index $n_0$ and a radius $r_0$. The central axis L is positioned on the optical path of the light 10e that has passed through the half mirror 4b, and can be said to be an axis along the optical path. Circularly polarized light is incident on the grating 8a. Consequently, the guided light 10g is excited equally in all argument directions.

The paths of the light beams of light 10e onward are the same as in the first embodiment for both the outward path and the return path. Consequently, descriptions thereof are omitted. After reflecting from the surface of an external object, half of the light 10E that has traveled back to the position of the half mirror 4b on the return path is reflected by the half mirror 4b and becomes light $10E_0$, which branches into reflected light $10E_1$ and transmitted light $10E_2$ due the polarization light splitter 4c, which are detected by the photodetector 12A and the photodetector 12B, respectively. The polarization light splitter 4c is a polarization beam splitter, for example. The reflected light $10E_1$ is an S-polarized component of the light $10E_0$, and the transmitted light $10E_2$ is a P-polarized component of the light $10E_0$.

Within the light 10E, a component $10D_0$ that passes through the half mirror 4b passes through the quarter-wave plate 4a, and a portion thereof is reflected by the polarization light splitter 4 and is detected by the photodetector 12. The photodetectors 12, 12A, and 12B include a detection circuit 33. Detection signals are subjected to signal processing by the detection circuit 33. The surface normal of the reflection surface of the half mirror 4b and the surface normal of the reflection surface of the polarization light splitter 4 do not have to be parallel, and are inclined 45 degrees, for example. For example, only the configuration from the light source 1 to the quarter-wave plate 4a may be rotated 45 degrees about the axis L. In this case, within the light 10E which is return light, light having a direction 0 that is degrees orthogonal to the polarization corresponding to an electric field vector is detected by the photodetector 12A, light having a direction that is 90 degrees orthogonal to the polarization is detected by the photodetector 12B, and light having a direction that is 45 degrees orthogonal to the polarization is detected by the photodetector 12B.

In the example depicted in FIG. 19A, an oscillation signal from the control circuit 30 controlling the oscillation of the light source 1 changes as a rectangular pulse having a width of 10 ns every 4=250 ns, for example. Corresponding therewith, the pulse light of the signal waveform 16a and the pulse light of the signal waveform 16a1 emit light. A pulse oscillation every 250 ns results in 120,000 pulses within one frame of 30 ms. In synchronization with this pulse signal, an amount of change δ (=2πΔ/5T) corresponding to the beam scanning is added to the rotation angle of the voltage applied to the electrode 9B, and the voltage distribution pattern of the electrode 9B rotates ⅕ about the axis L while T=2 ms.

In the example depicted in FIG. 19B, the electrode 9B is divided into five circular-sector shaped regions B1, B2, B3, B4, and B5. Guided light for light beam scanning is propagated in each region. The regions B1, B2, B3, B4, and B5 are allocated horizontal scanning ranges in which φ has the ranges of −36 to 36 degrees, 36 to 108 degrees, 108 to 180 degrees, 180 to 252 degrees, and 252 to 324 degrees, respectively.

FIG. 19C is a drawing schematically depicting the state of horizontal and vertical scanning of laser light in each of the regions B1, B2, B3, B4, and B5. A voltage distribution pattern for aberration correction is formed in a range of ±36 degrees centered on directions connecting the center O and each of the points b1, b2, b3, b4, and b5 depicted in FIG. 19B. As a result of the aberration correction, light that has become a parallel beam scans positions at the points b1, b2, b3, b4, and b5 depicted in FIG. 19C. The points b1, b2, b3, b4, and b5 move in each region while maintaining an angle difference of 72 degrees therebetween. In other words, point b1 depicted in FIG. 19C scans the region B1 which corresponds to a range in which φ=−36 to 36 degrees. Similarly, points b2, b3, b4, and b5 also scan the regions B2, B3, B4, and B5, respectively, in synchronization with each other. The horizontal scanning depicted in FIG. 19C can also be viewed as continuous scanning within a 360-degree range. When point b1 crosses the boundary between the regions B1 and B2, the scanning line according to point b1 switches to the scanning line according to point b2. In other words, the point itself continuously scans sections across 360 degrees but the name used in the drawing changes according to the region.

The polarization direction of the light 10E that has been reflected by an object and traveled back to the position of the half mirror 4b differs in each of the regions B1, B2, B3, B4, and B5. The light in the regions B1, B2, B3, B4, and B5 has polarization centered on φ=90, 162, 234, 306, and 18 degrees, respectively. Specifically, within the x-y plane depicted in FIG. 19B, the polarization direction of the light is orthogonal to the azimuth Ob1 within the region B1, orthogonal to the azimuth Ob2 within the region B2, orthogonal to the azimuth Ob3 within the region B3, orthogonal to the azimuth Ob4 within the region B4, and orthogonal to the azimuth Ob5 within the region B5.

FIG. 19A depicts detected light amounts P0, P90, and P45 of the photodetectors 12A, 12B, and 12 over time. In addition, in FIG. 19A, return light from the regions B1, B2, B3, B4, and B5 are detected at the same time in a time range of 250 ns after the emission of the pulse light 16a. Signal waveforms 20a, 20a1, 20b, 20b1, 20c, and 20c1 are detection signals for light that cannot be input to the grating 8a and is reflected and returned as it is.

For example, return light from the regions B1, B2, B3, B4, and B5 is detected by the photodetector 12A as signal waveforms $18a_1$, $18a_2$, $18a_3$, $18a_4$, and $18a_5$, respectively. Return light from the regions B1, B2, B3, B4, and B5 is detected by the photodetector 12B as signal waveforms $18b_1$, $18b_2$, $18b_3$, $18b_4$, and $18b_5$, respectively. Return light from the regions B1, B2, B3, B4, and B5 is detected by the photodetector 12 as signal waveforms $18c_1$, $18c_2$, $18c_3$, $18c_4$, and $18c_5$, respectively. TOF signals for return light from each of the regions B1, B2, B3, B4, and B5 are detected from a sum signal $18a_1+18b_1+18c_1$, a sum signal $18a_2+18b_2+18c_2$, a sum signal $18a_3+18b_3+18c_3$, a sum signal $18a_4+18b_4+18c_4$, and a sum signal $18a_5+18b_5+18c_5$. The TOF signals for return light from the regions B1, B2, B3, B4, and B5 are signals $19a_1$, $19a_2$, $19a_3$, $19a_4$, and $19a_5$, respectively. The amount of light of the sum signals uses up to ¾ of the amount of light of the light 10E.

It should be noted that three normalized difference signals of a normalized difference signal (P0−P90)/(P0+P45+P90), a normalized difference signal (P0−P45)/(P0+P45+P90), and a normalized difference signal (P90−P45)/(P0+P45+P90) are generated from the three detected light amounts. Signals $18e_n$, $18f_n$, and $18g_n$ are generated from signals $20a_n$, $20b_n$, and $20c_n$, respectively, where n is an integer of 1 to 5.

Five signals respectively corresponding to the regions B1 to B5 are detected in the time range of 250 ns. At such time, it is determined which signal corresponds to which region. Each of the five signals is based on reflection from subject having different distances or reflectance. Consequently, the correspondence between the signal and the region cannot be determined from the magnitude relationship between the five signals. In contrast, the magnitude relationship between the detected light amounts P0, P90, and P45 is based on the same reflection. Consequently, the magnitude relationship can be applied to the determination. In the present embodiment, three normalized difference signals are used for the determination.

Figure 20A:
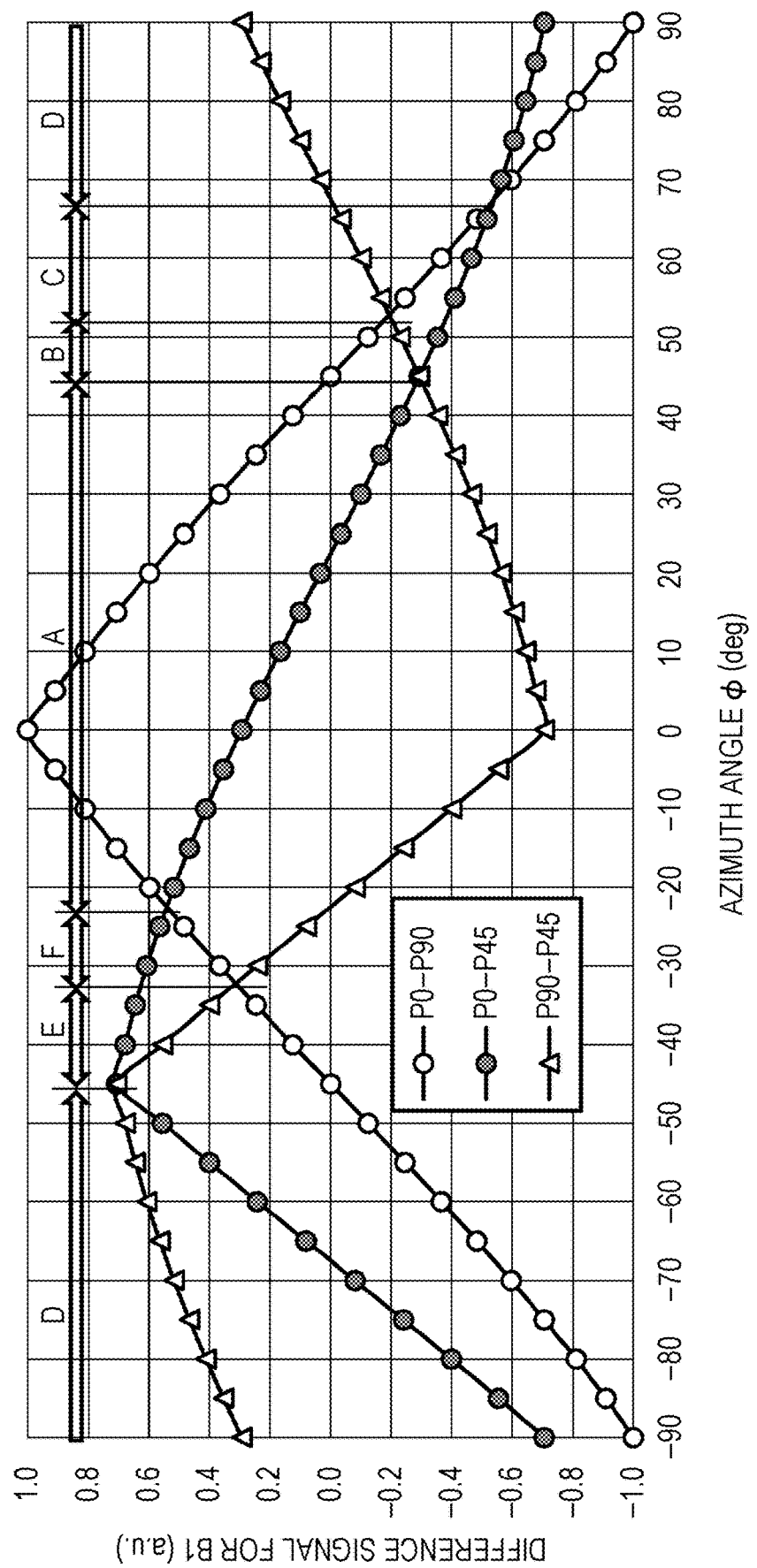
FIG. 20A is a drawing depicting the relationship between a detection difference signal for a divided region of the electrode and a horizontal scanning azimuth angle in the third embodiment.
Figure 20B:
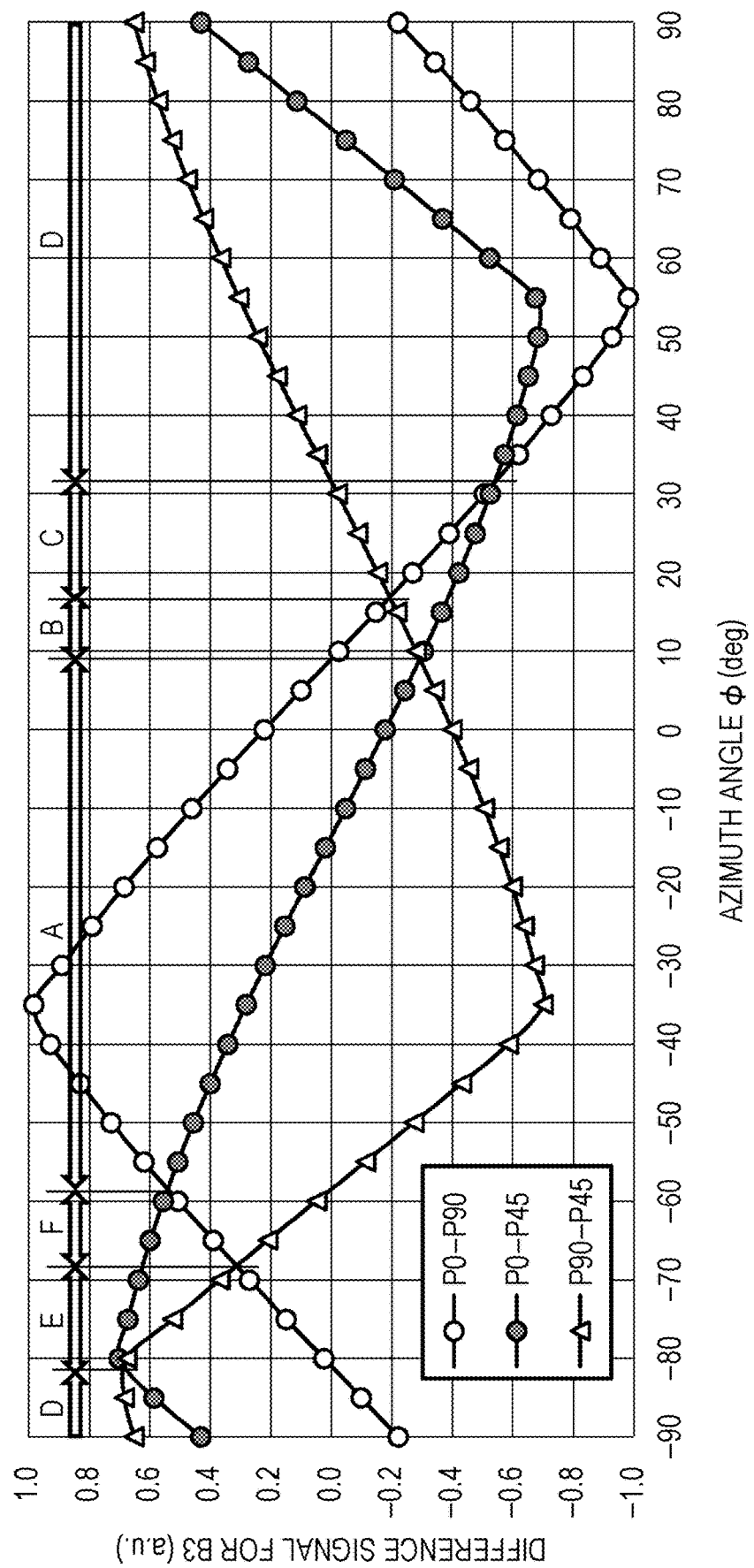
FIG. 20B is a drawing illustrating the relationship between a detection difference signal for a divided region of the electrode and the horizontal scanning azimuth angle in the third embodiment.

FIGS. 20A, 20B, 20C, 20D, and 20E depict the behavior of detection difference signals based on returned light, in the regions B1, B3, B5, B2, and B4 of the electrode 9B, respectively, in a case where one light beam is scanned in the range of −36 to 324 degrees. For example, FIG. 20A depicts the relationship between a horizontal scanning azimuth angle φ and the normalized difference signal (P0−P90)/(P0+P45+P90), the normalized difference signal (P0−P45)/(P0+P45+P90), and the normalized difference signal (P90−P45)/(P0+P45+P90) in region B1. From differences in the magnitude relationship between the difference signals, it is possible to classify into six types of sections A, B, C, D, E, and F in the range of a 180-degree period. Changing between FIGS. 20B, 20C, 20D, and 20E, the difference signal waveforms and the six types of section ranges move by −36 degrees each time in terms of the azimuth angle. From the example depicted in FIG. 19B, the region B1 is the range of φ=−36 degrees to φ=36 degrees. In the example depicted in FIG. 20A, if the light beam is in the range of φ=−36 degrees to φ=36 degrees, that light ray is a scanning line based on point b1. At such time, the scanning lines based on the light beams b3, b5, b2, and b4 draw signal curves having a range of −36 to 36 degrees, in the examples depicted in FIGS. 20B, 20C, 20D, and 20E, respectively. For example, from the example depicted in FIG. 19B, the region B2 is the range of φ=36 degrees to φ=108 degrees. In the example depicted in FIG. 20D, the range of φ=−36 degrees to φ=36 degrees corresponds to the movement of the scanning line of point b2, which is 72 degrees away from point b1. Consequently, if a light beam originates at the scanning line b1, the normalized difference signal draws a curve having a range of φ=−36 degrees to φ=36 degrees in the example depicted in FIG. 20A. Consequently, expression 21 is established.

$$\begin{cases} P_0 - P_{90} \geq P_0 - P_{45} \geq P_{90} - P_{45} \ldots -22° \leq \phi \leq 36° \\ P_0 - P_{45} \geq P_0 - P_{45} \geq P_{90} - P_{45} \ldots -36° \leq \phi \leq -22° \end{cases} \quad (21)$$

Figure 20D:
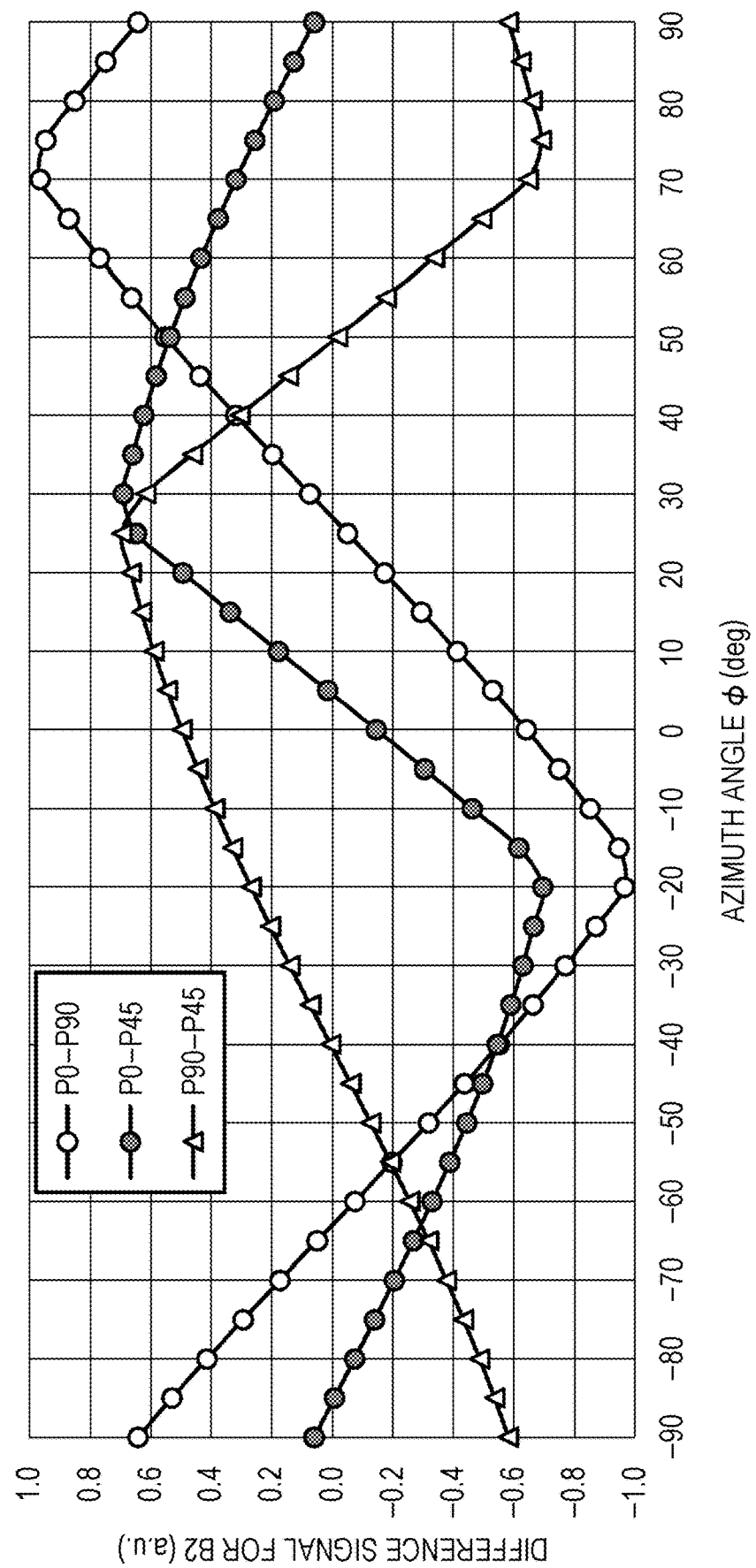
FIG. 20D is a drawing illustrating the relationship between a detection difference signal for a divided region of the electrode and the horizontal scanning azimuth angle in the third embodiment.
Figure 20E:
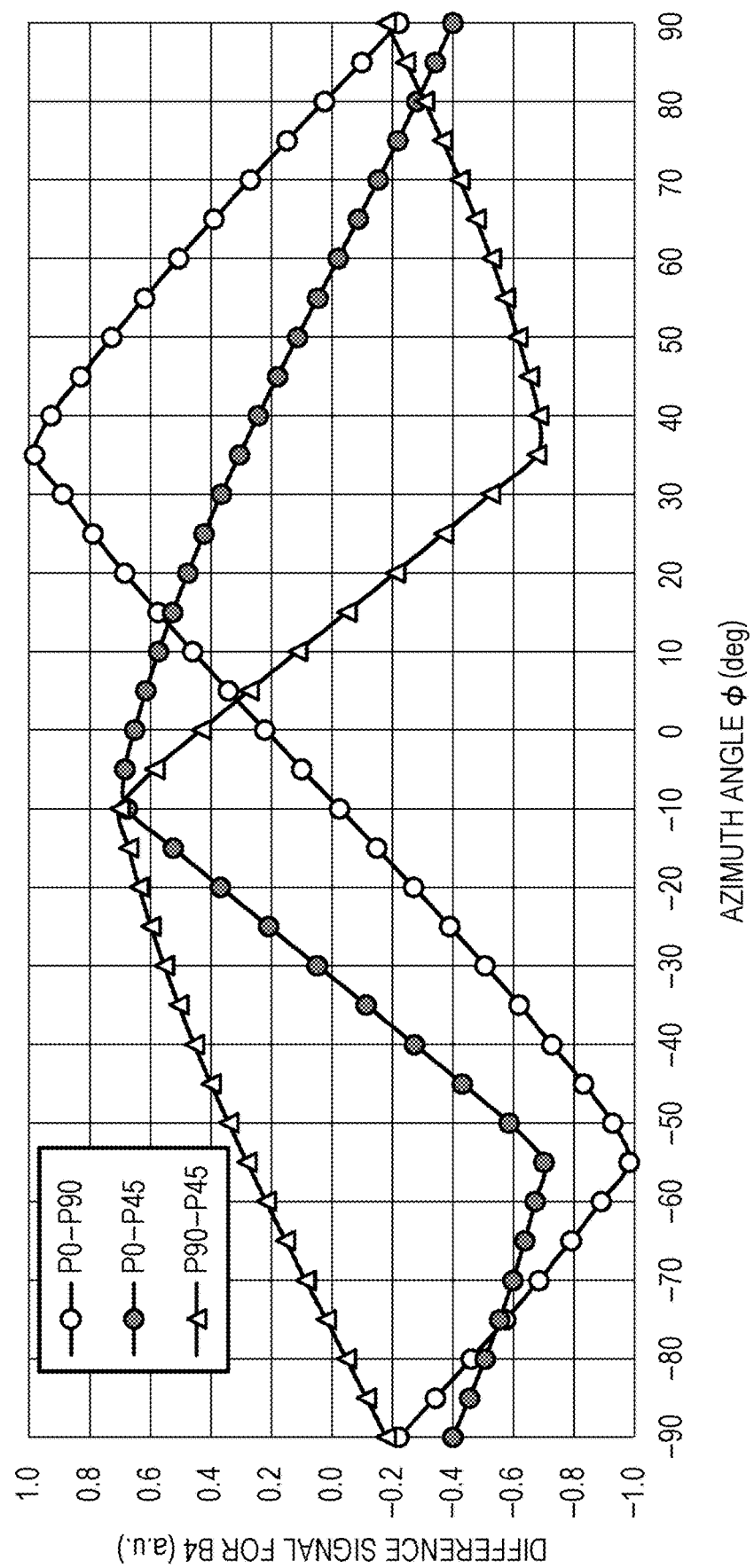
FIG. 20E is a drawing illustrating the relationship between a detection difference signal for a divided region of the electrode and the horizontal scanning azimuth angle in the third embodiment.

In the examples depicted in FIGS. 20C, 20D, and 20E, within the range of φ=−36 degrees to φ=36 degrees, none of the magnitude relationships between the difference signals satisfy expression 21. Consequently, the signals in the regions depicted in FIG. 20A can be discriminated from the signals in the regions depicted in FIGS. 20C, 20D, and 20E. The light beam b1 can thereby be discriminated from the light beams b5, b2, and b4. Meanwhile, in the range of φ=−22 degrees to φ=9 degrees, section A depicted in FIG. 20B overlaps with section A depicted in FIG. 20A. As a result, discrimination is not possible with expression 21. However, in this overlapping section, the normalized difference signal (P0−P45)/(P0+P45+P90) depicted in FIG. 20A is larger than the normalized difference signal (P0−P45)/(P0+P45+P90) depicted in FIG. 20B. Consequently, the signals depicted in FIG. 20B can be distinguished from the signals depicted in FIG. 20A. It is thereby possible to discriminate the light beam b1 from the light beam b3. Consequently, it is possible to specify which of the five signals depicted in FIG. 19A is a signal corresponding to the region B1. The same relationship is also established for the other regions B2, B3, B4, and B5. Ultimately, it is possible to discriminate the region or the scanning line to which all five detection signals correspond.

Fourth Embodiment

Figure 21A:
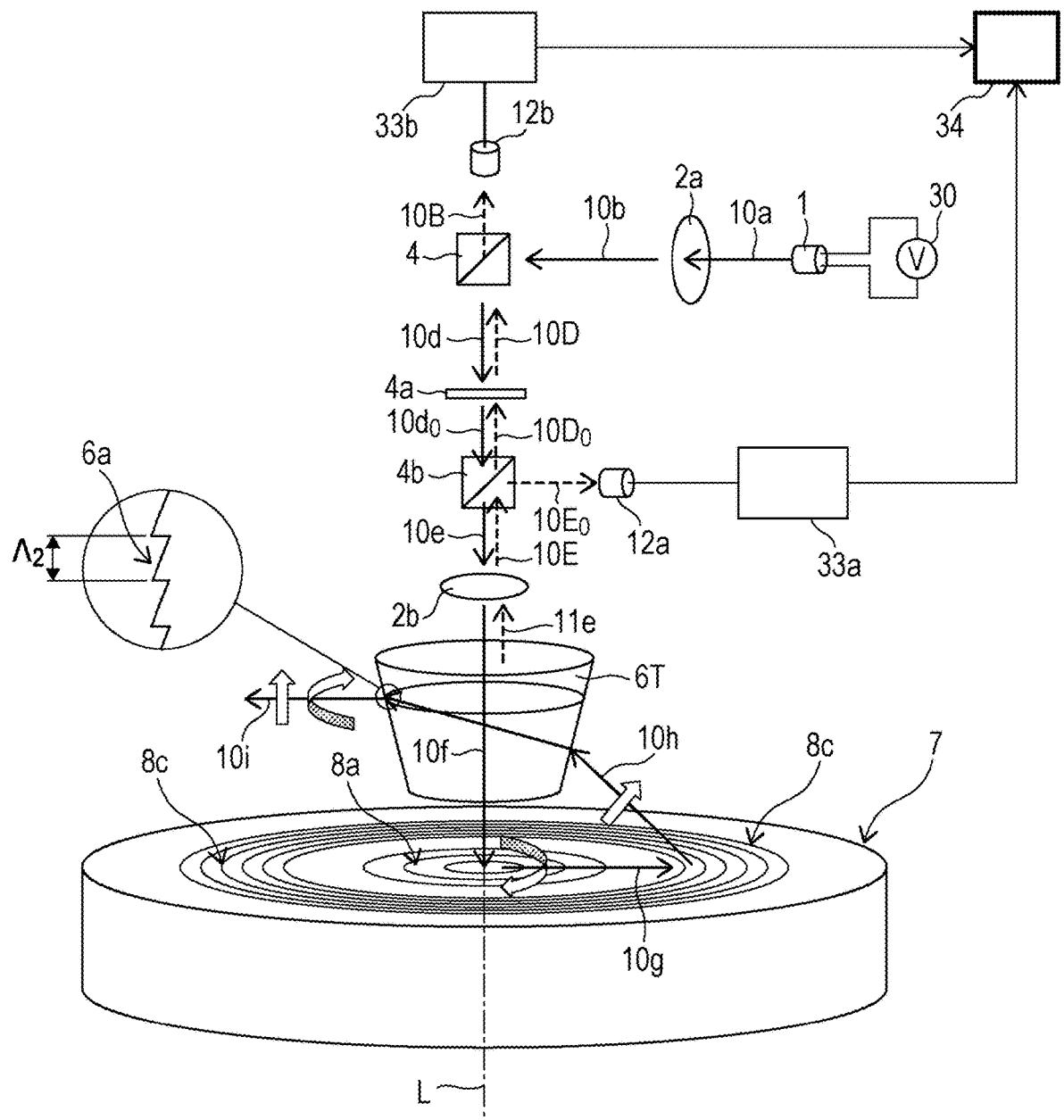
FIG. 21A is a perspective view schematically depicting the configuration of an optical device and the paths of light beams in a fourth embodiment.
Figure 21B:
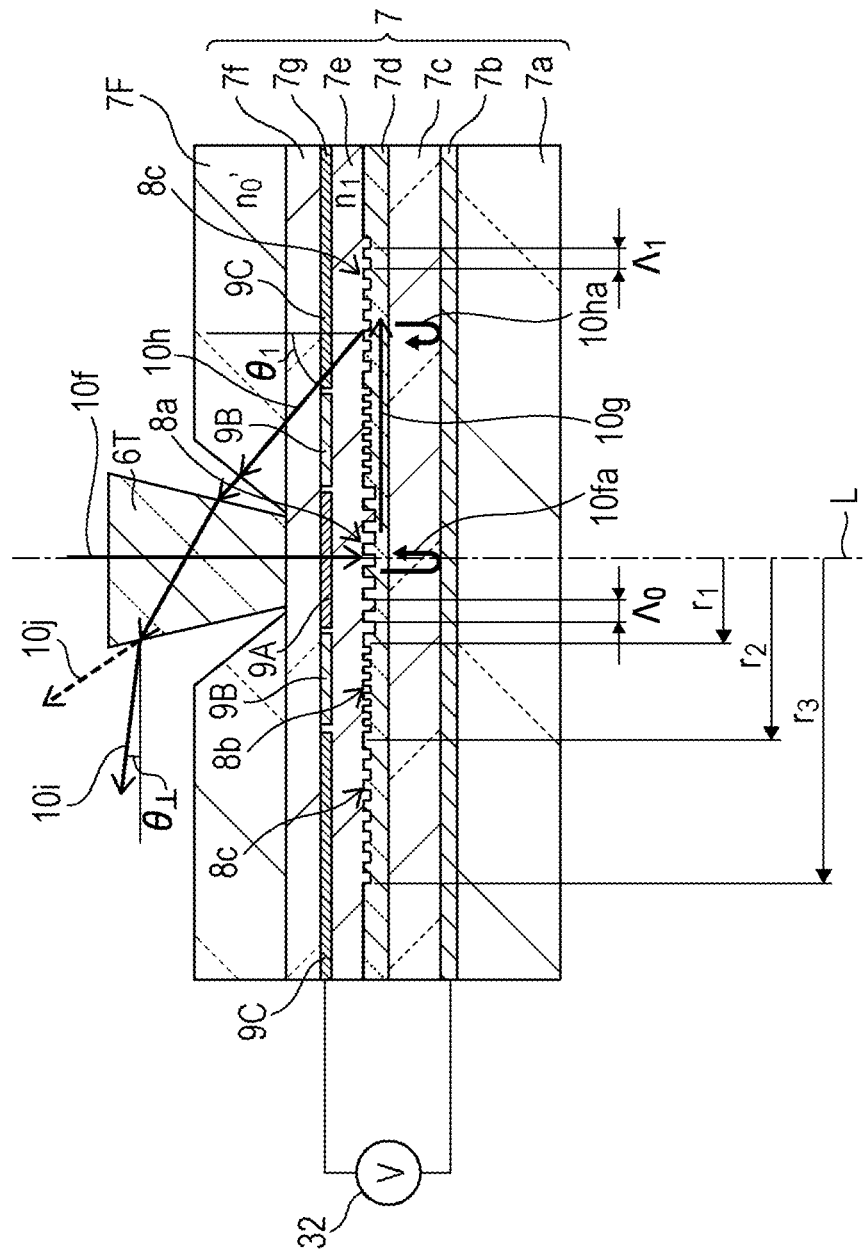
FIG. 21B is a cross-sectional view schematically depicting the configuration of the optical device and the paths of light beams in a fourth embodiment.

FIGS. 21A and 21B are respectively a perspective view and a cross-sectional view schematically depicting the configuration of an optical device and the paths of light beams in a fourth embodiment.

In the fourth embodiment, the reflection mirror 3, the polarization light splitter 4c, and the photodetectors 12, 12A, and 12B of the third embodiment are omitted and instead photodetectors 12a and 12b are added, the columnar body 6 is altered to a truncated conical prism 6T, a substrate 7F including a truncated conical cavity is inserted between the transparent flat substrate 7f and the truncated conical prism 6T, and light 10c that is incident on the polarization light splitter 4 corresponds to the parallel light 10b depicted in FIG. 21A, the polarization thereof being S-wave. Aside therefrom, the configuration is the same as in the third embodiment. Consequently, overlapping descriptions are omitted.

The optical device in the fourth embodiment is provided with the light source 1, the collimating lens 2a, the polarization light splitter 4, the quarter-wave plate 4a, the half mirror 4b, the condenser lens 2b, the truncated conical prism 6T, the substrate 7F including the truncated conical cavity, the optical waveguide element 7, the photodetectors 12a and 12b, detection circuits 33a and 33b, and the control circuits 30, 32, and 34. The polarization light splitter 4, the quarter-wave plate 4a, the half mirror 4b, the condenser lens 2b, the truncated conical prism 6T, the substrate 7F including the truncated conical cavity, and the optical waveguide element 7 are arranged with the axis L as a central axis.

In the example depicted in FIG. 21A, the light source 1 emits laser light 10a that is linearly polarized light having a wavelength $\lambda$. The laser light 10a becomes S-polarized parallel light 10b due to the collimating lens 2a, and is reflected by the polarization light splitter 4 and becomes light 10d. The polarization light splitter 4 is a polarization beam splitter, for example. The distribution of the laser light 10a diverges in an ellipse, and a beam-shaping prism that converts this distribution into a circular shape may be inserted between the collimating lens 2a and the polarization light splitter 4. The light 10d passes through the quarter-wave plate 4a and becomes circularly polarized light $10d_0$, which is incident on the half mirror 4b, halved when passing therethrough, and becomes light 10e. The light 10e passes through the condenser lens 2b along the central axis L, and is incident on the truncated conical prism 6T which is a transparent member having a refractive index $n_0$. The central axis L is positioned on the optical path of the light 10e that has passed through the half mirror 4b, and can be said to be an axis along the optical path. Circularly polarized light is incident on the grating 8a. Consequently, the guided light 10g is excited equally in all argument directions. The truncated conical prism 6T and the substrate 7F including the truncated conical cavity are in close contact with the transparent flat substrate 7f and have the same axis which is the axis L.

The paths of the light beams of light 10e onward are mostly the same as in the first and third embodiments. Consequently, descriptions thereof are omitted. However, the light radiated from the grating 8c passes through the transparent flat substrate 7f and the substrate 7F, refracts at the truncated conical surface of the cavity in the substrate 7F, is incident on the side surface of the truncated conical prism 6T, becomes light 10h that refracts, is emitted from the truncated conical side surface at the opposing side, and becomes light 10i that refracts. The truncated conical surface of the cavity in the substrate 7F and the side surface of the truncated conical prism 6T have the same axis which is the axis L. A blazed grating may be formed on these surfaces. In the blazed grating, serrated grooves are formed in a direction orthogonal to the central axis L. Transmitted light is diffracted in the vertical plane by the blazed grating. Thus, at the position of the side surface of the truncated conical prism 6T, the refracted light 10j becomes the emission light 10i which is emitted outside at an angle of $\theta_\perp$ from the horizontal plane.

In the return path after reflecting from a subject, half of the light 10E that has traveled back to the position of the half mirror 4b on the outward path is reflected by the half mirror 4b and becomes light $10E_0$, which is detected by the photodetector 12a. Within the light 10E, a component $10D_0$ that passes through the half mirror 4b passes through the quarter-wave plate 4a. A portion of transmitted light 10D passes through the polarization light splitter 4 and is detected by the photodetector 12b as transmitted light 10B. The photodetector 12a includes a detection circuit 33a, and the photodetector 12b includes a detection circuit 33b. Detection signals are subjected to signal processing by the detection circuits 33a and 33b. The optical device may be further provided with the control circuit 34. The control circuit 34 generates a control signal that controls the light source or the orientation of liquid crystal, for example, from the detection signals of the detection circuits 33a and 33b. Furthermore, the control circuits 30, 32, and 34 may be consolidated as one control circuit.

Figure 22:
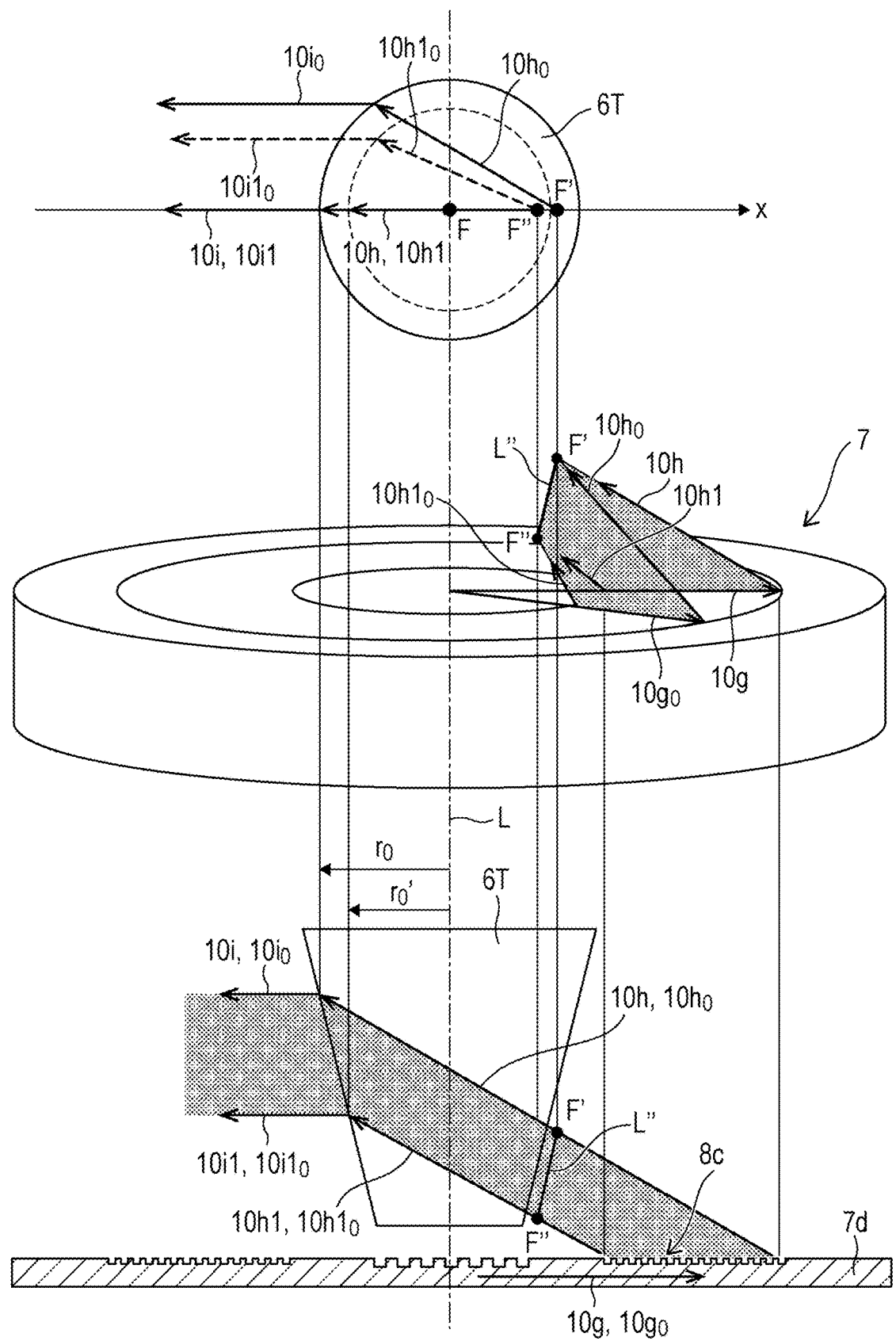
FIG. 22 is a drawing schematically depicting the propagation path of radiated light in an output grating coupler in the fourth embodiment in a case where there is aberration correction control.

FIG. 22 is a drawing schematically depicting the propagation path of radiated light in the grating 8c, in a case where there is aberration correction control, in the fourth embodiment. In the example depicted in FIG. 22, the upper section depicts a plan view, the middle section depicts a perspective view, and the lower section depicts a cross-sectional view. As depicted in FIG. 22, guided light 10g and guided light $10g_0$ that propagates within the waveguide layer 7d is emitted from the grating 8c, is incident on the side surface of the truncated conical prism 6T, and refracts and becomes light 10h, $10h_0$, 10h1, and 10h10 which propagates therein, and refracts at the truncated conical side surface at the opposing side and becomes light 10i, $10i_0$, 10i1, and $10i1_0$ which is emitted outside. As depicted in the middle section of FIG. 22, the light 10h, $10h_0$, 10h1, and $10h1_0$ intersect at an axis L" that is away from the central axis L in the x-axis positive direction. The axis L" is inclined compared to the central axis L. The light 10h and $10h_0$ intersect at point F' on the axis L", and the light 10h1 and $10h1_0$ intersect at point F''' on the axis L". In the examples depicted in the upper and lower sections of FIG. 22, the columnar body 6 is replaced with the truncated conical prism 6T. Thus, the radius $r_0$ of the refraction point of the light 10h and $10h_0$ at the outer circumferential side and the radius $r_0'$ of the refraction point of the light 10h1 and $10h1_0$ at the inner circumferential side change in accordance with the inclination of the axis L". As a result, the light beams after being emitted from the side surface of the truncated conical prism 6T can be made into parallel light.

In the fourth embodiment, light beams pass twice through the side surface of the truncated conical prism 6T on which a blazed grating is formed. In a form in which a light beam passes through the side surface, the degree of freedom in design is greater compared to the configuration in which a light beam passes through the bottom surface of the columnar body 6 in the first and third embodiments. Furthermore, by passing through the side surface, the light beam is affected twice by the diffraction produced by the blazed grating. If a blazed grating is also formed on the truncated conical surface of the cavity in the substrate 7F, the light beam is affected by diffraction three times. Due to these two or more diffractions, a sufficient diffraction efficiency can be obtained even if the pitch of the grating is large compared to the first and third embodiments. A large grating pitch facilitates manufacture and increases diffraction efficiency. The substrate 7F is generally arranged so that light emitted from the grating 8a is brought out into the air. However, if light can be brought out, the substrate 7F can be omitted. With the configuration in which the substrate 7F is provided with the truncated conical cavity, it is possible for radiated light from the grating 8a to be brought out into the air regardless of the radiation angle thereof. Consequently, the degree of freedom in design increases.

Figure 23A:
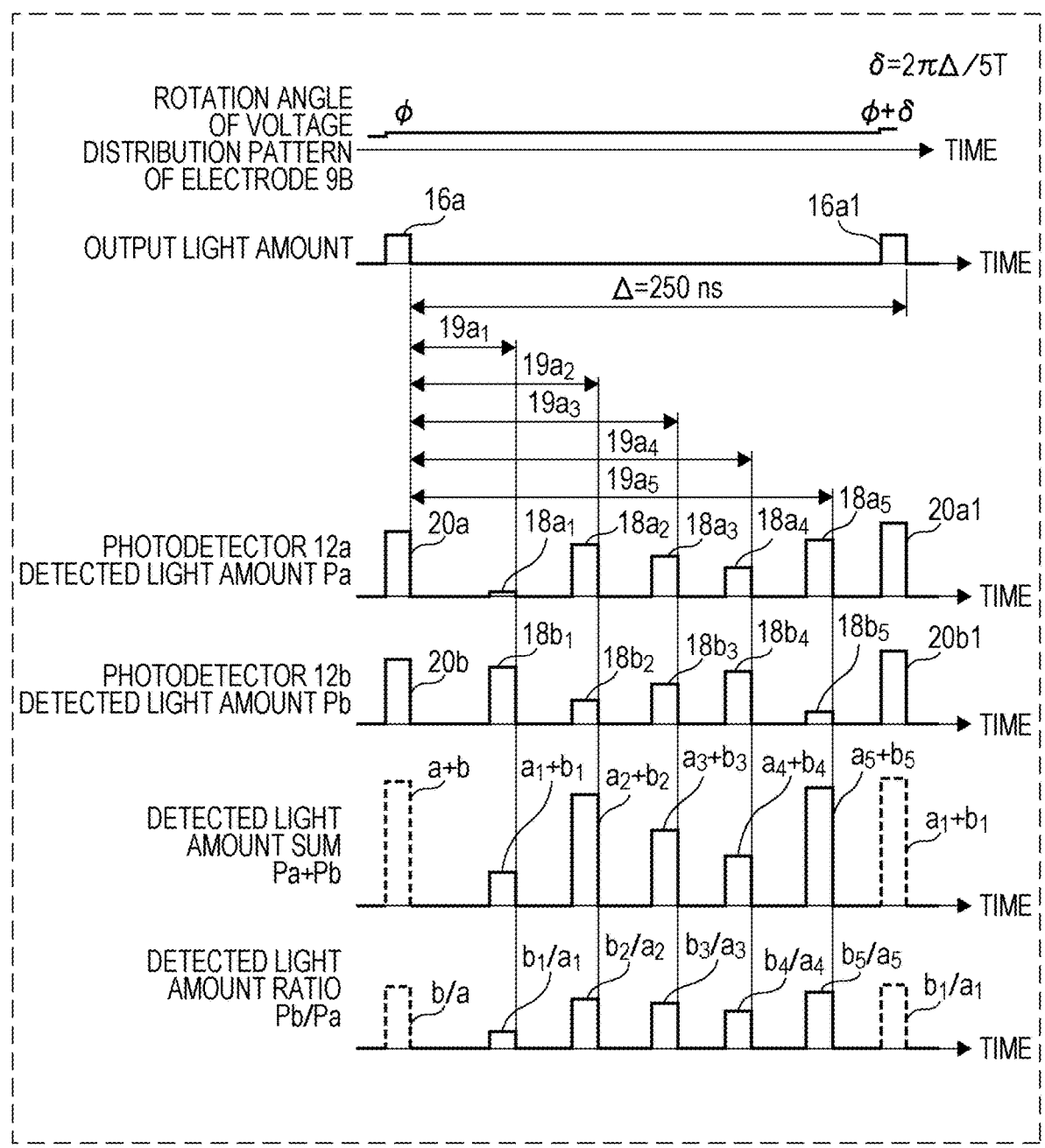
FIG. 23A is a drawing depicting the relationship over time between the rotation angle of a voltage distribution pattern of an electrode, the amount of light output by a light source, the amounts of light detected by photodetectors, and the sum and ratio of the amounts of light detected in the fourth embodiment.

FIG. 23A is a drawing depicting the relationship over time between the rotation angle of the voltage distribution pattern of the electrode 9B, the amount of light output by the light source 1, detected light amounts Pa and Pb of the photodetectors 12A and 12B, and the sum Pa+Pb and the ratio Pb/Pa of the detected light amounts in the fourth embodiment.

Figure 23B:
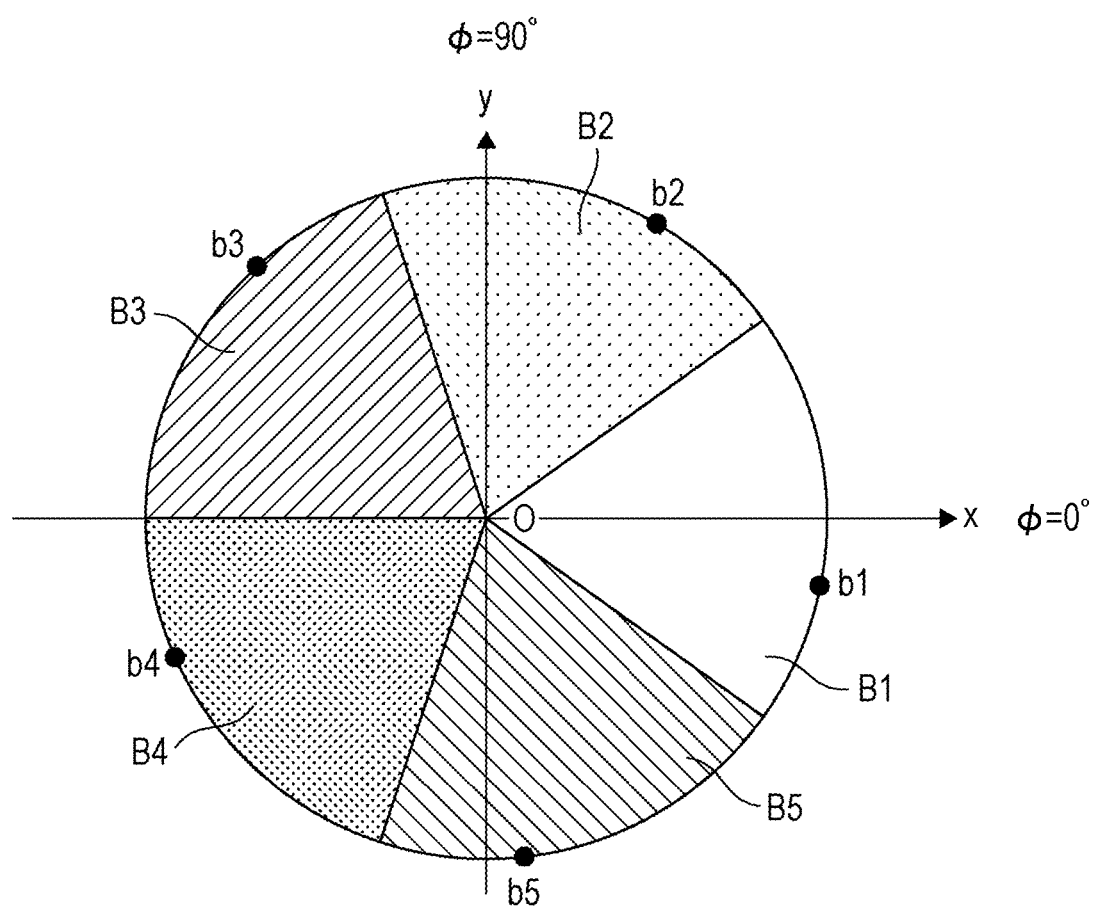
FIG. 23B is a drawing depicting the relationship between divided regions of the electrode and the direction of a horizontal scanning light beam in the fourth embodiment.

FIG. 23B is a drawing depicting the relationship between divided regions of the electrode 9B and the direction of a horizontal scanning light beam in the fourth embodiment. A first scanning light beam according to point b1, a second scanning light beam according to point b2, a third scanning light beam according to point b3, a fourth scanning light beam according to point b4, and a fifth scanning light beam according to point b5 are emitted from the regions B1, B2, B3, B4, and B5 of the electrode 9B, respectively. These five scanning light beams rotate at equal angles about the center O at an angle of 72 degrees to each other.

The polarization amplitude of the light $10E_0$ corresponding to the scanning light beam according to point bk is represented by expression 22, where ak is the amplitude coefficient and $\varphi$ is the azimuth angle or scanning angle, and where k=1, 2, 3, 4, 5.

$$\text{RETURN LIGHT AMPLITUDE} = \begin{pmatrix} a_k \cos\left(\phi - \frac{2\pi k}{5}\right) \\ a_k \sin\left(\phi - \frac{2\pi k}{5}\right) \end{pmatrix} \quad (22)$$

When using a Jones matrix, the relationship between the polarization amplitude of the light $10E_0$ and the polarization amplitude of the transmitted light 10B is represented by expression 23.

$$\begin{pmatrix} 1 & 0 \\ 0 & i \end{pmatrix} \begin{pmatrix} 1 & 0 \\ 0 & i \end{pmatrix} \begin{pmatrix} a_k \cos\left(\phi - \frac{2\pi k}{5}\right) \\ a_k \sin\left(\phi - \frac{2\pi k}{5}\right) \end{pmatrix} = \begin{pmatrix} 0 \\ ia_k \times \sin\left(\phi - \frac{2\pi k}{5}\right) \end{pmatrix} \quad (23)$$

The first term on the left side represents a matrix of the polarization light splitter 4, the second term represents a matrix of the quarter-wave plate 4a, the third term represents the polarization amplitude of the light $10E_0$, and the right side represents the polarization amplitude of the transmitted light 10B.

From expressions 22 and 23, the detected light amounts Pa and Pb of the photodetectors 12a and 12b are represented by expressions 24 and 25, respectively.

$$P_a = a_k^2 \cos^2\left(\phi - \frac{2\pi k}{5}\right) + a_k^2 \sin^2\left(\phi - \frac{2\pi k}{5}\right) = a_k^2 \quad (24)$$

$$P_b = a_k^2 \sin^2\left(\phi - \frac{2\pi k}{5}\right) \quad (25)$$

From expressions 24 and 25, a detected light amount ratio Pb/Pa is represented by expression 26.

$$\frac{P_b}{P_a} = \sin^2\left(\phi - \frac{2\pi k}{5}\right) \quad (26)$$

Figure 23C:
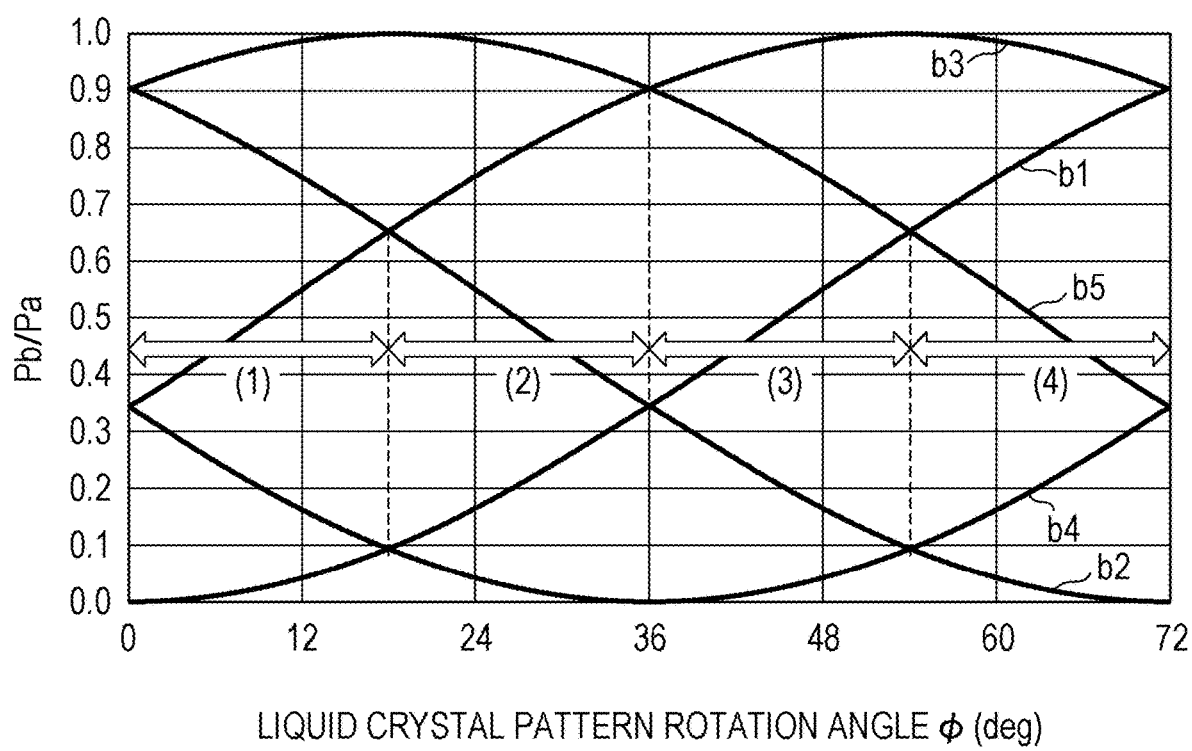
FIG. 23C is a drawing depicting the relationship between a scanning angle and signals indicating light detection amount ratios for scanning light beams in the fourth embodiment.

FIG. 23C is a drawing depicting the relationship between a scanning angle $\varphi$ which is a liquid crystal pattern rotation angle, and signals indicating a detected light amount ratio $Pb_1/Pa_1$ corresponding to the first scanning light beam according to point b1, a detected light amount ratio $Pb_2/Pa_2$ corresponding to the second scanning light beam according to point b2, a detected light amount ratio $Pb_3/Pa_3$ corresponding to the third scanning light beam according to point b3, a detected light amount ratio $Pb_4/Pa_4$ corresponding to the fourth scanning light beam according to point b4, and a detected light amount ratio $Pb_5/Pa_5$ corresponding to the fifth scanning light beam according to point b5. The relationship is obtained from expression 26. In the example depicted in FIG. 23C, the relationship of $Pb_1/Pa_1 < Pb_4/Pa_4 < Pb_3/Pa_3 < Pb_2/Pa_2 < Pb_5/Pa_5$ is established in the range of $\varphi=0$ to 18 degrees, the relationship of $Pb_4/Pa_4 < Pb_1/Pa_1 < Pb_2/Pa_2 < Pb_3/Pa_3 < Pb_5/Pa_5$ is established in the range of $\varphi=18$ to 36 degrees, the relationship of $Pb_4/Pa_4 < Pb_2/Pa_2 < Pb_1/Pa_1 < Pb_5/Pa_5 < Pb_3/Pa_3$ is established in the range of $\varphi=36$ to 54 degrees, and the relationship of $Pb_2/Pa_2 < Pb_4/Pa_4 < Pb_5/Pa_5 < Pb_1/Pa_1 < Pb_3/Pa_3$ is established in the range of $\varphi=54$ to 72 degrees. In the relationship of $Pb_2/Pa_2 < Pb_5/Pa_5 < Pb_4/Pa_4 < Pb_3/Pa_3 < Pb_1/Pa_1$ in the range of $\varphi=72$ to 90 degrees, compared to the relationship in the range of $\varphi=0$ to 18 degrees, $Pb_1/Pa_1$ carries over to $Pb_2/Pa_2$, $Pb_2/Pa_2$ carries over to $Pb_3/Pa_3$, $Pb_3/Pa_3$ carries over to $Pb_4/Pa_4$, $Pb_4/Pa_4$ carries over to $Pb_5/Pa_5$, and $Pb_5/Pa_5$ carries over to $Pb_1/Pa_1$. A carry-over relationship is established also in the subsequent angle ranges. Thus, all magnitude relationships up to 360 degrees are understood. Consequently, the scanning angle $\varphi$ is decided according to a drive signal for the electrode 9B, and if the scanning angle $\varphi$ is decided, the magnitude relationship between the five light detection amount ratios is decided. It is thereby possible to specify which of the scanning light beams corresponds to a detection signal.

In the example depicted in FIG. 23A, an oscillation signal from the control circuit 30 controlling the oscillation of the light source 1 changes as a rectangular pulse having a width of 10 ns every $\Delta=250$ ns, for example. Corresponding therewith, the pulse light of the signal waveform 16a and the pulse light of the signal waveform 16a1 emit light. A pulse oscillation every 250 ns results in 120,000 pulses within one frame of 30 ms. In synchronization with this pulse signal, an amount of change $\delta$ ($=2\pi\Delta/5T$) corresponding to the beam scanning is added to the rotation angle of the voltage applied to the electrode 9B, and the voltage distribution pattern of the electrode 9B rotates ⅕ about the axis L while T=2 ms.

FIG. 23A depicts the detected light amounts Pa and Pb of the photodetectors 12a and 12b over time. Return light from the regions B1, B2, B3, B4, and B5 are detected at the same time in a time range of 250 ns after the emission of pulse light of the signal waveform 16a. Signal waveforms 20a, 20a1, 20b, and 20b1 are detection signals for light that cannot be input to the grating 8a and is reflected and returned as it is.

For example, in the photodetector 12a, return light from the regions B1, B2, B3, B4, and B5 is detected as signal waveforms $18a_1$, $18a_2$, $18a_3$, $18a_4$, and $18a_5$, respectively. In the photodetector 12b, return light from the regions B1, B2, B3, B4, and B5 is detected as signal waveforms $18b_1$, $18b_2$, $18b_3$, $18b_4$, and $18b_5$, respectively. The control circuit 34 receives an electrical signal corresponding to the detected light amount Pa of the photodetector 12a and an electrical signal corresponding to the detected light amount Pb of the photodetector 12b. The control circuit 34 generates electrical signals corresponding to the sum and the ratio of these two electrical signals. As sum signals Pa+Pb indicating sums of the detected light amounts of the photodetectors 12a and 12b, $a_1+b_1$, $a_2+b_2$, $a_3+b_3$, $a_4+b_4$, and $a_5+b_5$ are generated. As signal ratios Pb/Pa indicating ratios of the detected light amounts of the photodetectors 12a and 12b, $b_1/a_1$, $b_2/a_2$, $b_3/a_3$, $b_4/a_4$, and $b_5/a_5$ are generated.

In the sum signals Pa+Pb, five signals are used as TOF signals. However, those signals are based on reflection from subjects having different distances or reflectance. Consequently, with only a sum signal, it is not possible to specify which signal corresponds to which of the regions B1 to B5. However, by adding the signal ratios Pb/Pa, from the magnitude relationship between the signal ratios, it is possible to specify which of the five signals corresponds to the first scanning light beam according to point b1, the second scanning light beam according to point b2, the third scanning light beam according to point b3, the fourth scanning light beam according to point b4, and the fifth scanning light beam according to point b5, or which signals correspond to which of the regions B1 to B5. For example, in the example of the signal ratios depicted in FIG. 23A, the five signals can be determined as being in the order of, from the left, the first scanning light beam, the second scanning light beam, the third scanning light beam, the fourth scanning light beam, and the fifth scanning light beam if the scanning angle φ is in the range of 0 to 18 degrees, and being in the order of the fourth scanning light beam, the third scanning light beam, the second scanning light beam, the first scanning light beam, and the fifth scanning light beam if the scanning angle φ is in the range of 18 to 36 degrees.

Next, the principles of controlling the propagation direction of guided light in the electrode 9B will be described.

Figure 24A:
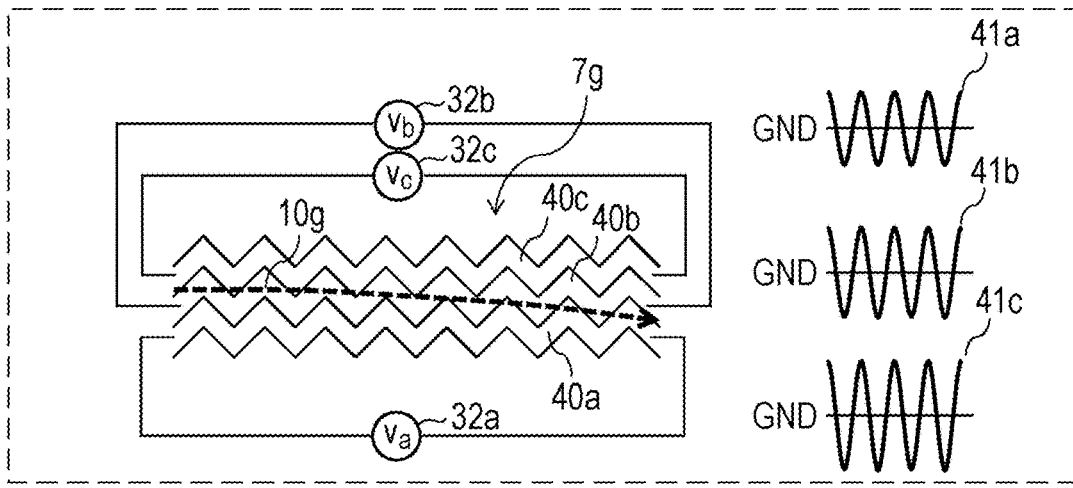
FIG. 24A is a drawing schematically depicting the relationship between electrode patterns at a transparent electrode layer side and applied voltages.
Figure 24B:
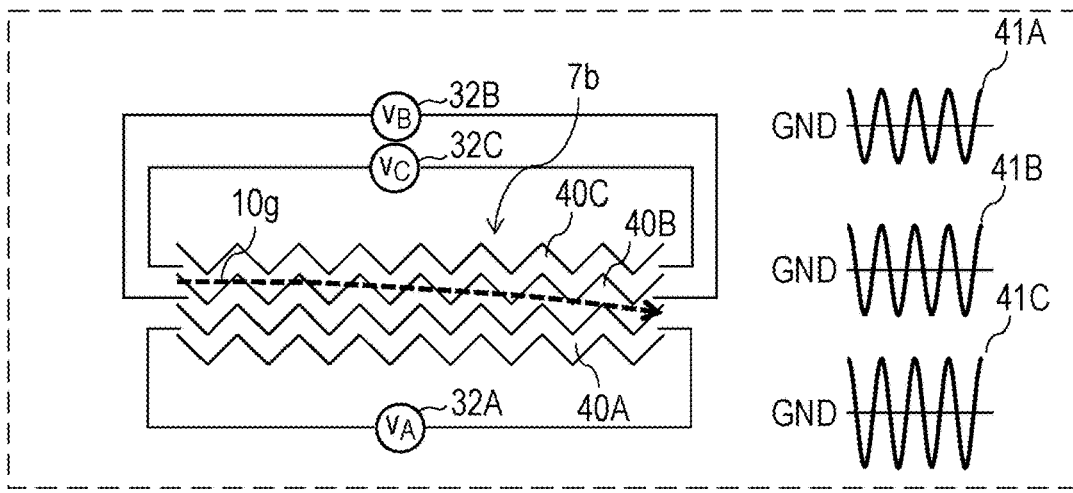
FIG. 24B is a drawing schematically depicting the relationship between electrode patterns at a reflection layer side and applied voltages.

FIGS. 24A and 24B are drawings schematically depicting the relationship between the electrode patterns at the transparent electrode layer 7g side and the reflection layer 7b side, and the applied voltages, respectively. The electrode patterns 40a, 40b, and 40c depicted in FIG. 24A and the electrode patterns 40A, 40B, and 40C depicted in FIG. 24B are configured of three zigzag patterns extending from the left side to the right side. Each zigzag pattern is insulated. Voltage signals are independently applied by control circuits 32a, 32b, and 32c to the electrode patterns 40a, 40b, and 40c depicted in FIG. 24A, respectively. Similarly, voltage signals are independently applied by control circuits 32A, 32B, and 32C to the electrode patterns 40A, 40B, and 40C depicted in FIG. 24B, respectively.

Figure 24C:
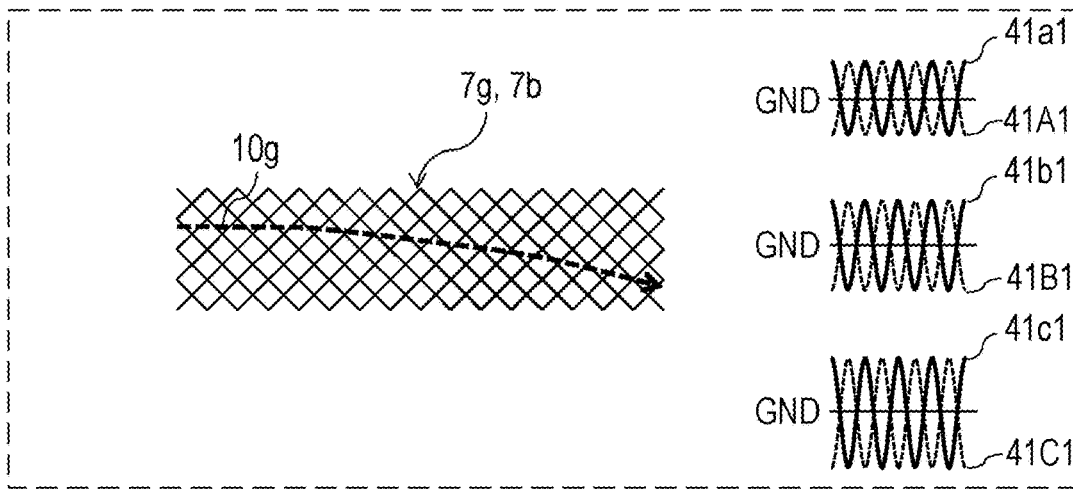
FIG. 24C is a drawing schematically depicting the relationship between a configuration in which electrode patterns at the transparent electrode layer side and electrode patterns at the reflection layer side are aligned and superposed, and applied voltages.

FIG. 24C is a drawing schematically depicting the relationship between a configuration in which the electrode patterns at the transparent electrode layer side and the electrode patterns at the reflection layer side are aligned and superposed, and applied voltages. When the transparent electrode layer 7g is above and the reflection layer 7b is below, zigzag patterns positioned above and below have a relationship in which the lines formed by connecting the vertices of the zigzags at one side and the lines formed by connecting the vertices of the zigzags at the other side overlap each other above and below. The shape of the zigzag pattern at the reflection layer 7b side is a shape that is the vertical reverse of the zigzag pattern at the transparent electrode layer 7g side. Consequently, as depicted in FIG. 24C, an electrode pattern in which the electrode patterns at the transparent electrode layer 7g side and the electrode patterns at the reflection layer 7b side are aligned and superposed has a shape in which rhomboids are linked.

In a case where the electrode patterns depicted in FIG. 24C are manufactured only on one side, routing of wiring is not easy because each rhomboid is isolated. In contrast, in a method in which the electrode patterns depicted in FIG. 24A and the electrode patterns depicted in FIG. 24B are superposed, the patterns themselves are wiring and therefore manufacturing is easy. Alternating-current voltage signals 41a, 41b, and 41c are applied to the zigzag electrode patterns 40a, 40b, and 40c at the transparent electrode layer 7g side, respectively. The amplitude thereby increases in the order of the alternating-current voltage signals 41a, 41b, and 41c. Assuming that the facing electrode is grounded, this amplitude gradient causes a refractive index difference in the liquid crystal layer corresponding to the zigzag electrode patterns 40a, 40b, and 40c. The guided light 10g that propagates from left to right within the waveguide layer 7d sandwiched between the electrodes refracts downward every time it passes through a pattern boundary that is inclined from the optical path. Alternating-current voltage signals 41A, 41B, and 41C are applied to the zigzag electrode patterns 40A, 40B, and 40C at the reflection layer 7b side. The amplitude thereby increases in the order of the alternating-current voltage signals 41A, 41B, and 41C. Assuming that the facing electrode is grounded, this amplitude gradient causes the guided light 10g that propagates from left to right within the waveguide layer 7d sandwiched between the electrodes to also refract downward.

The alternating-current voltage signals 41A, 41B, and 41C have opposite polarities compared to the alternating-current voltage signals 41a, 41b, and 41c, respectively. Consequently, as depicted in FIG. 24C, in an electrode pattern in which the transparent electrode layer 7g and the reflection layer 7b are aligned and superposed, the alternating-current voltage signals 41a1 and 41A1 form a signal pair, the alternating-current voltage signals 41b1 and 41B1 form a signal pair, and the alternating-current voltage signals 41c1 and 41C1 form a signal pair. Since the phases thereof are reversed, the alternating-current voltage amplitude doubles. It is thereby possible for the guided light 10g to be refracted downward to a considerable extent. In addition, compared to the electrode patterns depicted in FIGS. 24A and 24B, there is an increase in the frequency at which the guided light 10g crosses pattern boundaries. Thus, bending of the guided light 10g is further doubled, and the variations in the bending angle caused by optical path differences are also improved.

Control of the propagation direction of guided light in the fourth embodiment will be described taking into consideration the principles described with reference to the examples depicted in FIGS. 24A to 24C.

Figure 25A:
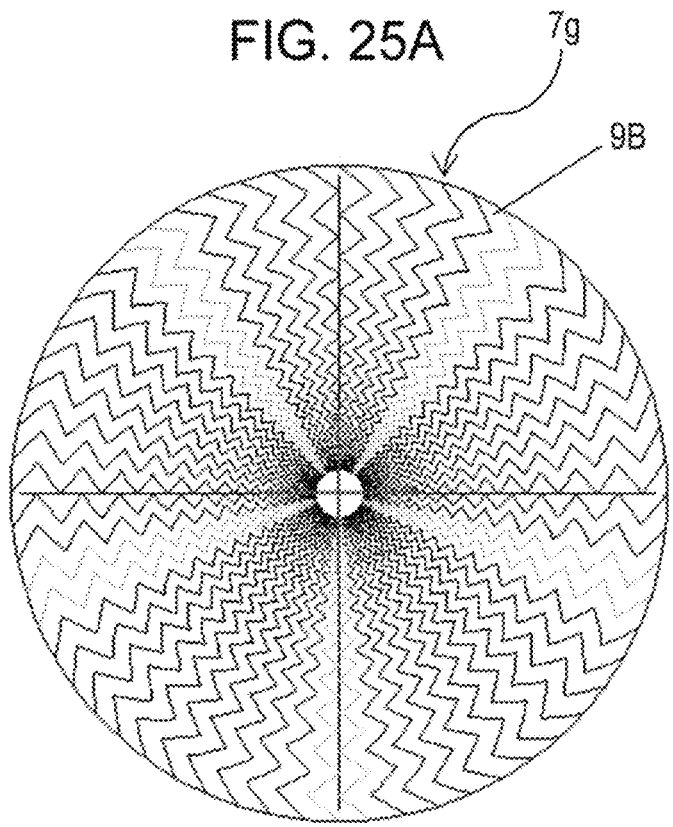
FIG. 25A is a drawing illustrating electrode patterns at the transparent electrode layer side in the fourth embodiment.
Figure 25B:
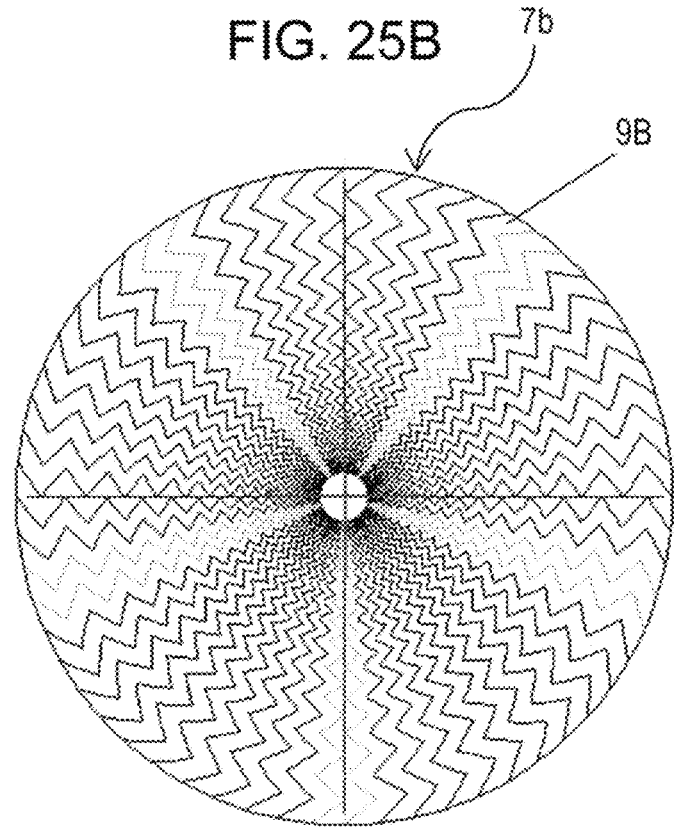
FIG. 25B is a drawing illustrating electrode patterns at the reflection layer side in the fourth embodiment.

FIGS. 25A and 25B are drawings schematically depicting the patterns of the electrode 9B at the transparent electrode layer 7g side and the reflection layer 7b side, respectively, in the fourth embodiment. Both of the electrode patterns depicted in FIGS. 25A and 25B are configured of 60 zigzag patterns extending from the inner circumferential side to the outer circumferential side. In this way, in at least one of the reflection layer 7b and the transparent electrode layer 7g, the boundary between any two adjacent divided regions from among the plurality of divided regions in the electrode 9B has a zigzag shape in the radial direction of a virtual circle centered on the point where laser light is incident. Each zigzag pattern is insulated, and voltage signals are applied independently. In the examples depicted in FIGS. 25A and 25B, adjacent zigzag patterns have a relationship in which the lines formed by connecting the vertices of the zigzags at one side and the lines formed by connecting the vertices of the zigzags at the other side overlap each other next to each other. The shape of the zigzag pattern at the reflection layer 7b side is a shape that is the reverse in the rotation direction of the zigzag pattern at the transparent electrode layer 7g side.

Figure 25C:
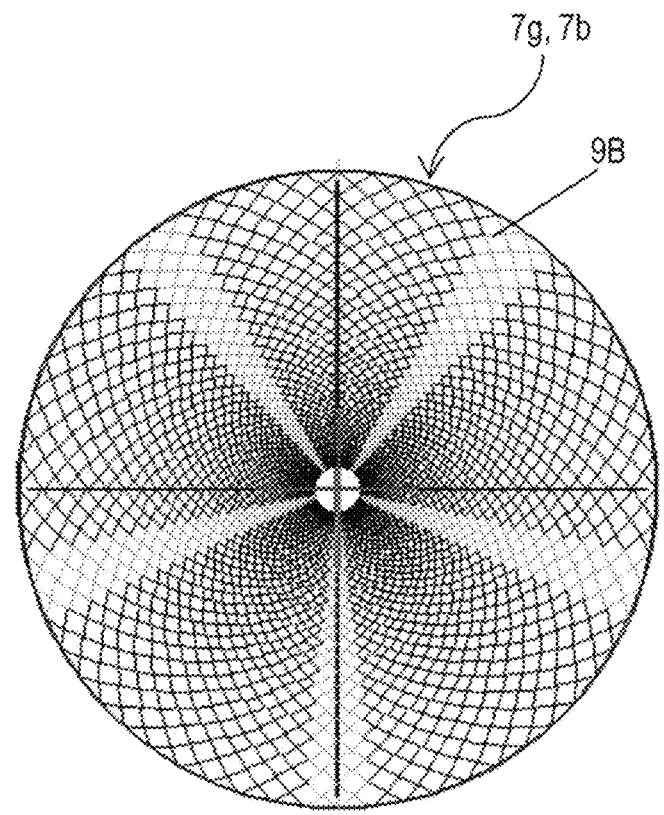
FIG. 25C is a drawing schematically depicting a configuration in which electrode patterns at the transparent electrode layer side and electrode patterns at the reflection layer side are aligned and superposed in the fourth embodiment.
Figure 25D:
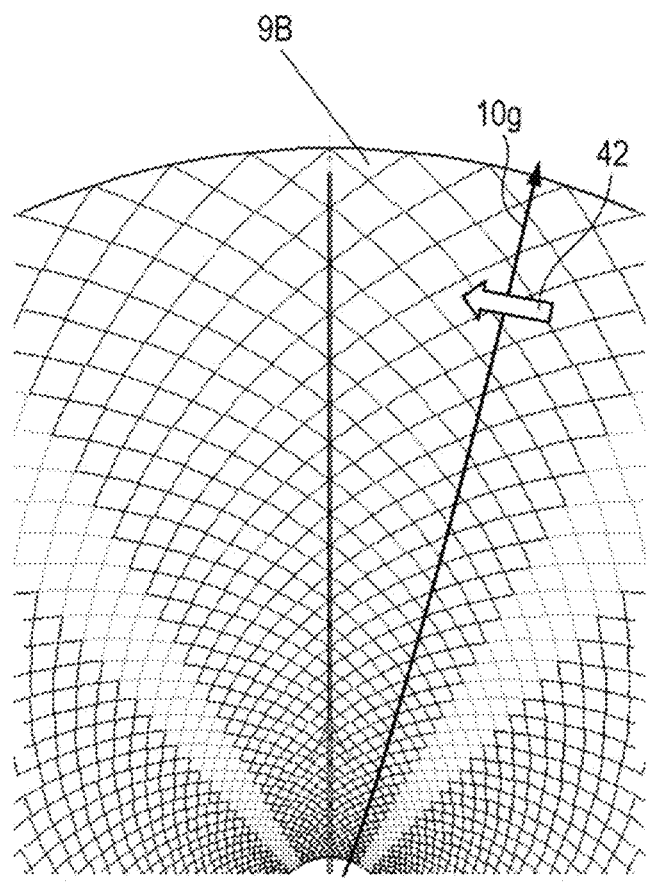
FIG. 25D is a drawing schematically depicting the relationship between a portion of the electrode patterns depicted in FIG. 25C and the propagation path of guided light in the fourth embodiment.

FIG. 25C is a drawing schematically depicting a configuration in which the electrode patterns at the transparent electrode layer side and the electrode patterns at the reflection layer side are aligned and superposed. FIG. 25D is a drawing schematically depicting the relationship between a portion of the electrode patterns depicted in FIG. 25C and the propagation path of guided light 10g. As depicted in FIG. 25C, the pattern of the electrode 9B in which the transparent electrode layer 7g and the reflection layer 7b side are aligned and superposed has a shape in which rhomboids are linked. In each of the reflection layer 7b and the transparent electrode layer 7g, the boundary between any two adjacent divided regions from among the plurality of divided regions in the electrode 9B has a zigzag shape in the radial direction of a virtual circle centered on the point where laser light is incident. When viewed from a direction perpendicular to any of the buffer layer 7c, the waveguide layer 7d, and the liquid crystal layer 7e, the aforementioned boundaries in one of the pair of electrode layers and the aforementioned boundaries in the other have a shape in which rhomboids are linked.

Consequently, as depicted in FIG. 25D, when the magnitude of the alternating-current voltage amplitude applied to the zigzag pattern has a gradient along the rotation direction, the liquid crystal refractive index increases along the direction of the arrow 42. Thus, the propagation path of the guided light 10g that propagates from the inner circumferential side to the outer circumferential side within the waveguide layer 7d can be bent toward the arrow 42. Consequently, by controlling the voltage applied to an electrode having the shape depicted in FIG. 25C, radiated light from the grating 8c can be emitted as parallel light from the truncated conical side surface.

It should be noted that the techniques used in any of the embodiments can be applied to other embodiments. For example, the technique described with reference to the example depicted in FIG. 16A in the first embodiment can be applied to the third and fourth embodiments. In other words, similar to the first embodiment, the maximum value 20P of an extracted detection signal obtained by extracting the signal waveforms 20a, 20a1, and 20a2 constituting a sum signal, for example, is proportional to the efficiency of the light that could not be input out of the incident light. Consequently, the output value of the maximum value 20P is used as a control signal when controlling the voltage applied to the electrode 9A in order to maximize the input coupling efficiency. The input efficiency increases as the maximum value 20P decreases.

Furthermore, the technique described with reference to the example depicted in FIG. 16B in the first embodiment can be applied to the third and fourth embodiments. In this case, by superposing a high-frequency signal on an oscillation signal of the light source 1 and adding a high-frequency intensity modulation signal to the output light amount, even if the signal waveform $18a_1$ exceeds the time domain of the rectangular pulse of the signal waveform 16a1, it is possible to identify that this is the detection signal corresponding to the rectangular pulse of the waveform 16a. The measurement distance can thereby be extended.

It should be noted that, in the third and fourth embodiments, the quarter-wave plate 4a may be a polarization conversion element that converts linearly polarized light into light that is polarized in a circular-tangential direction or light that is polarized in a direction orthogonal to a circular tangent. Generally, when nematic twisted liquid crystal is interposed between a substrate that has been subjected to orientation processing in a linear direction and a substrate that has been subjected to orientation processing in a rotation direction, linearly polarized light can be converted into light that is polarized in a circular-tangential direction. By using this kind of a polarization conversion element, the input efficiency to the grating 8a can be doubled. Consequently, the TE-mode guided light 10g can be excited equally in all argument directions.

In the third and fourth embodiments, the half mirror 4b is interposed in the outward path. Therefore, the light utilization efficiency in the input is halved compared to the first embodiment. On the other hand, light can be input in all argument directions, and return light from all directions can be detected and detection signals can be discriminated according to direction. Consequently, the horizontal scanning range and detection range can be extended to 360 degrees at the same frame rate.

It should be noted that, in an optical arrangement, the relationship between the transmission and reflection of light to the polarization light splitter 4 or the half mirror 4b may be interchanged.

According to the embodiments described above, a narrowed laser beam having a divergence angle of 0.1 degrees or less can be emitted toward an external object. At such time, an emission beam can be scanned at a video speed of 30 frames or more per second within a field of view of 360 degrees in the horizontal direction and 10 degrees in the vertical direction. If wavelength variability is added, the field of view in the vertical direction expands to 30 degrees. In addition, of the reflected light from an object, it is possible for stray light to be removed and to selectively receive or detect only light having aligned wavelengths and phases. Furthermore, the detected light can be converted into accurate two-dimensional distance information of an object within the field of view. A three-dimensional positional relationship is obtained from the two-dimensional distance information.

What is claimed is:

1. An optical device comprising:
    a light source that emits laser light;
    an optical waveguide element that is positioned on an optical path of the laser light;
    a first member that is positioned on the optical path, and has a bottom surface that faces the optical waveguide element, and a side surface that is rotationally symmetric with a virtual axis along the optical path serving as a central axis; and a control circuit, wherein
the optical waveguide element includes:
a first grating that includes a plurality of portions arranged in a radial direction of a virtual circle centered on a point where the laser light is incident and having mutually different refractive indices, and that causes a portion of the laser light that is incident to be propagated in the radial direction within the optical waveguide element as propagation light; and
a second grating that includes a plurality of portions arranged outside the first grating, arranged in the radial direction, and having mutually different refractive indices, and that causes a portion of the propagation light to be emitted from the optical waveguide element as emission light, and
the emission light is incident on the first member from the bottom surface or the side surface, and is emitted from the side surface.

2. The optical device according to claim 1, wherein the first grating has a concentric circular structure centered on the point.

3. The optical device according to claim 1, wherein the second grating has a concentric circular structure centered on the point.

4. The optical device according to claim 1, wherein the first member has a columnar shape or a truncated conical shape.

5. The optical device according to claim 4, wherein the side surface of the first member includes a third grating in which a grating vector is parallel with the central axis.

6. The optical device according to claim 5, further comprising
a second member having a cylindrical shape that surrounds the first member and is coaxial with the central axis,
wherein an inside surface and an outside surface of the second member include a fourth grating in which a grating vector is parallel with the central axis.

7. The optical device according to claim 4, wherein
the optical waveguide element further includes a transparent layer that is in contact with the first member, on the first grating and the second grating, and
the transparent layer has a refractive index of 1.8 or more.

8. The optical device according to claim 1, wherein the control circuit causes a direction of the laser light emitted from the optical waveguide element to change, by causing the light source to change a wavelength of the laser light.

9. The optical device according to claim 1, wherein
the optical waveguide element includes a first dielectric layer, a second dielectric layer on the first dielectric layer, and a third dielectric layer on the second dielectric layer,
a refractive index of the second dielectric layer is higher than a refractive index of the first dielectric layer and a refractive index of the third dielectric layer,
the first grating and the second grating are arranged in at least one selected from the group consisting of a first position between the second dielectric layer and the first dielectric layer and a second position between the second dielectric layer and the third dielectric layer, and
a portion of the laser light that is incident on the second dielectric layer propagates in the radial direction within the second dielectric layer as the propagation light, and is emitted from the second grating as the emission light.

10. The optical device according to claim 9, wherein
the optical waveguide element further includes a reflection layer, and
the first dielectric layer is arranged between the second dielectric layer and the reflection layer.

11. The optical device according to claim 9, wherein
the optical waveguide element further includes a first electrode layer and a second electrode layer that is transparent,
the first dielectric layer, the second dielectric layer, and the third dielectric layer are arranged between the first electrode layer and the second electrode layer,
the second electrode layer is closer to the third dielectric layer than the first electrode layer is, and
the third dielectric layer is a liquid crystal layer that includes liquid crystal.

12. The optical device according to claim 11, wherein, in a state where a voltage is not applied to the liquid crystal layer, an orientation direction of the liquid crystal is perpendicular to a grating vector of the first grating or a grating vector of the second grating.

13. The optical device according to claim 11, wherein
the optical waveguide element further includes, between the first grating and the second grating, a fifth grating that includes a plurality of portions arranged in the radial direction and having mutually different refractive indices, and
in a state where a voltage is not applied to the liquid crystal layer, an orientation direction of the liquid crystal is perpendicular to a grating vector of the fifth grating.

14. The optical device according to claim 11, wherein
at least one electrode layer selected from the group consisting of the first electrode layer and the second electrode layer includes a first electrode opposing the first grating, a second electrode opposing the second grating, and a third electrode between the first electrode and the second electrode,
the third electrode includes divided regions that are electrically conductive, arranged in a circumferential direction of the virtual circle, and
the divided regions are insulated from each other.

15. The optical device according to claim 14, wherein the control circuit controls a direction of the emission light, by controlling a voltage applied to the liquid crystal layer via the second electrode.

16. The optical device according to claim 14, wherein the control circuit controls an efficiency at which the laser light couples with the propagation light from the first grating, by controlling a voltage applied to the liquid crystal layer via the first electrode.

17. The optical device according to claim 14, wherein the control circuit sequentially applies a voltage to a divided region opposing a portion within the second dielectric layer in which the propagation light propagates, from among the divided regions.

18. The optical device according to claim 14, further comprising:
a polarization light splitter;
a photodetector; and
a polarization rotator, wherein
the polarization light splitter and the polarization rotator are positioned on the optical path between the light source and the first member,
the control circuit causes a polarization direction of the laser light that passes through the polarization rotator to change, by controlling a voltage applied to the polarization rotator, a portion of light that is emitted from the optical waveguide element, is reflected by an object, and is incident on the optical waveguide element passes through the optical waveguide element, the polarization rotator, and the polarization light splitter, and is thereafter incident on the photodetector as detected light, and the photodetector generates an electrical signal that corresponds to an amount of the detected light.

19. The optical device according to claim 18, wherein the control circuit controls a rotation angle of the polarization direction of the laser light that has passed through the polarization rotator, by acquiring a time interval between a maximum value and a minimum value of the amount of the detected light that is detected by the photodetector while the light source is emitting the laser light, and adjusting the voltage applied to the polarization rotator based on the time interval.

20. The optical device according to claim 14, further comprising:
   a first polarization light splitter;
   a polarization converter;
   a beam splitter; and
   a photodetector, wherein
   the photodetector includes a first photodetector and a second photodetector,
   the first polarization light splitter, the polarization converter, and the beam splitter are positioned on the optical path between the light source and the first member,
   a portion of light that is emitted from the optical waveguide element, is reflected by an object, passes through the optical waveguide element, and is thereafter incident on the beam splitter passes through the beam splitter and the polarization converter, and is thereafter incident on the first photodetector as first detected light,
   another portion of the light that is incident on the beam splitter passes through the beam splitter, and is thereafter incident on the second photodetector as second detected light,
   the first photodetector generates a first electrical signal that corresponds to an amount of the first detected light, and
   the second photodetector generates a second electrical signal that corresponds to an amount of the second detected light.

21. The optical device according to claim 20, wherein the polarization converter is a quarter-wave plate.

22. The optical device according to claim 20, wherein the polarization converter converts light that is linearly polarized into light that is polarized in a circular-tangential direction.

23. The optical device according to claim 20, further comprising a second polarization light splitter, wherein
   the photodetector further includes a third photodetector,
   a portion of light that is emitted from the optical waveguide element, is reflected by an object, passes through the optical waveguide element and the beam splitter, and is thereafter incident on the second polarization light splitter passes through the second polarization light splitter, and is thereafter incident on the second photodetector as third detected light,
   another portion of the light that is incident on the second polarization light splitter passes through the second polarization light splitter, and is thereafter incident on the third photodetector as fourth detected light, and
   the third photodetector generates an electrical signal that corresponds to an amount of the fourth detected light.

24. The optical device according to claim 20, wherein the control circuit
   receives the first electrical signal and the second electrical signal, and
   generates electrical signals that correspond to a sum of the first electrical signal and the second electrical signal and a ratio of the first electrical signal to the second electrical signal.

25. The optical device according to claim 18, wherein the control circuit controls a voltage applied to the first electrode, such that a local maximum value of an amount of light detected by the photodetector while the light source is emitting the laser light is minimized.

26. The optical device according to claim 18, wherein
   the photodetector includes a filter circuit,
   the control circuit causes the light source to sequentially emit a first optical pulse and a second optical pulse in which intensity modulation signals of different frequencies are superposed, and
   the control circuit causes the photodetector
   to detect a portion of the first optical pulse that is emitted from the optical waveguide element, is reflected by the object, and is incident on the optical waveguide element, and a portion of the second optical pulse that is emitted from the optical waveguide element, is reflected by the object, and is incident on the optical waveguide element, and
   to separately output a signal that corresponds to an amount of the portion of the first optical pulse and a signal that corresponds to the portion of the second optical pulse.

27. The optical device according to claim 14, wherein, in the at least one electrode layer, a boundary between two adjacent divided regions from among the divided regions has a zigzag shape in the radial direction.

28. The optical device according to claim 14, wherein,
   in each of the first electrode layer and the second electrode layer, a boundary between two adjacent divided regions from among the divided regions has a zigzag shape in the radial direction, and
   when viewed from a direction perpendicular to any of the first dielectric layer, the second dielectric layer, and the third dielectric layer, the boundary in the first electrode layer and the boundary in the second electrode layer form a shape in which rhomboids are linked.

* * * * *